US009057028B2

(12) United States Patent
Prabhu

(10) Patent No.: US 9,057,028 B2
(45) Date of Patent: Jun. 16, 2015

(54) GASIFIER POWER PLANT AND MANAGEMENT OF WASTES

(75) Inventor: Edan D. Prabhu, Mission Viejo, CA (US)

(73) Assignee: ENER-CORE POWER, INC., Irvine, CA (US)

( * ) Notice: Subject to any disclaimer, the term of this patent is extended or adjusted under 35 U.S.C. 154(b) by 1057 days.

(21) Appl. No.: 13/115,902

(22) Filed: May 25, 2011

(65) Prior Publication Data

US 2012/0297773 A1 Nov. 29, 2012

(51) Int. Cl.
| | | |
|---|---|---|
| F02C 3/28 | (2006.01) | |
| F02C 3/30 | (2006.01) | |
| C10J 3/20 | (2006.01) | |
| C10K 1/10 | (2006.01) | |
| C10K 1/00 | (2006.01) | |
| C10K 1/08 | (2006.01) | |

(52) U.S. Cl.
CPC . C10J 3/20 (2013.01); C10K 1/002 (2013.01); C10K 1/08 (2013.01); F02C 3/28 (2013.01); F02C 3/30 (2013.01); C10J 2300/0916 (2013.01); C10J 2300/093 (2013.01); C10J 2300/0956 (2013.01); C10J 2300/165 (2013.01); Y02E 20/18 (2013.01); C10K 1/101 (2013.01); F23C 2900/99001 (2013.01); Y02E 20/342 (2013.01)

(58) Field of Classification Search
CPC ............ F02C 1/06; C10K 1/002; C10K 1/08; C10K 1/10; C10K 1/101
USPC ........... 60/780, 781, 39.464, 39.52, 736, 723, 60/777
See application file for complete search history.

(56) References Cited

U.S. PATENT DOCUMENTS

| | | | |
|---|---|---|---|
| 2,303,381 | A | 12/1942 | New |
| 2,433,932 | A | 1/1948 | Stosick |
| 2,443,841 | A | 6/1948 | Sweeney |
| 2,624,172 | A | 1/1953 | Houdry |
| 2,630,678 | A | 3/1953 | Pratt |
| 2,655,786 | A | 10/1953 | Carr |

(Continued)

FOREIGN PATENT DOCUMENTS

| | | |
|---|---|---|
| CH | 319366 A | 2/1957 |
| GB | 2080934 A | 2/1982 |

(Continued)

OTHER PUBLICATIONS

"Flameless Thermal Oxidizers" <http://www.selasfluid.com/international/web/le/us/likelesfus.nsf/docbyalias/flameless_thermal>, Copyright 2008, 3 pages, retrieved May 13, 2010.

(Continued)

Primary Examiner — Andrew Nguyen
(74) Attorney, Agent, or Firm — McDermott Will & Emery LLP

(57) ABSTRACT

Described herein are gradual oxidation systems that receive and process solid, liquid, or gaseous fuels. The system can include a solid fuel gasifier that extracts and cleans gas fuel from a solid fuel. The system can also include a reaction chamber that receives the gas fuel and maintains a gradual oxidation process of the fuel. In some embodiments, liquids containing contaminants can be oxidized within the gradual oxidation chamber. Liquid fuels and gas fuels may be communicated to the oxidation chamber separately or in combination.

37 Claims, 16 Drawing Sheets

(56) References Cited

U.S. PATENT DOCUMENTS

| | | |
|---|---|---|
| 2,795,054 A | 6/1957 | Bowen, III |
| 3,313,103 A | 4/1967 | Johnson |
| 3,661,497 A | 5/1972 | Castellucci et al. |
| 3,731,485 A | 5/1973 | Rudolph et al. |
| 3,732,911 A | 5/1973 | Lowe et al. |
| 3,769,922 A | 11/1973 | Furlong et al. |
| 3,790,350 A | 2/1974 | Haensel |
| 3,797,231 A | 3/1974 | McLean |
| 3,810,732 A | 5/1974 | Koch |
| 3,928,961 A | 12/1975 | Pfefferle |
| 3,942,264 A | 3/1976 | Zenkner |
| 3,943,705 A | 3/1976 | DeCorso et al. |
| 3,975,900 A | 8/1976 | Pfefferle |
| 4,052,143 A | 10/1977 | Sandviknes |
| 4,089,631 A * | 5/1978 | Giles ................................ 431/9 |
| 4,111,644 A | 9/1978 | Buckholdt |
| 4,125,359 A | 11/1978 | Lempa |
| 4,163,366 A | 8/1979 | Kent |
| 4,168,950 A | 9/1979 | Seemann et al. |
| 4,187,672 A | 2/1980 | Rasor |
| 4,192,642 A | 3/1980 | Lempa |
| 4,202,169 A | 5/1980 | Acheson et al. |
| 4,209,303 A | 6/1980 | Ricks |
| 4,221,558 A | 9/1980 | Santisi |
| 4,239,481 A | 12/1980 | Morck, Jr. |
| 4,252,070 A | 2/1981 | Benedick |
| 4,282,449 A * | 8/1981 | Bozzuto ........................... 310/11 |
| 4,289,475 A | 9/1981 | Wall et al. |
| 4,321,790 A | 3/1982 | Vadas et al. |
| 4,361,478 A | 11/1982 | Gengler et al. |
| 4,379,689 A | 4/1983 | Morck, Jr. |
| 4,400,356 A | 8/1983 | McVay et al. |
| 4,416,620 A | 11/1983 | Morck |
| 4,418,530 A | 12/1983 | Bodrov et al. |
| 4,442,901 A | 4/1984 | Zison |
| 4,447,690 A | 5/1984 | Grever |
| 4,449,918 A | 5/1984 | Spahr |
| 4,467,610 A | 8/1984 | Pearson et al. |
| 4,469,176 A | 9/1984 | Zison et al. |
| 4,472,935 A | 9/1984 | Acheson et al. |
| 4,487,573 A | 12/1984 | Gottschlich et al. |
| 4,493,770 A | 1/1985 | Moilliet |
| 4,509,333 A | 4/1985 | Nussdorfer et al. |
| 4,509,374 A | 4/1985 | Sugimoto et al. |
| 4,534,165 A | 8/1985 | Davis, Jr. et al. |
| 4,643,667 A | 2/1987 | Fleming |
| 4,646,660 A | 3/1987 | Bjorkman et al. |
| 4,681,612 A | 7/1987 | O'Brien et al. |
| 4,688,495 A | 8/1987 | Galloway |
| 4,733,528 A | 3/1988 | Pinto |
| 4,741,690 A | 5/1988 | Heed |
| 4,754,607 A | 7/1988 | Mackay |
| 4,769,149 A | 9/1988 | Nobilet et al. |
| 4,794,753 A | 1/1989 | Beebe |
| 4,823,711 A | 4/1989 | Kroneberger et al. |
| 4,828,481 A | 5/1989 | Weil et al. |
| 4,838,782 A | 6/1989 | Wills |
| 4,850,857 A | 7/1989 | Obermuller |
| 4,864,811 A | 9/1989 | Pfefferle |
| 4,870,824 A | 10/1989 | Young et al. |
| 4,874,310 A | 10/1989 | Seemann et al. |
| 4,941,415 A | 7/1990 | Pope et al. |
| 4,953,512 A | 9/1990 | Italiano |
| 4,974,530 A | 12/1990 | Lyon |
| 5,003,773 A | 4/1991 | Beckwith |
| 5,044,931 A | 9/1991 | Van Eerden et al. |
| 5,059,405 A | 10/1991 | Watson et al. |
| 5,108,717 A | 4/1992 | Deller et al. |
| 5,131,838 A | 7/1992 | Gensler et al. |
| 5,154,599 A | 10/1992 | Wunning |
| 5,161,366 A | 11/1992 | Beebe |
| 5,165,884 A | 11/1992 | Martin et al. |
| 5,183,401 A | 2/1993 | Dalla Betta et al. |
| 5,190,453 A | 3/1993 | Le et al. |
| 5,232,357 A | 8/1993 | Dalla Betta et al. |
| 5,248,251 A | 9/1993 | Dalla Betta et al. |
| 5,250,489 A | 10/1993 | Dalla Betta et al. |
| 5,258,349 A | 11/1993 | Dalla Betta et al. |
| 5,259,754 A | 11/1993 | Dalla Betta et al. |
| 5,263,314 A | 11/1993 | Anderson |
| 5,271,729 A | 12/1993 | Gensler et al. |
| 5,271,809 A | 12/1993 | Holzhausen |
| 5,281,128 A | 1/1994 | Dalla Betta et al. |
| 5,285,123 A | 2/1994 | Kataoka et al. |
| 5,320,518 A | 6/1994 | Stilger et al. |
| 5,326,253 A | 7/1994 | Dalla Betta et al. |
| 5,326,537 A | 7/1994 | Cleary |
| 5,329,757 A | 7/1994 | Faulkner et al. |
| 5,329,955 A | 7/1994 | Gensler et al. |
| 5,384,051 A | 1/1995 | McGinness |
| 5,405,260 A | 4/1995 | Della Betta et al. |
| 5,406,704 A | 4/1995 | Retallick |
| 5,425,632 A | 6/1995 | Tsurumi et al. |
| 5,461,864 A | 10/1995 | Betta et al. |
| 5,506,363 A | 4/1996 | Grate et al. |
| 5,511,972 A | 4/1996 | Dalla Betta et al. |
| 5,512,250 A | 4/1996 | Betta et al. |
| 5,518,697 A | 5/1996 | Dalla Betta et al. |
| 5,524,432 A | 6/1996 | Hansel |
| 5,524,599 A | 6/1996 | Kong et al. |
| 5,533,890 A | 7/1996 | Holst et al. |
| 5,557,014 A | 9/1996 | Grate et al. |
| 5,560,128 A | 10/1996 | Marega et al. |
| 5,592,811 A | 1/1997 | Dodge et al. |
| 5,601,790 A | 2/1997 | Stilger et al. |
| 5,635,139 A | 6/1997 | Holst et al. |
| 5,637,283 A | 6/1997 | Stilger et al. |
| 5,650,128 A | 7/1997 | Holst et al. |
| 5,685,156 A | 11/1997 | Willis et al. |
| 5,697,776 A | 12/1997 | Van Eerden et al. |
| 5,709,541 A | 1/1998 | Gensler et al. |
| 5,770,584 A | 6/1998 | Kucera et al. |
| 5,770,784 A | 6/1998 | Heywood et al. |
| 5,806,298 A | 9/1998 | Klosek et al. |
| 5,817,286 A | 10/1998 | Martin et al. |
| 5,819,524 A | 10/1998 | Bosley et al. |
| 5,819,673 A | 10/1998 | Heywood et al. |
| 5,832,713 A | 11/1998 | Maese et al. |
| 5,842,357 A | 12/1998 | Siwajek et al. |
| 5,850,731 A | 12/1998 | Beebe et al. |
| 5,850,733 A | 12/1998 | Bosley et al. |
| 5,857,419 A | 1/1999 | Van Eerden et al. |
| 5,862,858 A | 1/1999 | Wellington et al. |
| 5,895,599 A | 4/1999 | Nivoche |
| 5,921,763 A | 7/1999 | Martin |
| 5,944,503 A | 8/1999 | Van Eerden et al. |
| 6,017,172 A | 1/2000 | Ukegawa et al. |
| 6,019,172 A | 2/2000 | Wellington et al. |
| 6,033,207 A * | 3/2000 | Cummings ..................... 431/11 |
| 6,053,699 A | 4/2000 | Turnquist et al. |
| 6,070,404 A | 6/2000 | Bosley et al. |
| 6,095,793 A | 8/2000 | Greeb |
| 6,107,693 A | 8/2000 | Mongia et al. |
| 6,109,018 A | 8/2000 | Rostrup-Nielsen et al. |
| 6,116,014 A | 9/2000 | Dalla Betta et al. |
| 6,141,953 A | 11/2000 | Mongia et al. |
| 6,158,222 A | 12/2000 | Retallick |
| 6,164,908 A | 12/2000 | Nishida et al. |
| 6,205,768 B1 | 3/2001 | Dibble et al. |
| 6,217,832 B1 | 4/2001 | Betta et al. |
| 6,226,976 B1 | 5/2001 | Scott et al. |
| 6,251,347 B1 | 6/2001 | Campbell et al. |
| 6,257,869 B1 | 7/2001 | Martin et al. |
| 6,261,093 B1 | 7/2001 | Matros et al. |
| 6,269,882 B1 | 8/2001 | Wellington et al. |
| 6,313,544 B1 | 11/2001 | Mongia et al. |
| 6,334,769 B1 | 1/2002 | Retallick et al. |
| 6,339,924 B1 | 1/2002 | Hoyer et al. |
| 6,339,925 B1 | 1/2002 | Hung et al. |
| 6,345,495 B1 | 2/2002 | Cummings |
| 6,391,267 B1 | 5/2002 | Martin et al. |
| 6,393,727 B1 | 5/2002 | Seelig et al. |
| 6,393,821 B1 | 5/2002 | Prabhu |
| 6,469,181 B1 | 10/2002 | Gruber et al. |

(56) References Cited

U.S. PATENT DOCUMENTS

| | | |
|---|---|---|
| 6,487,860 B2 | 12/2002 | Mayersky et al. |
| 6,497,615 B1 | 12/2002 | Klager |
| 6,521,566 B1 | 2/2003 | Magno et al. |
| 6,539,720 B2 | 4/2003 | Rouse et al. |
| 6,551,068 B2 | 4/2003 | Blotenberg |
| 6,595,001 B2 | 7/2003 | Rautenbach et al. |
| 6,612,112 B2 | 9/2003 | Gilbreth et al. |
| 6,634,176 B2 | 10/2003 | Rouse et al. |
| 6,639,328 B2 | 10/2003 | Wacknov |
| 6,655,137 B1 | 12/2003 | Sardari |
| 6,657,332 B2 | 12/2003 | Balas |
| 6,657,348 B2 | 12/2003 | Qin et al. |
| 6,675,583 B2 | 1/2004 | Willis et al. |
| 6,696,130 B1 | 2/2004 | Kasai et al. |
| 6,698,412 B2 | 3/2004 | Dalla Betta |
| 6,715,296 B2 | 4/2004 | Bakran et al. |
| 6,718,772 B2 | 4/2004 | Dalla Betta et al. |
| 6,720,685 B2 | 4/2004 | Balas |
| 6,732,531 B2 | 5/2004 | Dickey |
| 6,747,372 B2 | 6/2004 | Gilbreth et al. |
| 6,748,742 B2 | 6/2004 | Rouse et al. |
| 6,751,941 B2 | 6/2004 | Edelman et al. |
| 6,784,565 B2 | 8/2004 | Wall et al. |
| 6,787,933 B2 | 9/2004 | Claude et al. |
| 6,796,129 B2 | 9/2004 | Yee et al. |
| 6,804,946 B2 | 10/2004 | Willis et al. |
| 6,810,678 B1 | 11/2004 | Luk |
| 6,812,586 B2 | 11/2004 | Wacknov et al. |
| 6,812,587 B2 | 11/2004 | Gilbreth et al. |
| 6,815,932 B2 | 11/2004 | Wall |
| 6,824,328 B1 | 11/2004 | Vinegar et al. |
| 6,832,480 B1 | 12/2004 | Anguil |
| 6,864,595 B2 | 3/2005 | Wall |
| 6,892,542 B2 | 5/2005 | Voinov |
| 6,895,760 B2 | 5/2005 | Kesseli |
| RE38,784 E | 8/2005 | Maese et al. |
| 6,923,001 B2 | 8/2005 | Laster et al. |
| RE38,815 E | 10/2005 | Maese et al. |
| 6,951,110 B2 | 10/2005 | Kang |
| 6,960,840 B2 | 11/2005 | Willis et al. |
| 6,962,055 B2 | 11/2005 | Chen et al. |
| 7,007,486 B2 | 3/2006 | Sprouse et al. |
| 7,007,487 B2 | 3/2006 | Belokon et al. |
| 7,017,329 B2 | 3/2006 | Farhangi et al. |
| 7,045,913 B2 | 5/2006 | Ebrahim et al. |
| 7,053,590 B2 | 5/2006 | Wang |
| 7,062,917 B2 | 6/2006 | Wunning et al. |
| 7,093,445 B2 | 8/2006 | Corr, II et al. |
| 7,096,671 B2 | 8/2006 | Bland et al. |
| 7,117,676 B2 | 10/2006 | Farhangi et al. |
| 7,117,694 B2 | 10/2006 | Braun et al. |
| 7,121,097 B2 | 10/2006 | Yee et al. |
| 7,124,589 B2 | 10/2006 | Neary |
| 7,140,188 B2 | 11/2006 | Hosokawa et al. |
| 7,168,949 B2 | 1/2007 | Zinn et al. |
| RE39,596 E | 5/2007 | Dodge et al. |
| 7,425,127 B2 | 9/2008 | Zinn et al. |
| 7,430,869 B2 | 10/2008 | Su et al. |
| 2002/0060556 A1 | 5/2002 | Wall |
| 2002/0063479 A1 | 5/2002 | Mitchell et al. |
| 2002/0066270 A1 | 6/2002 | Rouse et al. |
| 2002/0067872 A1 | 6/2002 | Weissert |
| 2002/0069648 A1 | 6/2002 | Levy et al. |
| 2002/0078694 A1 | 6/2002 | Nazeer et al. |
| 2002/0079760 A1 | 6/2002 | Vessa |
| 2002/0084702 A1 | 7/2002 | Balas |
| 2002/0096393 A1 | 7/2002 | Rouse |
| 2002/0096959 A1 | 7/2002 | Qin et al. |
| 2002/0097928 A1 | 7/2002 | Swinton et al. |
| 2002/0104316 A1 | 8/2002 | Dickey et al. |
| 2002/0125779 A1 | 9/2002 | Qin et al. |
| 2002/0128076 A1 | 9/2002 | Lubell |
| 2002/0166324 A1 | 11/2002 | Willis et al. |
| 2002/0177629 A1* | 11/2002 | O'Beck et al. ............... 518/703 |
| 2003/0102730 A1 | 6/2003 | Balas |
| 2003/0110773 A1 | 6/2003 | Rouse et al. |
| 2003/0111842 A1 | 6/2003 | Gilbreth et al. |
| 2003/0157395 A1 | 8/2003 | Ren et al. |
| 2003/0192318 A1 | 10/2003 | Sprouse et al. |
| 2003/0192319 A1 | 10/2003 | Sprouse et al. |
| 2004/0003598 A1 | 1/2004 | Farhangi |
| 2004/0011523 A1 | 1/2004 | Sarada |
| 2004/0021235 A1 | 2/2004 | Corr et al. |
| 2004/0040312 A1 | 3/2004 | Hoffjann et al. |
| 2004/0074223 A1 | 4/2004 | Willis et al. |
| 2004/0100101 A1 | 5/2004 | Willis et al. |
| 2004/0103669 A1 | 6/2004 | Willis et al. |
| 2004/0119291 A1 | 6/2004 | Hamrin et al. |
| 2004/0129188 A1 | 7/2004 | Traina |
| 2004/0148942 A1 | 8/2004 | Pont et al. |
| 2004/0160061 A1 | 8/2004 | Rouse et al. |
| 2004/0167270 A1 | 8/2004 | Chang et al. |
| 2004/0178641 A1 | 9/2004 | Wall |
| 2004/0255588 A1 | 12/2004 | Lundberg et al. |
| 2005/0076648 A1 | 4/2005 | Farhangi |
| 2005/0196714 A1 | 9/2005 | Carroni et al. |
| 2005/0201909 A1 | 9/2005 | Carroni et al. |
| 2006/0016195 A1 | 1/2006 | Dalla Betta et al. |
| 2006/0037432 A1 | 2/2006 | Deevi et al. |
| 2006/0049080 A1 | 3/2006 | Bacha et al. |
| 2006/0052499 A1 | 3/2006 | Chang et al. |
| 2006/0054318 A1 | 3/2006 | Sarada |
| 2006/0063845 A1 | 3/2006 | O'Rear et al. |
| 2006/0063869 A1 | 3/2006 | Chang et al. |
| 2006/0063870 A1 | 3/2006 | Chang et al. |
| 2006/0074134 A1 | 4/2006 | O'Rear et al. |
| 2006/0080968 A1 | 4/2006 | Griffin et al. |
| 2006/0096294 A1 | 5/2006 | Farhangi et al. |
| 2006/0096297 A1 | 5/2006 | Griffin et al. |
| 2006/0138022 A1 | 6/2006 | Miller et al. |
| 2006/0138024 A1 | 6/2006 | Miller et al. |
| 2006/0150635 A1 | 7/2006 | Su et al. |
| 2006/0196807 A1 | 9/2006 | Rosenbaum et al. |
| 2006/0199743 A1 | 9/2006 | Rosenbaum et al. |
| 2006/0202059 A1 | 9/2006 | Carroni et al. |
| 2006/0213183 A1 | 9/2006 | Althaus |
| 2006/0260308 A1 | 11/2006 | Ingersoll |
| 2006/0272331 A1 | 12/2006 | Bucker et al. |
| 2007/0054226 A1 | 3/2007 | Carroni et al. |
| 2007/0240425 A1* | 10/2007 | Malavasi et al. ............... 60/775 |
| 2009/0100820 A1 | 4/2009 | Prabhu |
| 2009/0100821 A1 | 4/2009 | Prabhu |
| 2010/0139282 A1 | 6/2010 | Prabhu |
| 2010/0275611 A1 | 11/2010 | Prabhu |
| 2010/0319355 A1 | 12/2010 | Prabhu |
| 2011/0219780 A1 | 9/2011 | Prabhu |

FOREIGN PATENT DOCUMENTS

| | | |
|---|---|---|
| JP | 11-13483 A | 1/1999 |
| WO | WO-96/14370 A2 | 5/1996 |
| WO | WO-01/92702 A1 | 12/2001 |

OTHER PUBLICATIONS

Stadler, H. "Experimental and Numerical Investigation of Flameless Pulverised Coal Combustion" <http://darwin.bth.rwth-aachen.de/opus3/voltexte/2010/pdf/3323.pdf>, Aug. 2010, retrieved Sep. 14, 2011.

Wünning, "Flameless Combustion and its Applications," <http://www.bine.info/fileadmin/content/Publikationen/Projekt-Infos/Zusatzinfos/2006-07_Flameless_Combustion.pdf>, Jul. 2007.

Gutmark, Abstract Submitted for the DFD06 Meeting of the American Physical Society, Electronic form version 1.4, <http://absimage.aps.org/image/DFD06/MWS_DFD06-2006-000152.pdf>, Jul. 26, 2006.

Office Action in U.S. Appl. No. 13/115,910, dated May 6, 2014.
Office Action in U.S. Appl. No. 13/115,910, dated Nov. 21, 2013.
Office Action in U.S. Appl. No. 13/115,910, dated Apr. 26, 2013.

* cited by examiner

GASIFIER POWER PLANT AND MANAGEMENT OF WASTES

BACKGROUND

Many power plants utilized a gas turbine system, in which fuel is combusted as it is injected into pressurized air, thereby heating and increasing thermal energy of the gas. The energy is then extracted from the heated gas with a turbine which converts thermal energy into kinetic energy. The kinetic energy may be used to drive another device, for example, a generator. The combustion process is often initiated by an ignition source (e.g. a spark plug). Due to the high temperature of the ignition source and the high concentration of the fuel as it enters the air, the combustion is very rapid and nearly instantaneous.

SUMMARY

During gasification processes, solid fuels containing carbonaceous materials, such as coal, petroleum, biofuel, or biomass, are converted into, for example, carbon monoxide, hydrogen, and methane. These product gases can be used as fuel in systems that are otherwise incompatible with solid fuels. Gasification includes the incomplete combustion of materials, leaving behind combustible gases (e.g., CO, $H_2$, and $CH_4$). In order to clean these gases for operation in power generating systems, these gases must be scrubbed, or cleaned, from other constituents that may damage the power generating systems, such as tar and dust. The scrubbing process can result in toxic waste water (or other liquids) that contains these contaminants. Additionally, the gases produced by the gasification process can be very weak gases.

Described herein are embodiments of integrated gasification power plants that are able to utilize the weak gases from the gasification process and treat the waste water produced during the gas scrubbing. In some embodiments, a gasifier is coupled with a gradual oxidation chamber, the oxidation chamber is configured to accept the contaminated water and to oxidize the contaminants within the water while maintaining a chamber temperature that substantially reduces and limits the amount of harmful emissions (e.g., NOx) in the system exhaust. The system and methods described herein further take advantage of the introduction of the contaminated water to increase potential output of the power generating system and to clean the water.

In some aspects of the gradual oxidizer, fuel is oxidized in a reaction chamber that contains water, which can include contaminants from the gasification process, or contaminants from elsewhere that may be beneficial to destroy. In some implementations, energy released from oxidizing the fuel powers a gas turbine. Liquid fuels, such as ethanol, mixed with substantial quantities of water are not typically amenable to instantaneous combustion because the latent heat required to evaporate the water quenches the combustion process. Additionally, when contaminants are contained in the water used, the contaminants can also constitute fuel, as the contaminants are oxidized within the reaction chamber.

In some embodiments described herein, a solid fuel gasifier gradual oxidation system includes a solid fuel gasifier that extracts gas fuel from a solid fuel; a scrubber that cleans the gas fuel; a flameless combustion chamber that is configured to receive the cleansed gas fuel via a first inlet and to maintain a gradual oxidation process of the gas fuel, the flameless combustion chamber comprising a second inlet; and an introducer, coupled to the second inlet, configured to receive contaminants from the scrubber and to introduce the contaminants into the flameless combustion chamber. In some embodiments, the flameless combustion chamber is configured to maintain an internal temperature sufficient to oxidize the contaminants.

In some embodiments, the flameless combustion chamber is configured to maintain the gradual oxidation process without a catalyst. Some embodiments provide that the gas fuel is cleansed by the scrubber with water. Some embodiments provide that the contaminants received from the scrubber are within the water. In some embodiments, the introducer comprises a compressor to pressurize the water prior to introducing the water into the flameless combustion chamber. In some embodiments, the flameless combustion chamber is configured to maintain the internal temperature sufficient to oxidize the gas fuel in between about 0.01 seconds and about 10 seconds. In some embodiments, the flameless combustion chamber is configured to maintain the internal temperature sufficient to oxidize the gas fuel in between about 0.05 seconds and about 5 seconds. In some embodiments, the flameless combustion chamber is configured to maintain the internal temperature sufficient to oxidize the gas fuel in between about 0.05 seconds and about 2 seconds. In some embodiments, the flameless combustion chamber is configured to maintain the internal temperature sufficient to oxidize the gas fuel in between about 0.1 seconds and about 1 second. In certain embodiments, the system further includes a turbine, in fluid communication with the flameless combustion chamber, the turbine configured to receive heated and compressed fluid from the flameless combustion chamber and to expand the fluid.

Some methods described herein for oxidizing solid fuel include extracting gas fuel from a solid fuel with a solid fuel gasifier; scrubbing the gas fuel with water; gradually oxidizing the gas fuel with a flameless combustion chamber that is configured to receive the cleansed gas fuel via a first inlet and to maintain a gradual oxidation process of the gas fuel; introducing the water into the flameless combustion chamber; and maintaining an internal temperature within the flameless combustion chamber sufficient to vaporize and oxidize the water and contaminants within the water.

Some methods further include maintaining the gradual oxidation process within the flameless combustion chamber without a catalyst. Some methods further include compressing the gas fuel prior to gradually oxidizing the gas fuel with the flameless combustion chamber. Some methods further include compressing the water prior to introducing the water into the flameless combustion chamber. Some methods further include maintaining the internal temperature of the flameless combustion chamber sufficient to oxidize the gas fuel in between about 0.1 seconds and about 1 second. Some methods further include expanding compressed and heated fluid from the flameless combustion chamber with a turbine, in fluid communication with the flameless combustion chamber.

Some embodiments comprise a solid fuel gasifier gradual oxidation system including a solid fuel gasifier that extracts and cleans gas fuel from a solid fuel; a flameless combustion chamber that is configured to receive the cleansed gas fuel via an inlet and to maintain a gradual oxidation process of the gas fuel; and an introducer configured to receive contaminants from the gasifier and to introduce the contaminants into the flameless combustion chamber. In some embodiments, the flameless combustion chamber is configured to maintain an internal temperature, without a catalyst, sufficient to oxidize the contaminants.

In some embodiments, the gasifier comprises a scrubber that cleans the gas fuel. Some embodiments provide that the gas fuel is cleansed by the scrubber with water. In some embodiments, the contaminants received by the introducer are within the water. In certain embodiments, the introducer comprises a compressor to pressurize the water prior to introducing the water into the flameless combustion chamber. Some embodiments provide that the flameless combustion chamber is configured to maintain the internal temperature sufficient to oxidize the gas fuel in between about 0.01 seconds and about 10 seconds.

In some embodiments, the system further includes a turbine, in fluid communication with the flameless combustion chamber, the turbine configured to receive heated and compressed fluid from the flameless combustion chamber and to expand the fluid. In some embodiments, the heated and compressed fluid from the flameless combustion chamber is a gas.

Implementations may include one or more of the following features. Communicating the water into the pressurized reaction chamber includes communicating the liquid into the pressurized reaction chamber. Evaporating the liquid includes evaporating the liquid in the pressurized reaction chamber. An air/fuel mixture including the air and the fuel is communicated into the pressurized reaction chamber. The liquid further includes the fuel, evaporating the liquid includes evaporating the fuel and the water, and the gas includes the evaporated fuel and the evaporated water. The fuel includes ethanol, kerosene, and/or other types of fuel. The liquid includes more than fifty percent water by volume, or the liquid includes more than fifty percent fuel by volume. Communicating the water into the pressurized reaction chamber includes communicating the evaporated fuel and the evaporated water into the pressurized reaction chamber. Evaporating the liquid includes evaporating the fuel and the water by mixing the liquid with heated air. Communicating the water into the pressurized reaction chamber includes communicating the heated air, the evaporated fuel and the evaporated water into the pressurized reaction chamber. Fuel gas, formed by evaporating liquid fuel, is combined with the evaporated water and/or air. Communicating the water into the reaction chamber includes communicating the mixture of fuel gas, the evaporated water, and/or air into the reaction chamber. Oxidizing the fuel generates an oxidation product gas. The oxidation product gas is expanded in a gas turbine, which drives a generator. Landfill gas is received from a landfill prior to evaporating the liquid. The landfill gas is condensed to form the liquid that is later evaporated. The landfill gas includes the fuel, and condensing the liquid separates the water from the fuel. The liquid includes toxic material. Communicating the water into the pressurized reaction chamber includes communicating the toxic material into the reaction chamber.

In some aspects, a system includes an evaporator and a reaction chamber. The evaporator evaporates a liquid including water and fuel to form a gas including the water and the fuel. The evaporator includes an evaporator inlet arranged to receive the liquid and an evaporator outlet arranged to communicate the gas from the evaporator. The reaction chamber is configured to oxidize the fuel with air at a pressure above an ambient pressure about the reaction chamber. The reaction chamber includes a reaction chamber inlet in communication with the evaporator outlet to receive the gas including the water and the fuel.

Implementations may include one or more of the following features. The system includes a turbine having a turbine inlet in fluid communication with an outlet of the reaction chamber. The turbine is configured to receive an output gas from the reaction chamber and convert thermal energy of the output gas to mechanical energy by expanding the output gas between the turbine inlet and a turbine outlet. The system includes a generator mechanically coupled to the turbine. The generator is configured to convert the mechanical energy to electrical energy. The system includes a landfill well that receives landfill fluids from a landfill. The liquid includes at least a portion of the landfill fluids. The system includes a condenser that receives the landfill fluids from the landfill well and condenses the liquid from the landfill fluids.

In some aspects, an oxidation reaction chamber includes a first inlet arranged to receive a liquid including water and to communicate the liquid into the reaction chamber. The reaction chamber includes a second inlet arranged receive a gas including air and to communicate the gas into the reaction chamber. The reaction chamber is configured to evaporate the liquid in the reaction chamber to form a gas mixture including the water, the air, and fuel. The reaction chamber is configured to oxidize the fuel with the air in the reaction chamber.

Implementations may include one or more of the following features. The liquid includes the fuel. The gas includes the fuel. The reaction chamber includes a third inlet arranged to communicate the fuel into the reaction chamber. The reaction chamber includes an outlet in fluid communication with a turbine.

Described herein are methods and embodiments for the injection of water or steam into gas turbine systems. Combusting more gas in gas turbines can increase output of the turbines. However, doing so can increase the amount of fuel combusted and lead to greater temperatures, which results in increased formation of harmful NOx gas. In some embodiments, by providing water or steam into the system, the gradual oxidation system described herein can provide oxidation of fuels without increasing NOx formation while increasing output of the system.

Some embodiments describe that the fuel of the systems is oxidized by a flameless gradual oxidation process as an air/fuel mixture flows along the flow path in the reaction chamber. The fuel is preferably oxidized at a temperature sufficiently low to reduce or prevent formation and/or emission of harmful compounds, such as nitrogen oxides, and at a temperature sufficiently high to oxidize the fuel and other contaminants that are introduced into the chamber. The air/fuel mixture flows through the reaction chamber and absorbs heat from the interior surface of the reaction chamber, including possibly from fill material that may be contained within the chamber. In some embodiments, the reaction chamber does not include fill material, and the air/fuel mixture flowing through the reaction chamber absorbs heat from the existing gas or other constituents within the reaction chamber. The air/fuel mixture gradually increases in temperature as the mixture flows through the reaction chamber. When the temperature of the air/fuel mixture reaches or exceeds an auto-ignition temperature of the fuel, the fuel undergoes an exothermic oxidation reaction.

Many embodiments described herein contemplate adding steam or water to the system for one or more of many reasons (e.g., to reduce likelihood of combustion, to control temperature, to increase efficiency and/or output, etc.). This operation is distinct, as described further herein, from the introduction of water or steam in combustion systems.

Some methods described herein include evaporating a liquid comprising water to form a gas comprising the water; communicating the water into a reaction chamber that is pressurized above an ambient pressure about an exterior of the reaction chamber; and oxidizing fuel with air in the pressurized reaction chamber containing the air, the fuel, and the water while maintaining a maximum temperature of the fuel in the reaction chamber below a temperature that causes formation of nitrogen oxides.

In some methods, communicating the water into the pressurized reaction chamber includes communicating the liquid into the pressurized reaction chamber, and wherein evaporating the liquid comprises evaporating the liquid in the pressurized reaction chamber. Some methods further include communicating into the pressurized reaction chamber an air/fuel mixture comprising the air and the fuel. In some instances, the liquid further comprises the fuel, evaporating the liquid comprises evaporating the fuel and the water, and the gas comprises the evaporated fuel and the evaporated water.

In some methods, the fuel comprises at least one of ethanol or kerosene. In some instances, the liquid comprises more than fifty percent water by volume. In some methods, communicating the water into the pressurized reaction chamber comprises communicating the gas comprising the evaporated fuel and the evaporated water into the pressurized reaction chamber, and the method further comprising communicating the air into the pressurized reaction chamber.

Some methods further include mixing the air with the gas comprising the evaporated fuel and the evaporated water, wherein communicating the water into the pressurized reaction chamber comprises communicating a mixture comprising the air, the evaporated fuel and the evaporated water into the pressurized reaction chamber. In some methods, communicating the water into the pressurized reaction chamber comprises communicating the liquid into the pressurized reaction chamber, and evaporating the liquid comprises evaporating the liquid in the pressurized reaction chamber.

In some methods, the liquid further comprises the fuel, evaporating the liquid comprises evaporating the fuel and the water by mixing the liquid with heated air, and wherein the gas comprises the heated air, the evaporated fuel and the evaporated water. In some instances, communicating the water into the pressurized reaction chamber comprises communicating the gas comprising the heated air, the evaporated fuel and the evaporated water into the pressurized reaction chamber.

Some methods provide that oxidizing the fuel generates an oxidation product gas, the method further comprising expanding the oxidation product gas in a gas turbine. In some methods, expanding the oxidation product gas in the gas turbine drives a generator mechanically coupled to the gas turbine.

Some methods further include receiving a landfill gas from a landfill prior to evaporating the liquid and condensing the liquid from the landfill gas. In some methods, the landfill gas comprises the fuel. In some methods, the liquid comprises contaminants, and communicating the water into the pressurized reaction chamber comprises communicating the contaminants into the reaction chamber, and wherein the contaminants are oxidized in the reaction chamber.

In some embodiments described herein, systems are disclosed that include an evaporator that evaporates a liquid comprising water to form a gas comprising the water, the evaporator having an evaporator inlet arranged to receive the liquid and an evaporator outlet arranged to communicate the gas from the evaporator. The systems can further include a reaction chamber comprising a reaction chamber inlet in fluid communication with the evaporator outlet to receive the gas, the reaction chamber configured to oxidize fuel with air while containing the fuel, air, and gas at a pressure above an ambient pressure about the reaction chamber and while maintaining a maximum temperature in the reaction chamber below a temperature that causes formation of nitrogen oxides.

In some embodiments, the liquid further includes the fuel in a liquid state and the gas further comprising the fuel in a gaseous state. Some embodiments provide the reaction chamber further comprises one or more additional reaction chamber inlets arranged to receive at least one of the fuel or the air. Some embodiments further include a turbine having a turbine inlet in fluid communication with an outlet of the reaction chamber the turbine configured to receive an oxidation product from the reaction chamber and convert thermal energy of the oxidation product to mechanical energy by expanding the oxidation product between the turbine inlet and a turbine outlet. Some embodiments further include a generator mechanically coupled to the turbine, the generator configured to convert the mechanical energy to electrical energy.

Some embodiments described herein disclose an oxidation reaction chamber having a first inlet arranged to communicate a liquid comprising water into an interior volume of the reaction chamber; a second inlet arranged to communicate a gas comprising air into the interior volume, the reaction chamber adapted to oxidize fuel with the air in the interior volume while maintaining a maximum temperature in the reaction chamber below a temperature that causes formation of nitrogen oxides; and an outlet arranged to communicate an output gas from the interior volume, the output gas comprising the water and an oxidation product gas generated by oxidizing the fuel in the interior volume.

In some embodiments, the liquid further comprises the fuel, and in some embodiments, the gas further comprises the fuel. Some embodiments provide that the outlet is in fluid communication with a turbine inlet. In some embodiments, the liquid further comprises contaminants, and the maximum temperature in the reaction chamber is at or above an oxidation temperature of the contaminants. In some embodiments, the gas further comprises contaminants that may be oxidized within the reaction chamber and the temperature in the oxidation temperature at or above the temperature to oxidize the contaminants.

Some embodiments described herein include a gradual oxidation system having a fluid inlet; a compressor that receives and compresses fluid, comprising a first fuel mixture, from the fluid inlet; an injector that introduces a second fuel mixture into the fluid, the second fuel mixture comprising a liquid having a mixture of fuel and water, wherein water comprises between 50% and 80% of the second fuel mixture by volume; and a gradual oxidation chamber that receives the fluid from the compressor and that maintains a flameless oxidation process of the fluid within the chamber without a catalyst.

Some embodiments further include a turbine that receives the heated and compressed fluid from the gradual oxidation chamber and expands the fluid. In some embodiments, the injector introduces the second fuel mixture before the fluid is compressed by the compressor. In some embodiments, the injector introduces the second fuel mixture into the fluid after the fluid has been compressed and before the fluid is received into the gradual oxidation chamber. Some embodiments provide that the injector introduces the second fuel mixture into the gradual oxidation chamber.

Some embodiments further include a compressor that compresses the second fuel mixture prior to introducing the second fuel mixture into the gradual oxidation chamber. In some embodiments, the second fuel mixture comprises at least one of ethanol, gasoline, and petroleum distillates. In some embodiments, the second fuel mixture comprises a fuel-to-water mixture of about 25% fuel by volume. In some embodiments, the injector is configured to inject the second fuel mixture into the system as a liquid. In some embodiments, the injector is configured to inject the second fuel mixture into the system as a gas. Some embodiments provide that the ratio of fuel-to-water mixture of the second fuel mixture is based on a determination of the fuel-to-air mixture of the first fuel mixture, and some embodiments provide that the ratio of fuel-to-air mixture is based on a determined of the fuel-to-water mixture.

In some embodiments described herein, a gradual oxidation system includes a fluid inlet; a compressor that receives and compresses fluid, comprising a fuel mixture, from the fluid inlet; an injector that introduces steam into the fluid after the fluid has been compressed; a gradual oxidation chamber that receives the fluid from the compressor and that maintains a flameless oxidation process of the fluid within the chamber without a catalyst; and a turbine that receives the heated and compressed fluid from the gradual oxidation chamber and expands the fluid.

In some embodiments, the injector introduces steam before the fluid is compressed by the compressor. In some embodiments, the injector introduces steam into the fluid after the fluid has been compressed and before the fluid is received into the gradual oxidation chamber. Some embodiments provide that the injector introduces steam into the gradual oxidation chamber. Some embodiments further include a steam compressor that compresses the steam prior to introducing the steam into the gradual oxidation chamber.

Some methods described herein for gradually oxidizing a fuel mixture include aspirating air into a gradual oxidation system via a fluid inlet; mixing the air with fuel to form a fuel mixture; compressing the fuel mixture; injecting steam into the system to combine the steam with the fuel mixture; gradually oxidizing the fuel mixture in a gradual oxidation chamber that maintains a flameless oxidation process of the fluid without a catalyst; directing heated and compressed fluid from the gradual oxidation chamber to a turbine; and expanding the fluid with the turbine.

In some methods, the steam is injected into the system prior to the compressing of the fuel mixture. In some methods, the steam is injected into the system after the compressing of the fuel mixture and before the gradually oxidizing of the fuel mixture. In some methods, the steam is injected into gradual oxidation chamber.

Some methods disclosed herein for gradually oxidizing a fuel mixture include aspirating air into a gradual oxidation system via a fluid inlet; mixing the air with fuel to form a first fuel mixture; compressing the fuel mixture; injecting a second fuel mixture into the system to combine the second fuel mixture with the first fuel mixture, the second fuel mixture comprising a liquid having a mixture of fuel and water, wherein water comprises between 50% and 80% of the second fuel mixture by volume; and gradually oxidizing the first and second fuel mixtures in a gradual oxidation chamber that maintains a flameless oxidation process of the fluid without a catalyst.

Some methods further include directing heated and compressed fluid from the gradual oxidation chamber to a turbine and expanding the fluid with the turbine. In some methods, the second fuel mixture is injected into the system before the fluid is compressed by the compressor. In some methods, the second fuel mixture is injected into the system after the fluid has been compressed and before the fluid is received into the gradual oxidation chamber. In some methods, the second fuel mixture is injected into the gradual oxidation chamber. Some methods further include compressing the second fuel mixture with a compressor prior to introducing the second fuel mixture into the gradual oxidation chamber.

In some embodiments, the second fuel mixture comprises at least one of ethanol, gasoline, and petroleum distillates. In some embodiments, the second fuel mixture comprises a fuel-to-water mixture of about 25% fuel by volume. In some embodiments, the second fuel mixture is injected into the system as a liquid. In some embodiments, the second fuel mixture is injected into the system as a gas. Some embodiments further include determining the ratio of the fuel-to-air mixture of the first fuel mixture and adjusting the ratio of fuel-to-water mixture of the second fuel mixture based on first fuel mixture ratio.

In some embodiments described herein, a gradual oxidation system includes a solid fuel gasifier that extracts gas fuel from a solid fuel; a scrubber that removes contaminants from the gas fuel with a cleansing liquid; and a flameless combustion chamber that (i) receives the cleansing liquid and contaminants from the scrubber, (ii) maintains an internal temperature sufficient to provide a gradual oxidation process, and (iii) provides a residence time, such that substantially all the contaminants from the scrubber are oxidized within the flameless combustion chamber. In some embodiments, the flameless combustion chamber is configured to maintain the gradual oxidation process without a catalyst.

In some embodiments of the system, the gas fuel is cleansed by the scrubber with water. In certain embodiments, the contaminants received from the scrubber are within the water, and the introducer comprises a compressor to pressurize the water prior to introducing the water into the flameless combustion chamber. The flameless combustion chamber is preferably configured to maintain the internal temperature sufficient to oxidize the gas fuel in between about 0.01 second and about 10 seconds. In some embodiments, the flameless combustion chamber maintains a maximum temperature below a temperature that causes formation of nitrogen oxide.

In certain embodiments, the flameless combustion chamber is configured to receive gas fuel from the scrubber and oxidizes the gas fuel during the gradual oxidation process. In some instances, substantially all the gas fuel from the scrubber is received and oxidized by the flameless combustion chamber. In certain instances, a first portion of the gas fuel from the scrubber is received and oxidized by the flameless combustion chamber and a second portion of the gas fuel from the scrubber is distributed out of the system. In some embodiments, the flameless combustion chamber receives the gas fuel from the scrubber via a first inlet, and receives a supplemental gas fuel from a second inlet.

Some embodiments include a turbine, in fluid communication with the flameless combustion chamber. The turbine is preferably configured to receive heated and compressed gas from the flameless combustion chamber and to expand the gas.

The disclosure also describes, in some embodiments, a gradual oxidation system including a first inlet, configured to communicate contaminated liquid to the system; a second inlet, configured to communicate fuel to the system; a flameless combustion chamber that receives the contaminated liquid and fuel and that maintains an internal temperature sufficient to provide a gradual oxidation process while maintaining a maximum temperature in the combustion chamber below a temperature that causes formation of nitrogen oxide, such that the fuel and contaminants in the liquid are oxidized; and an outlet arranged to conduct an output gas from the combustion chamber, the output gas comprising an oxidation product gas generated by the gradual oxidation process in the combustion chamber. In some embodiments, the flameless combustion chamber is configured to maintain the gradual oxidation process without a catalyst.

The system can be configured, in certain embodiments, such that the contaminated liquid is received by a scrubber that cleans gas fuel with water. In some embodiments, the contaminated liquid comprises the water from the scrubber. The fuel, in certain embodiments, includes gas fuel from the scrubber and the flameless combustion chamber oxidizes the gas fuel during the gradual oxidation process. A compressor can be provided in the system that pressurizes the contaminated liquid prior to the liquid being received by the flameless combustion chamber.

In some embodiments, the flameless combustion chamber is configured to maintain the internal temperature sufficient to oxidize the gas fuel in between about 0.01 second and about 10 seconds. In certain embodiments, the flameless combustion chamber maintains a maximum temperature below a temperature that causes formation of nitrogen oxide. Some embodiments also include a turbine, in fluid communication with the flameless combustion chamber, the turbine configured to receive the output gas and to expand the output gas.

Described herein are methods of oxidizing solid fuel that include the steps of extracting gas fuel from a solid fuel with a solid fuel gasifier; scrubbing the gas fuel with a cleansing liquid in a scrubber to remove contaminants from the gas fuel; conducting the cleansing liquid and contaminants from the scrubber to a flameless combustion chamber; and oxidizing the contaminants in the combustion chamber by (i) maintaining an internal temperature in the combustion chamber sufficient to provide a gradual oxidation process and (ii) providing a residence time within the combustion chamber such that substantially all the contaminants from the scrubber are oxidized within the combustion chamber.

Some methods provide that the flameless combustion chamber maintains the gradual oxidation process without a catalyst. Some methods provide that the gas fuel is cleansed by the scrubber with water. In some methods, the contaminants received by the combustion chamber from the scrubber are within the water. Certain methods further include compressing the water and contaminants with a compressor prior to oxidation in the flameless combustion chamber. In some methods, the residence time is between about 0.01 second and about 10 seconds.

Certain methods also include conducting heated and compressed gas from the flameless combustion chamber to a turbine and expanding the gas in the turbine. Some methods further include conducting gas fuel from the scrubber to the flameless combustor and oxidizing the gas fuel during the gradual oxidation process. In some methods, substantially all the gas fuel from the scrubber is conducted to and oxidized by the flameless combustion chamber.

Some methods provide that a first portion of the gas fuel from the scrubber is conducted to and oxidized by the flameless combustion chamber and a second portion of the gas fuel from the scrubber is distributed away from the combustion chamber. In some methods, the gas fuel is conducted to the flameless combustion chamber via a first inlet, and the combustion chamber receives a supplemental gas fuel from a second inlet. Certain methods provide that the combustion chamber maintains a maximum internal temperature below a temperature that causes formation of nitrogen oxide.

Described herein as methods of oxidizing contaminants in a liquid including the steps of conducting a contaminated liquid to a flameless combustion chamber via a first inlet; conducting fuel to the flameless combustion chamber via a second inlet; and oxidizing contaminants in the contaminated liquid with the fuel in the flameless combustion chamber by (i) maintaining an internal temperature in the combustion chamber sufficient to provide a gradual oxidation process, (ii) maintaining a maximum temperature in the combustion chamber below a temperature that causes formation of nitrogen oxide and (iii) providing a residence time within the combustion chamber such that substantially all the contaminants from the scrubber are oxidized within the combustion chamber. Some methods provide that the flameless combustion chamber maintains the gradual oxidation process without a catalyst. In some methods, the residence time is between about 0.01 second and about 10 seconds.

Certain methods provide that the contaminated liquid is conducted to the combustion chamber from a scrubber that cleans gas fuel with water. In some methods, the contaminated liquid comprises the water from the scrubber. Some methods provide that the fuel comprises gas fuel from a scrubber and the flameless combustion chamber oxidizes the gas fuel during the gradual oxidation process. Certain methods further include compressing the contaminated liquid prior to conducting the liquid to the flameless combustion chamber. Some methods further include conducting heated and compressed gas from the flameless combustion chamber to a turbine and expanding the gas in the turbine.

The details of one or more embodiments of these concepts are set forth in the accompanying drawings and the description below. Other features, objects, and advantages of these concepts will be apparent from the description and drawings, and from the claims.

DESCRIPTION OF THE DRAWINGS

A general architecture that implements the various features of the disclosure will now be described with reference to the drawings. The drawings and the associated descriptions are provided to illustrate embodiments of the disclosure and not to limit the scope of the disclosure. Throughout the drawings, reference numbers are reused to indicate correspondence between referenced elements.

DETAILED DESCRIPTION

Figure 1A:
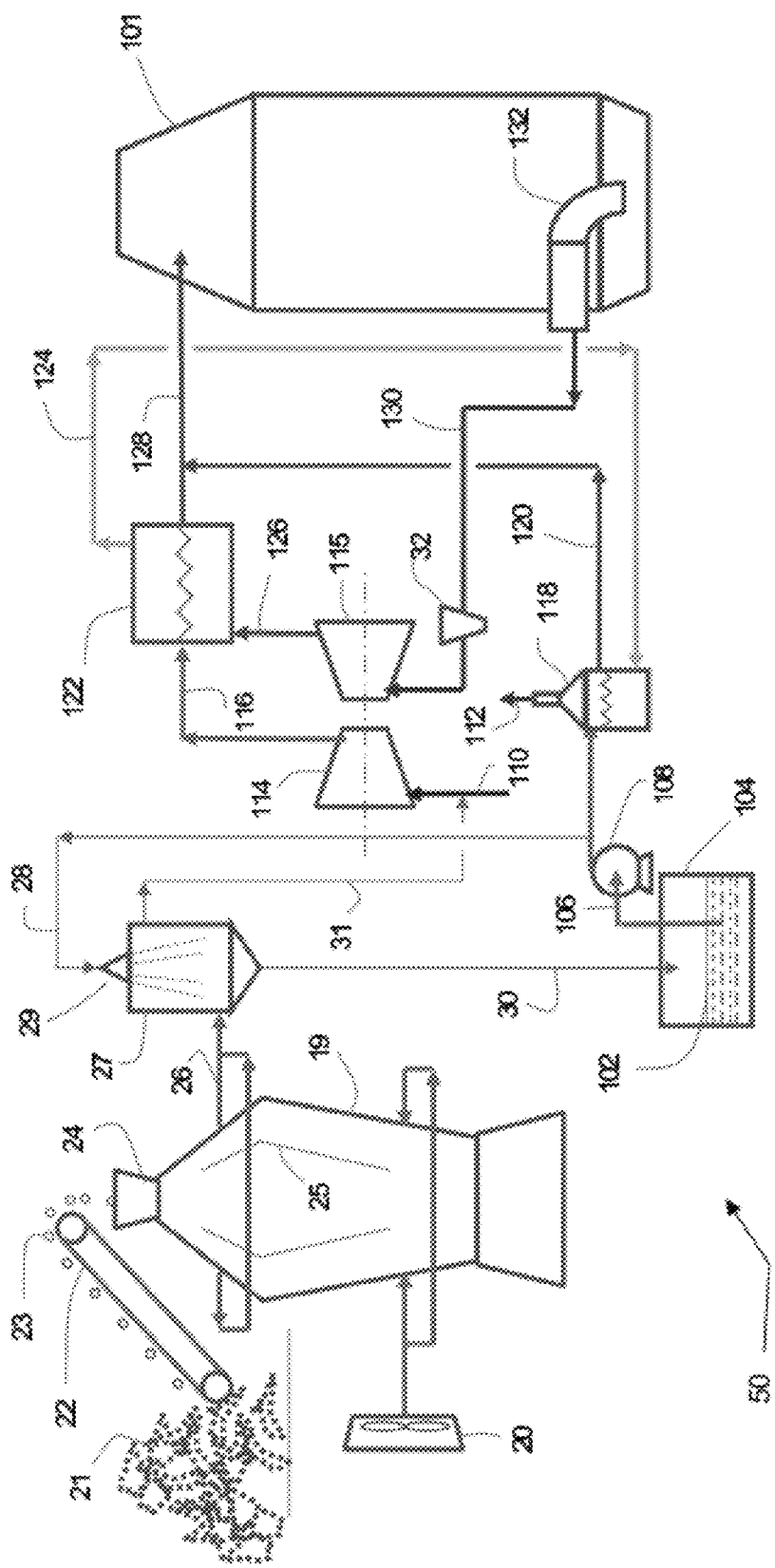
FIG. 1A is a diagram of embodiments of a gasifier power plant.

Gasification of solid fuels such as coal or biomass can be used to create gaseous fuel. During gasification processes, carbonaceous materials, such as coal, petroleum, biofuel, or biomass, are converted into, for example, carbon monoxide and hydrogen by reacting the raw material at high temperatures with a controlled amount of oxygen and/or steam. These processes result in gases that can be used as a fuel in systems that are otherwise incompatible with solid fuels.

In some embodiments of gasification processes, a solid fuel containing organic material is provided. One example, biomass gasification, is the incomplete combustion of biomass that results in the production of combustible gases having carbon monoxide (CO), Hydrogen ($H_2$), and Methane ($CH_4$). This mixture may be called producer gas or fuel gas. The fuel gas can be used to run internal combustion engines, can be used as a substitute for furnace oil, and can be used to produce methanol. Because biomass material can undergo gasification, this process is appealing when compared with ethanol production or biogas, where only selected biomass materials can produce the fuel. Biomass gasification is provided merely as an example of gasification processes, and this disclosure is not intended to be limited to biomass gasification, as gasification processes can be implemented with other carbonaceous materials.

During gasification, a limited amount of oxygen or air is introduced into a reactor with the organic material to allow some of the organic material to slightly or partially oxidize, producing carbon monoxide and energy. This first process drives a second reaction that further converts organic material to hydrogen and additional carbon dioxide. A third reaction occurs when the carbon monoxide and residual water from the organic material react to form methane and excess carbon dioxide. This third reaction occurs more thoroughly in reactors that increase the residence time of the reactive gases and organic materials, as well as heat and pressure within the reactor.

The complete combustion products of biomass generally contain nitrogen, water vapor, carbon dioxide, and may contain oxygen and nitrogen. However, in the incomplete combustion of gasification, the products are combustible gases (e.g., CO, $H_2$, and $CH_4$). Less useful products of the gasification process include, for example, tar and dust. The production of the fuel gases is provided by reaction of water vapor and carbon dioxide through, for example, a glowing layer of charcoal. Thus, in many gasifier systems, the processes include creating conditions that convert biomass to charcoal and maintaining charcoal at an appropriate temperature to convert the charcoal to CO and $H_2$. Among various types of gasifier systems, there are, for example, downdraft gasifiers, updraft gasifiers, and crossdraft gasifiers.

However, several aspects of this gaseous fuel, and the processes that are used to form this gaseous fuel, have limited implementations of gasification processes. For example, most gasification processes produce a weak gas. For example, is some gasifier processes, the fuel gas includes only about 2-6% of $CH_4$ by volume. The low percentage of fuel gas limits how it can be used. Described herein are methods and systems that utilize the fuel gas at levels as low as those produced by these gasification processes.

In many gasification processes, moisture is produced with the fuel gas by either the reactions involved in the process or treatment of the fuel gas. In some instances, the fuel gas must be scrubbed, or cleansed. This can be performed by cleansing the gas with water. This can increase the moisture content of the fuel gas, which can make the fuel gas less usable for many applications. Described herein are methods and systems that utilize the fuel gas and the scrubbing water by the power generation system to both treat the scrubbing water and increasing the output of the power generating system by including the scrubbing water in the power generating system.

The gasification processes also produce undesirable constituents, such as tar. As mentioned above, one method for cleaning the fuel gas is to scrub the gas with water. This process is undesirable because the water becomes contaminated with the tar and other hydrocarbons removed from the gas. The water then becomes a hazardous waste, and disposal of this water can be very costly. Removal of the tar from the gas has also been accomplished by filters, which require regular maintenance and can result in periodic system shutdowns in order to clean or replace filters. Described herein are embodiments of an integrated gasifier power plant that scrub the fuel gas with water and then provide water to an oxidation system that evaporates the water and oxidizes the tar and other hydrocarbons, in addition to utilizing the weak gasification gas for generating electric power. These methods and systems generate power and provide a means to cleanly consume the contaminated water.

FIG. 1A shows embodiments of an integrated gasifier-oxidation system 50. Solid fuel 21 and 23, is fed via conveyor 22 to a gasifier 19, through the gasifier inlet hopper 24. The gasifier includes an air blower 20 that provides air to react with the fuel in a manner that results in partial or incomplete oxidation. Through a chain of temperature and time-dependent reactions, the gasifier converts the solid fuel into a fuel gas with components such as CO, $H_2$, and $CH_4$. The fuel gas also contains nitrogen and carbon dioxide, diluting its energy content. Other complex hydrocarbons, such as $C_4$s, $C_5$s, $C_6$s, and $C_7$s, and ash are also formed during the gasification process. Some of these products are entrained in the gas as contaminants, such as tars and particulates, as mentioned above.

The contaminants in the fuel gas would likely damage end users of the gas and must be removed from the gas. For example, should the gas be cooled for use as a turbine fuel, the contaminants could damage the compressor and turbine components. This cooling and contaminant removal is achieved, for example, by scrubbing gas exiting the gasifier with a stream of water in a scrubber 27. Water contained in a tank 104 is circulated through pump 108, pipes 28 and 30, and spray nozzle 29. Some embodiments provide that the water is cooled during the circulation. Water in tank 104 becomes increasingly contaminated as it scrubs fresh streams of gas. In some embodiments, other liquids are used for scrubbing the fuel gas, and these embodiments operate in a similar fashion.

As illustrated in FIG. 1A, an integrated gasifier and gas turbine system 50 can utilize water having contaminants contained therein. In some embodiments, the contaminants can be tar and other hydrocarbons that can be oxidized during a gradual oxidation process. During this process, the tar and hydrocarbons can operate as a fuel, as they will be completely oxidized and contribute as a fuel to the system. Accordingly, as described herein, the water having fuel can refer to water mixed with fuel gas or water with contaminants that will be oxidized in a reaction chamber 101. Also, as described herein, water with contaminants may refer to water with fuel gas or contaminants from the gasifier 19.

The example system 50 of FIG. 1A includes an air source 110 (e.g., ambient air), which can be coupled to the gasifier 19 and receive scrubbed fuel gas via supply line 31. The system also includes a compressor 114, a turbine 115, a heat exchanger 122, a pressurizing device 108, an evaporation chamber 118, and a reaction chamber 101. An integrated gasifier power plant may include additional, fewer, and/or different components, which may be used in the same and/or a different manner.

The air source 110 provides air for oxidation processes in the reaction chamber 101. The air source 110 provides gas from the gasifier 19, which is mixed with the air. The air source 110 can provide air from the atmosphere surrounding the system 50. Air from the air source 110 may contain oxygen at any concentration sufficient for the oxidation of the fuel. Air from the air source 110 may include other gases in addition to oxygen gas. For example, the air may include nitrogen, carbon dioxide, and/or other reactive or non-reactive gases.

Air from the air source 110 can be communicated to the compressor 114. In the example system 50 shown in FIG. 1A, the compressor 114 may receive mechanical rotational energy from the turbine 115 through a shaft. The compressor 114 can utilize the mechanical rotational energy from the turbine 115 to increase the pressure of the air/fuel mixture in the compressor 114. In some implementations, the system 50 may include a compressor that operates in a different manner.

The compressed air can be communicated from the compressor 114 to the heat exchanger 122. The compression process heats the air, and the air can be further heated by the heat exchanger 122. The heat exchanger 122 receives the compressed air from the compressor 114, heats the compressed air, and communicates the heated, compressed air to the reaction chamber 101. The heat exchanger 122 may also receive exhaust gas from the turbine 115. The heat exchanger 122 may use heat from the exhaust gas to pre-heat the compressed air. For example, the exhaust gas and the air/fuel mixture may contact opposite sides of a heat-transfer structure while flowing through the heat exchanger 122. The heat-transfer structure may conduct thermal energy from the higher temperature exhaust gas to the lower temperature air.

In the example shown, a fluid tank 104 contains the liquid mixture 102, which includes liquid water and fuel and/or contaminants from the gasification process. The fluid tank 104 may contain additional and/or different gas, liquid, and/or solid substances. The fluid tank 104 may include any type of liquid storage system or container, of any suitable size or configuration. The fluid tank 104 may include inlets and/or outlets that provide fluid communication into and/or out of the fluid tank 104. In some examples, the liquid mixture 102 includes liquid ethanol, liquid kerosene, and/or another type of liquid fuel. In some examples, the liquid mixture 102 includes tar and other contaminants from the gasification process. The liquid mixture 102 may include water from any water source.

The liquid mixture 102 may include fluids from a fluid source. Many different types of fluid source are contemplated. Some example fluid sources include wine-making facilities, ethanol production facilities, landfills, alcohol production facilities, oil refineries, steel mills, chemical plants, oil fields, restaurants, and/or other sources of liquid fuel and/or liquid water. As used herein, the term fluid is a broad term and is meant to include, without limitation, a substance that is capable of flowing like a liquid or a gas. In some embodiments, the fluid fuel refers to a gas fuel, but in many embodiments, the fluid fuel can refer to a fuel that is in at least one of a liquid or a gas state. In some embodiments, fluid fuel can refer to both a liquid fuel and a gas fuel.

The liquid mixture 102 can be communicated from the fluid tank 104 into the evaporation chamber 118. In the example system 50 shown, a conduit 106 and a pressurizing device 108 provide fluid communication between an outlet of the fluid tank 104 and an inlet of an evaporation chamber 118. The pressurizing device 108 can be a pump or another type of device that induces fluid flow from the tank 104 into the evaporation chamber 118. The evaporation chamber 118 may include a heat exchanger or another type of heating device that increases the temperature of the liquid mixture 102.

The increase in temperature of the liquid mixture may increase the rate at which the liquids in the evaporation chamber 118 evaporate. Exhaust from the system 50 and/or other sources of heat energy may be used to heat the liquids in the evaporation chamber 118. In the example shown, a conduit 124 provides heat energy to the evaporation chamber 118 from the heat exchanger 122. After imparting heat energy to the evaporation chamber 118, the exhaust may be vented to the atmosphere through the outlet 112.

The liquid mixture 102 evaporates in the evaporation chamber 118 to form a gas mixture. The gas mixture generated in the evaporation chamber 118 may include fuel vapors from the liquid fuel in the mixture 102 and/or water vapors from the liquid water in the mixture 102. For example, heating a liquid mixture of ethanol and water mixture can evaporate both the ethanol and the water.

The gas mixture formed in the evaporation chamber 118 may be communicated into the reaction chamber 101. In the example shown in FIG. 1A, the gas mixture that includes the evaporated water and fuel or contaminants is communicated into the conduit 120, and from the conduit 120 into the conduit 128 to be mixed with the compressed and pre-heated air from the heat exchanger 122. Because the evaporation chamber 118 in FIG. 1A generates a gaseous mixture of fuel and water, mixing the output from the evaporation chamber 118 with the air in the conduit 120 forms a gas-phase mixture of air, fuel, and water. As mentioned above, because the contaminants will be oxidized in the reaction chamber 101, even the contaminants are referred to herein as fuels.

The reaction chamber 101 retains the air and fuel as the fuel oxidizes. Oxidation of the fuel in the reaction chamber 101 may be initiated by raising the fuel to or above an auto-ignition temperature of the fuel. The system 50 may initiate oxidation in the reaction chamber 101 independent of oxidation catalyst materials (e.g., platinum) and/or independent of an ignition source (e.g., a flame or spark). Fuel may be oxidized with air in the reaction chamber 101 without raising the temperature of the air/fuel mixture above a threshold temperature, for example, by maintaining the maximum temperature of the fuel in the reaction chamber below the threshold temperature. The threshold temperature may be determined based on one or more factors, for example, the threshold temperature can be a recommended or maximum operating temperature of the turbine, a recommended or maximum inlet temperature for the turbine, a temperature that causes formation of nitrogen oxides, a temperature selected based on the flow rate of the fuel through the reaction chamber 101, and/or other factors.

In some implementations, fuel is oxidized in the reaction chamber 101 below a temperature that causes formation of nitrogen oxides. As such, the reaction chamber 101 can oxidize virtually all of the fuel while producing only minimal amounts of nitrogen oxides. For example, exhaust gas from the system 112 may include less than one part per million of each of nitrogen oxide, VOCs and CO, and may even reduce the concentrations of VOCs and CO contained in the incoming air.

In some cases, the thermal mass of refractory materials in the reaction chamber 101 may act as a dampener, absorbing heat and preventing excessive temperatures that could damage the turbine and/or produce unwanted byproducts (e.g., nitrogen oxides, carbon dioxides, volatile organic compounds and/or others). In some cases, the thermal mass of the refractory materials in the reaction chamber 101 may provide a temporary source of heat energy, which may help sustain oxidation of the fuel.

The reaction chamber 101 may include one or more inlets. Each of the inlets may communicate air, fuel, water, or any combination of these into the reaction chamber. For example, the gaseous fuel/water mixture from the evaporation chamber 118 may be communicated directly into the reaction chamber 101. In some implementations, the liquid mixture 102 may be communicated directly into the reaction chamber 101 in a liquid state, as will be illustrated in embodiments described herein. The reaction chamber 101 includes one or more outlets that communicate oxidized fuel and/or other materials to the turbine 115.

In the example shown, an exhaust pipe 132 communicates exhaust to an inlet of the turbine 115 through a conduit 130. When the fuel contained in the water mixture includes contaminants from the gasifier, it may be advantageous to include a filter 32 in line with pipe 132 to ensure the heated air passing to the turbine 115 will not cause damage to the turbine or other components of the system 50. The filter 32 can be configured to capture ash or dust that results from the oxidation of the contaminants or other constituents in the water mixture 102.

During a heating process and/or during sustained operation, the gas exiting the reaction chamber 101 through the outlets may include completely oxidized fuel products, non-reactive gases, and only trace amounts of nitrogen oxides and carbon dioxide. In some instances, the gas exiting the reaction chamber 101 through the outlets may include more than trace amounts of unoxidized fuel, nitrogen oxides, carbon dioxide, and/or other materials.

The turbine 115 converts energy of the oxidation product gas to rotational mechanical energy. The example turbine 115 receives the oxidized fuel through a turbine inlet, expands the oxidized fuel between the turbine inlet and a turbine outlet, and communicates the expanded gas through the turbine outlet. In some implementations, the mixture remains in the reaction chamber 101 long enough to oxidize substantially all of the fuel in the mixture, including the contaminants from the gasifier. In some cases, the heat released in the reaction chamber 101 by oxidizing the evaporated fuel and/or contaminants in the liquid mixture 102 may provide sufficient heat energy to heat incoming fuel to the oxidation temperature while maintain the internal temperature of the reaction chamber 101 above the temperature required to oxidize the fuel and power the turbine 115.

After the output gas powers the turbine 115, and the turbine 115 converts thermal energy of the output gas to rotational mechanical energy. The rotational mechanical energy of the turbine 115 drives the compressor 114, and the turbine 115 communicates the output gas from an outlet of the turbine 115 to the heat exchanger 122. The output gas provides heat energy to the heat exchanger 122 and is then preferably communicated to the evaporation chamber 118 to provide heat energy to the evaporation chamber 118. The output gas exits the system through an exit 112, for example, through an exhaust stack.

Scrubbing and/or cooling water (or other cooling liquid) in tank 104 collects tar, particulates, and other soluble contaminants from the gas stream in the gasifier. The liquid is delivered by pump 108 through pipe 28 to the scrubbing vessel 27, where it is sprayed on the gas stream exiting the gasifier 19 and entering the scrubbing vessel 27 through pipe 26. The scrubbing liquid collects tar and particulates from the gas and transports the tar and particulates into tank 104 via pipe 30. When the concentration of tar and particulates in the water or liquid reaches a point where it is sufficiently high, the dirty water or liquid is pumped into evaporator 18. A cooling system may be added to reduce the temperature of the liquid prior to recycling it for further scrubbing. The evaporator 118 is heated with gas exiting the heat exchanger 10, but retains sufficient heat to evaporate the dirty water or liquid. The vapors from the evaporator 118 are delivered to pipe 128, and from there to the reaction chamber 101, where the fuel portion, and contaminant portion, of the vapor is oxidized, recovering any useful heat from the gas.

In some instances, the dirty water is too contaminated and the evaporator 118 may not be able to evaporate all the contaminants in the water with waste heat. For such a situation, the systems shown in FIGS. 2A-3B may be used.

Figure 2A:
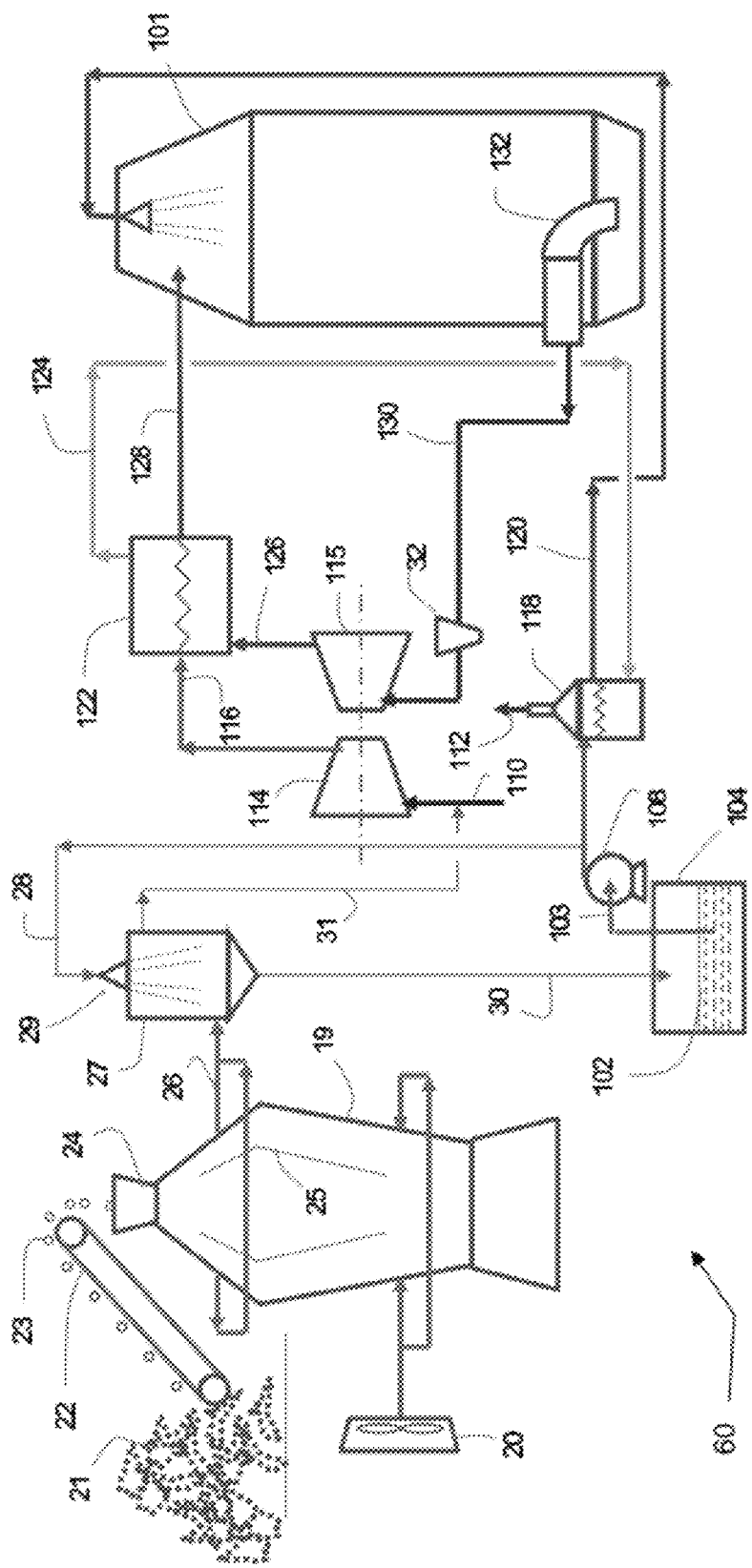
FIG. 2A is a diagram of further embodiments of a gasifier power plant.

FIG. 2A illustrates further embodiments of an integrated gasifier system 60. In this configuration, the evaporated water along with evaporated or entrained contaminants is introduced directly into the reaction chamber 101 from the evaporator 118, after which the reaction proceeds largely as before.

Figure 3A:
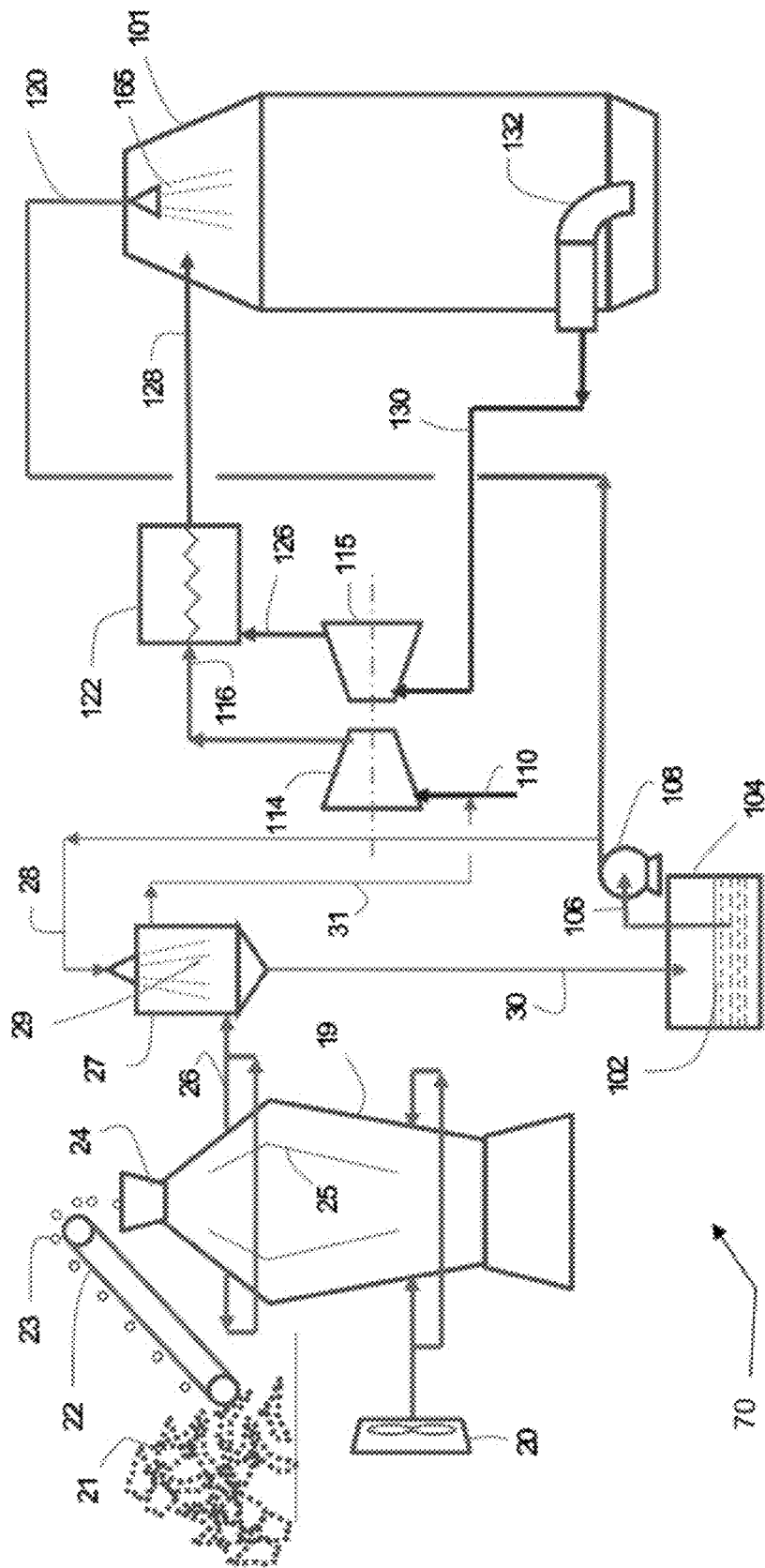
FIG. 3A is a diagram of further embodiments of a gasifier power plant.

FIG. 3A illustrates further embodiments of an integrated gasifier system 70, in which the contaminated water is sprayed directly into the reaction chamber 101 without first passing through an evaporation chamber 118. Once inside the reaction chamber 101, the water and contaminants are oxidized, and the gases so formed travel through the reaction chamber 101 and into the turbine 115. Should the spray of water tend to chill the reaction chamber 101, the flow may be curtailed or temporarily stopped until the reaction chamber 101 is sufficiently hot once again. Any ash that carries over will be either trapped on the porous media inside the reaction chamber 101 or in the hot filter 32. Other potential means of trapping the ash include using gravity, directional changes in flow, or cyclone-type separators. Alternatively, a dual system could be used such that if the ash content is too high, a second reaction chamber 101 may be used, so that while ash is removed from one, the other is in service.

The disposal of contaminated water may or may not assist to improve the efficiency and/or output of the system, depending on how the process is carried out. If the contaminated water contains significant amounts of hydrocarbons, the energy in the hydrocarbons may be released, thus boosting the power output using a fuel that would otherwise go to waste. Also, if waste heat from the system is used to generate steam in the configurations in FIGS. 1A-2B, the overall efficiency of the system may improve.

In some configurations described above, the temperature inside the reaction chamber 101 may be maintained below 2,300 F., which is the temperature at which harmful NOx begins to form. These embodiments therefore have the added benefit of preventing the formation of NOx.

Figure 1B:
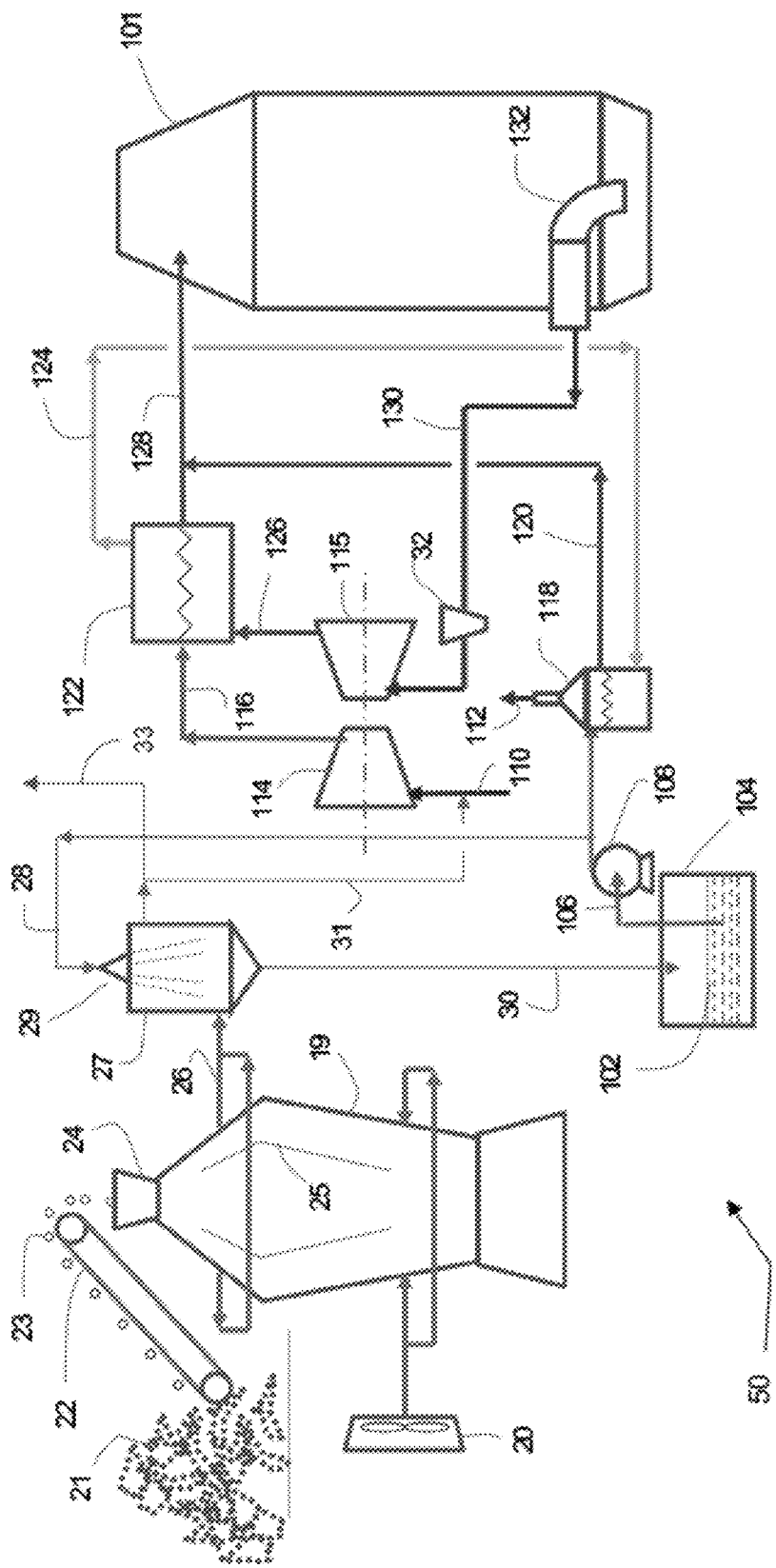
FIG. 1B is a diagram of embodiments of a gasifier power plant.
Figure 2B:
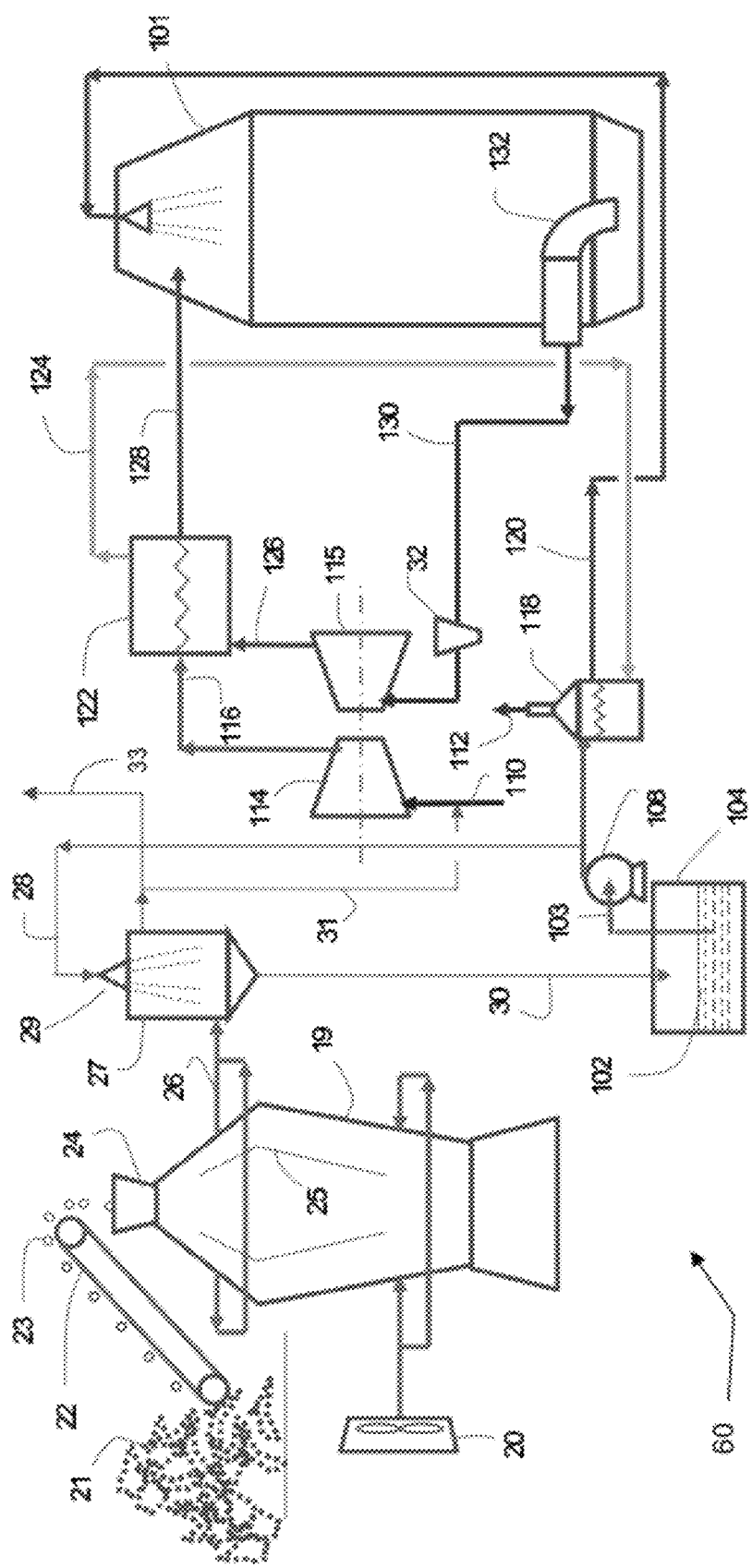
FIG. 2B is a diagram of further embodiments of a gasifier power plant.
Figure 3B:
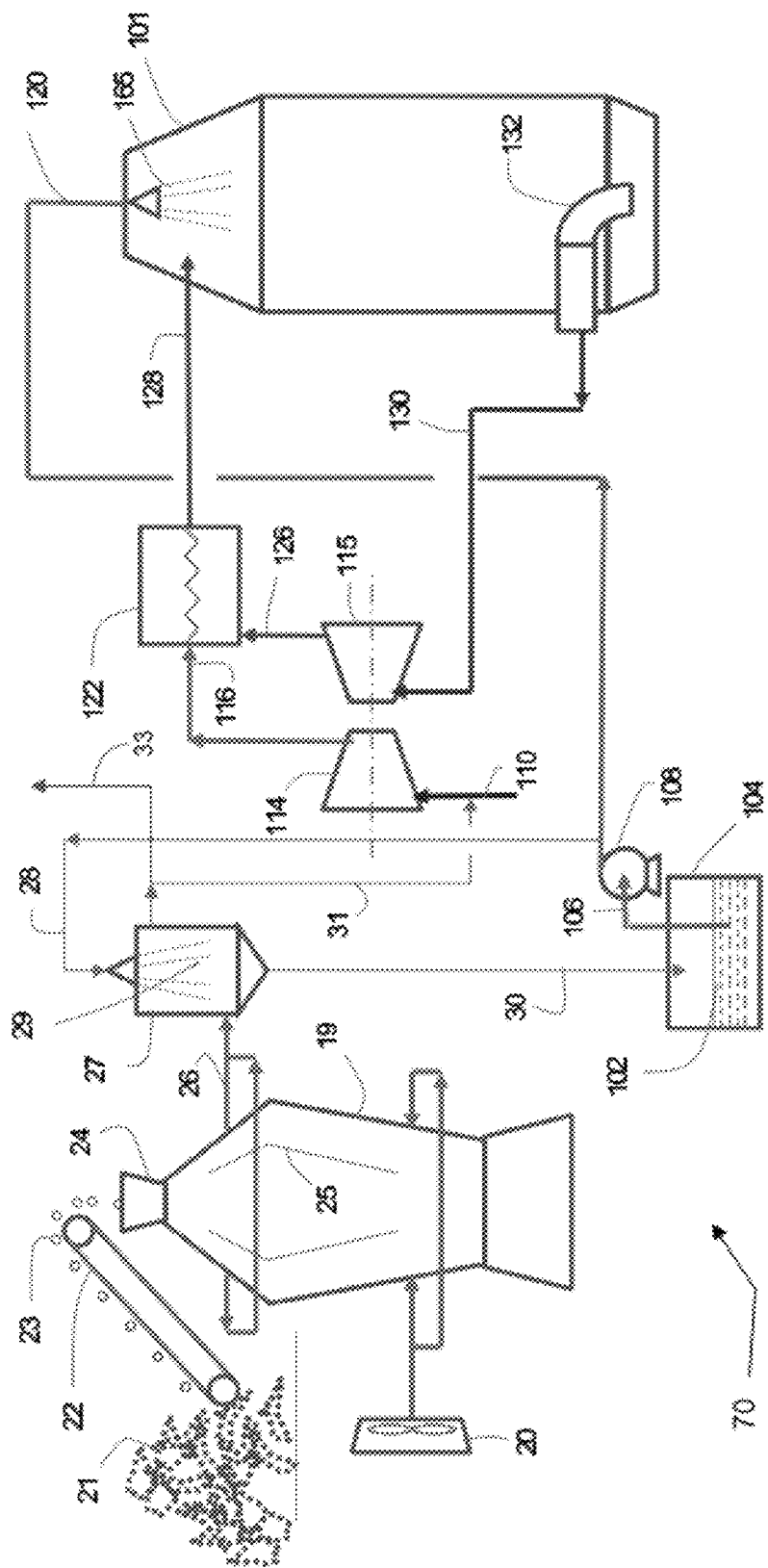
FIG. 3B is a diagram of further embodiments of a gasifier power plant.

FIGS. 1B, 2B, and 3B depict embodiments of integrated gasifier power plants with many features similar to those illustrated in FIGS. 1A, 2A, and 3A. In the embodiments depicted in FIGS. 1B, 2B, and 3B, the systems are configured to redirect gas fuel produced by the gasifier for usage outside of the system in addition to directing gas fuel to the reaction chamber 101 through air source 110. Conduit 33 is depicted as being connected to scrubber 27 and conduit 31. Gas fuel can be redirected through conduit 33 for usage out of the system when there is lower demand for the gas fuel within the reaction chamber 101. When there is greater demand for the gas fuel within the reaction chamber 101 the amount of gas fuel redirected through conduit 33 for usage out of the system can be decreased in order to provide adequate gas fuel for the oxidation process within the reaction chamber 101. The amount of gas fuel that is redirected through conduit 33 can be decreased to the point at which all the gas fuel from the scrubber 27 is directed to the air source 110.

One advantage of the present disclosure is that the oxidation of the fuel and contaminants within the reaction chamber is accomplished through a gradual oxidation process. During this gradual oxidation process, the temperature within the reaction chamber is maintained at a temperature that completely oxidizes the fuel and contaminants without the production of harmful exhaust. Because a gradual oxidation process is used, the moisture content of the fuel does not detrimentally affect the oxidation of the fuel. In many combustion chambers, the moisture content can stifle ignition of the fuel and thereby render the chamber unreliable. However, because the gradual oxidation process is accomplished without combustion of the fuel, oxidation of the fuel and contaminants can be accomplished regardless of an increased moisture content. Indeed, in many instances, an increased moisture content may provide addition advantages.

Described below are further embodiments of gradual oxidation systems that can be utilized in connection with the integrated gasifier power plant. Although the gasifier is not illustrated in these embodiments, one of ordinary skill in the art would comprehend how the gasifier would operate, based on prior descriptions of the systems, and the operations described below. In the embodiments that follow, a water/fuel mixture can include, unless explicitly explained otherwise, a water supply that contains gasification contaminants that will be oxidized in a reaction chamber by a gradual oxidation process, as the contaminants can operate as a fuel during this process.

As mentioned above, fuels containing water are often not compatible with some conventional combustion processes because water content of the fuel is non-combustible. Moreover, the water evaporates as the fuel ignites, and the latent heat of evaporation takes heat away from the combustion process. If the water content of the fuel is too high, combustion cannot occur. Ethanol, a common alcohol that can be derived from fruits, sugar cane, corn, cellulosic waste, and other sources, has been used as a renewable fuel, but the ethanol is typically produced by first producing a dilute mixture of ethanol and water and then separating water from the mixture. Water and ethanol are fully miscible, and separation of the water requires expensive distillation. Even distillation usually cannot remove all water from the ethanol, and special processes are typically needed to render the ethanol completely water-free. Similarly, oil/water mixtures from fuel tanks and waste water collection tanks are often shipped to water separation and/or destruction facilities for processing, which can be quite expensive. A gas turbine that can efficiently consume mixtures of fuel and water may reduce fuel consumption, fuel costs, clean-up requirements, and/or environmental impact. In some conventional systems, the latent heat of evaporation of liquid fuels and any entrained water reduces the efficiency of a gas turbine power cycle.

Figure 4:
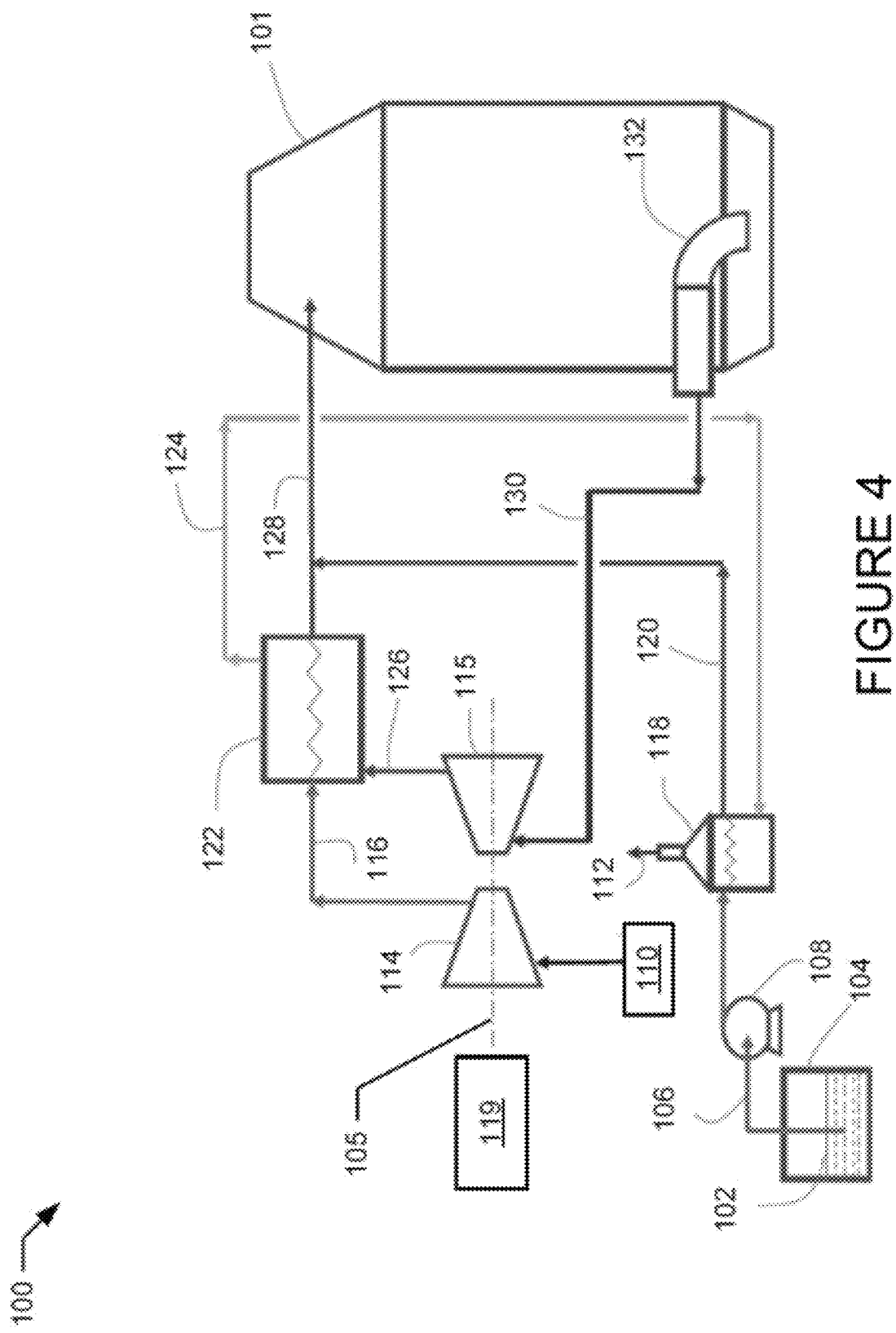
FIG. 4 is a diagram of embodiments of a gas turbine system.

In the example system 100 shown in FIG. 4, a fuel/water mixture 102 is stored in tank 104. The fuel/water mixture 102 can include contaminants from a gasifier. The mixture may be pumped using pressurizing device 108 through a heat exchanger/evaporator 118. Exhaust hot gas leaving the heat exchanger 122 through pipe 124 is delivered to evaporator 118 where it evaporates the liquid fuel/water mixture. By evaporating the liquid fuel and water with surplus heat that would otherwise be vented to the atmosphere, the latent heat of evaporation is provided from a surplus heat source and thus does not significantly reduce system efficiency.

In some implementations, the overall system efficiency may be improved. For example, it is estimated that for many common liquid fuels (e.g., ethanol, gasoline, petroleum distillates, and/or others), a fuel/water mixture that has 25% of the fuel by volume can be evaporated with just the surplus heat available from the system exhaust. An additional benefit is that the evaporated water may increase the mass flow of the gas mixture, and therefore may also increase the power output of the turbine. In some embodiments, the water/fuel mixture can include contaminants from a gasifier.

In some implementations, environmental impact may be reduced by reducing the emission of pollutants and/or other harmful materials. For example, the system 100 can oxidize fuel in a manner that reduces or eliminates emission of nitrogen oxides (NOx), carbon monoxide (CO), volatile organic compounds (VOCs), and/or other types of potentially harmful gases.

In some implementations, the system 100 can reduce or eliminate formation of nitrogen oxides by maintaining a maximum temperature of the fuel below 2300° F. during sustained operation (temperatures above 2300 degrees Fahrenheit (° F.) may cause nitrogen oxides to form). By controlling the temperature and the residence time inside the reaction chamber, a gas turbine system may generate exhaust gases having less than one part-per-million (ppm) carbon monoxide (CO) and/or less than one ppm nitrogen oxide (NOx). In some embodiments, the system 100 can be configured to generate exhaust gases having less than 5 ppm NOx. In some embodiments, the system 100 can be configured to generate exhaust gases having less than 3 ppm NOx. In some embodiments, the system 100 can be configured to generate exhaust gases having less than 2 ppm NOx. Some systems generate exhaust having 15 ppm or more CO and/or 15 ppm or more NOx.

In some embodiments, the system 100 is configured to reduce or eliminate formation of nitrogen oxides by maintaining a maximum temperature within the reaction chamber 101 that is below a threshold temperature of considerable formation of nitrogen oxides. For example, in some embodiments, the maximum temperature within the reaction chamber 101 is below 2300 F. In some embodiments, the maximum temperature within the reaction chamber 101 is between about 2000 F and about 2300 F. In some embodiments, the maximum temperature within the reaction chamber 101 is between about 2100 F and about 2300 F. In some embodiments, the maximum temperature within the reaction chamber 101 is between about 2200 F and about 2300 F. In some embodiments, the maximum temperature within the reaction chamber 101 can be greater than about 2300 F or less than about 2000 F.

Some fuel/water mixtures (e.g., ethanol/water mixtures, biorefinery by-products, and others) are relatively simple to produce but require extra processing for some current power plants. Such fuels may be used directly in the system described here to generate power, and in some cases even more power than fuels that are not mixed with water. In some cases, a power plant can run on a fuel/water mixture that is mostly water. For example, the evaporated fuel/water mixture can be communicated into a reaction chamber that oxidizes the fuel, and the energy from oxidizing the fuel can drive a turbine.

In some instances, efficiency is further increased by using waste heat from the turbine to evaporate all or part the fuel/water mixture before communicating the fuel/water mixture into the reaction chamber. Moreover, the mass flow through the system may increase because of the steam generated from the water, which may lead to a further increase in system output. The increased output (without increasing the fuel input) may also increase efficiency. In some implementations, the water vapor from such a system increases the mass flow through the oxidizer by up to about 6%, with a resulting efficiency and potentially output gain of up to about 5%. For example, in a 200 kW system the increase in power can be about 12 kW with no increase in fuel consumption.

In some embodiments, a mixture of about 25% ethanol and about 75% water can be evaporated with the waste heat from a power plant, and the turbine system can process the resulting evaporated mixture to output energy. In some embodiments, the mixture may include about 20% ethanol and 80% water, and in even further embodiments, the mixture may include about 15% ethanol and about 85% water. In further embodiments, the mixture can include a higher content of water than about 85% and/or a lower content of ethanol than about 15%. For example, in some embodiments, the mixture can include up to about 15% of ethanol. In some embodiments, the mixture can include between about 2% and about 15% of ethanol. In embodiments that have a low fuel content, such as those with a mixture with ethanol constituting between about 2% and about 15%, an additional fuel may be added to supplement the low fuel content mixture, as explained further herein. In some embodiments, other fuels than ethanol may be used with the same or similar ratios.

FIG. 4 shows an example of a gas turbine system 100 that can utilize fuels mixed with water. The example system 100 includes an air source 110 (e.g., ambient air), a compressor 114, a turbine 115, a heat exchanger 122, a liquid tank 104, a pressurizing device 108, an evaporation chamber 118, and a reaction chamber 101. As shown in FIG. 4, the example system 100 may also include an electric power generator 119. In the example system shown, a shaft 105 mechanically couples the turbine 115 to the compressor 114 and the generator 119 (the combination of the turbine 115, compressor 114 and generator 119 being referred to as a turbine generator). A gas turbine system may include additional, fewer, and/or different components, which may be used in the same and/or a different manner.

The example air source 110 provides air for oxidation processes in the reaction chamber 101. Hydrocarbon fuels are oxidized when they are heated above their auto-ignition temperature in the presence of oxygen. The air source 110 provides gas containing oxygen, which is mixed with the fuel to oxidize the fuel. In some embodiments, the air source 110 is provided to the system 100 by a gasifier, as explained in embodiments herein. The air source 110 can provide air from the atmosphere surrounding the system 100. Air from the air source 110 may contain oxygen at any concentration sufficient for the oxidation of the fuel. Air from the air source 110 may include other gases in addition to oxygen gas. For example, the air may include nitrogen, carbon dioxide, and/or other reactive or non-reactive gases.

In some embodiments, combustion gases can be added to the air source 110 to adjust performance of the system 100. For example, in embodiments where a low fuel content mixture does not contain enough fuel for self-sustainable destruction, or in which the oxidation process is incapable of being maintained, combustion gases can be added with air at the air source 110 to provide sufficient fuel for the oxidation process. Combustion gases that can be added at the air source 110 include, for example without limitation, hydrogen, methane, ethane, ethylene, natural gas, propane, propylene, propadiene, n-butane, iso-butane, butylene-1, butadiene, iso-pentane, n-pentane, acetylene, hexane, and carbon monoxide.

In some embodiments, the amount of combustion gases added at the air source 110 can be adjusted based on the amount of fuel detected in the fuel/water mixture 102. If the fuel/water mixture 102 changes in fuel content such that an undesirable concentration of fuel is in the mixture 102, the amount of combustion gases added at the air source 110 can be increased or decreased in response. In some embodiments, the amount of combustion gases added at the air source 110 is based on the amount of fuel content in the fuel/water mixture 102 received by the system 100. In some embodiments, the amount of combustion gases added at the air source 110 is based on a combination of the amount of fuel content in the fuel/water mixture 102 and a temperature within the reaction chamber 101. In some embodiments, the amount of combustion gases added at the air source 110 is based on a combination of the amount of fuel content in the fuel/water mixture 102 and a change in temperature or a rate in change of temperature within the reaction chamber 101.

The amount of fuel content in the fuel/water mixture 102 can be detected in the liquid tank 104, between the pressurizing device 108 and the evaporation chamber 118, or between the evaporation chamber 118 and the reaction chamber 101. As some of the fuel in the fuel/water mixture 102 may, in some instances, oxidize as the fuel/water mixture 102 is heated by the evaporation chamber 118, some embodiments provide that the fuel content of the fuel/water mixture 102 is detected between the evaporation chamber 118 and the reaction chamber 101. In such embodiments, the amount of combustion gases added at the air source 110 is based on the fuel content of the fuel/water mixture 102 detected between the evaporation chamber 118 and the reaction chamber 101.

In some instances, the fuel/water mixture 102 may contain additional constituents that may not be considered a fuel. For example, the fuel/water mixture 102 may comprise, in some embodiments, contaminants and water. The contaminated water can be the byproduct some other process, and the contaminated water is conducted to the system 100 to oxidize the contaminated, or waste, water. For example, the contaminated water can come from a scrubber that is part of a gasifier, as described above. In the gasification process, water is used to cleanse the resultant gas fuel of contaminants prior to distributing the gas fuel for use. The contaminated water is then conducted to the system 100, for example by depositing the contaminated water in the liquid tank 104. The contaminated water is then drawn into the system 100 in a manner similar to that described above with respect to the fuel/water mixture 102, and the water is evaporated while the contaminants are oxidized in the reaction chamber 101. In this manner, the system 100 can operate as a means of treating and cleansing contaminated, toxic, or waste, water. The system 100 can operate as a pollution control device that cleans contaminated water, while producing minimal, if any, harmful gas byproduct.

In embodiments where the fuel/water mixture 102 includes a very low fuel content, a combination of a low fuel content and contaminated water, or contaminated water alone, a supplemental gas fuel can be introduced into the system 100 by air source 110, as explained above. In some embodiments, the gas fuel is substantially the only fuel that is sustaining the oxidation process in the reaction chamber 101. Some embodiments provide that the gas fuel is at least part of the gas fuel produced by a gasifier.

In some instances, contaminated water provided to the system 100 can be supplemented with a liquid fuel prior to oxidation in the reaction chamber 101. For example, if contaminated water from a gasifier is deposited into liquid tank 104, liquid fuel can be added to the liquid tank 104 to increase the fuel content of the fuel/water mixture 102. This process can be performed in addition to, or in place of, the introduction of a gas fuel at the air source 110.

Air from the air source 110 can be communicated to the compressor 114. In the example system 100 shown in FIG. 4, the example compressor 114 receives air from the air source 110 through a compressor inlet, compresses the received air, and communicates the compressed air through a compressor outlet. The compressor 114 may receive mechanical rotational energy from the turbine 115 through the shaft 105. The compressor 114 can utilize the mechanical rotational energy from the turbine 115 to increase the pressure of the air/fuel mixture in the compressor 114. In some implementations, the system 100 may include a compressor that operates in a different manner. The example shaft 105 transfers rotational energy from the turbine 115 to the compressor 114 and the generator 119. In some implementations, the shaft 105 may include multiple shafts. For example, a first shaft may transfer energy from the turbine 115 to the compressor 114, and a second shaft may transfer energy from the turbine to the generator 119.

The compressed air can be communicated from the compressor 114 to the heat exchanger 122. The compression process heats the air, and the heat exchanger 122 can further heat the air. The example heat exchanger 122 receives the compressed air from the compressor 114, heats the compressed air, and communicates the heated, compressed air to the reaction chamber 101. The heat exchanger 122 may also receive exhaust gas from the turbine 115. The heat exchanger 122 may use heat from the exhaust gas to pre-heat the compressed air. For example, the exhaust gas and the air/fuel mixture may contact opposite sides of a heat-transfer structure while flowing through the heat exchanger 122. The heat-transfer structure may conduct thermal energy from the higher temperature exhaust gas to the lower temperature air. In some implementations, the system 100 may include a heat exchanger that operates in a different manner. For example, the system 100 may pre-heat the air using heat from a different source, or the system 100 may communicate the air into the reaction chamber 101 without pre-heating the mixture.

The air may be mixed with fuel to form an air/fuel mixture prior to communicating the air and fuel into the reaction chamber 101. Generally, the air may be combined with fuel at any point in the system 100. For example, fuel may be mixed with the air prior to communicating the air into the compressor 114, prior to communicating the air into the heat exchanger 122, prior to communicating the air into the reaction chamber, and/or after communicating the air into the reaction chamber 101. In the example shown in FIG. 4, air is mixed with fuel in the conduit 128 between the heat exchanger 122 and interior of the reaction chamber 101. The fuel received in the conduit 128 includes gaseous fuel formed by evaporating a liquid mixture 102 in the evaporation chamber 118. In some instances, the air and fuel may be mixed at an inlet into the reaction chamber.

In the example shown, a fluid tank 104 contains the liquid mixture 102, which includes liquid fuel and liquid water. The fluid tank 104 may contain additional and/or different gas, liquid, and/or solid substances. The fluid tank 104 may include any type of liquid storage system or container, of any suitable size or configuration. The fluid tank 104 may include inlets and/or outlets that provide fluid communication into and/or out of the fluid tank 104. In some examples, the liquid mixture 102 includes liquid ethanol, liquid kerosene, and/or another type of liquid fuel. The liquid mixture 102 may include water from any water source.

In some implementations, the water in the liquid mixture 102 includes contaminants, particulates, toxic materials, and/or other types of substances. In some embodiments, the contaminants, particulates, toxic materials, and/or other types of substances can be the result of the water being used to scrub a gas stream in a gasifier. Generally, the liquid mixture 102 may have any ratio of water and fuel. In some examples, the liquid mixture 102 includes a low percentage of liquid fuel (e.g., 25% and in some examples, the liquid mixture 102 includes a higher percentage of liquid fuel (e.g., 30%, 40%, 50%, 60%, 70%, 80%, 90% or more). In some examples, the liquid mixture 102 includes a low percentage of liquid water (e.g., 20%, 10%, or less); and in some examples, the liquid mixture 102 includes a higher percentage of liquid water (e.g., 30%, 40%, 50%, 60%, 70%, or more). The reaction chamber 101 is preferably configured to oxidize the fuel, contaminants, particulates, toxic materials, and or other types of substances sufficiently to render the exhaust gases or products harmless. For example, in some embodiments, these substances are broken down into at least $CO_2$, $H_2O$, and $O_2$. In some embodiments, the substances are broken down into substantially only $CO_2$, $H_2O$, and $O_2$.

In some cases, the liquid mixture 102 may include only the liquid fuel and liquid water, with no other material in the mixture 102. The liquid mixture 102 may include other materials in addition to the liquid fuel and liquid water. For example, the liquid mixture 102 may include additional and/or different liquids, gases, and/or solids. In some cases, additional water can be added to the liquid mixture 102 to boost the power output of the gas turbine system 100.

The liquid mixture 102 may include fluids from a fluid source. Many different types of fluid source are contemplated. Some example fluid sources include wine-making facilities, ethanol production facilities, landfills, alcohol production facilities, oil refineries, steel mills, chemical plants, oil fields, restaurants, and/or other sources of liquid fuel and/or liquid water.

The liquid mixture 102 can be communicated from the fluid tank 104 into the evaporation chamber 118. In the example system 100 shown, a conduit 106 and a pressurizing device 108 provide fluid communication between an outlet of the fluid tank 104 and an inlet of an evaporation chamber 118. The pressurizing device 108 can be a pump or another type of device that induces fluid flow from the tank 104 into the evaporation chamber 118. The evaporation chamber 118 may include a heat exchanger or another type of heating device that increases the temperature of the liquid mixture 102.

The increase in temperature of the liquid mixture may increase the rate at which the liquids in the evaporation chamber 118 evaporate. Exhaust from the turbine system 100 and/or other sources of heat energy may be used to heat the liquids in the evaporation chamber 118. In the example shown, a conduit 124 provides heat energy to the evaporation chamber 118 from the heat exchanger 122. After imparting heat energy to the evaporation chamber 118, the exhaust may be vented to the atmosphere through the outlet 112.

The liquid mixture 102 evaporates in the evaporation chamber 118 to form a gas mixture. The gas mixture generated in the evaporation chamber 118 may include fuel vapors from the liquid fuel in the mixture 102 and/or water vapors from the liquid water in the mixture 102. For example, heating a liquid mixture of ethanol and water mixture can evaporate both the ethanol and the water. The ratio of the evaporated substances may be based on partial pressures.

Evaporating the liquid mixture 102 may include evaporating water to form a gas mixture that includes gaseous water, and evaporating the liquid mixture 102 may include evaporating fuel to form a gas mixture that includes gaseous fuel. The gas mixture may include any gaseous state, such as a vapor state and/or another type of gaseous state generated by an evaporation process. For example, the gas mixture can include a vaporized liquid, such as water vapor and/or fuel vapor, resulting from any type of vaporization process. In a vapor state, the partial pressure of the vapor can be at or above the boiling point pressure, and/or the temperature of the vapor can be at or above the boiling point temperature. The gas mixture may be below the boiling point temperature and/or boiling point pressure.

The evaporation process for a liquid may include a liquid-to-gas phase transition at a temperature below the boiling point of the liquid. The evaporation process may include additional and/or different types of vaporization processes. For example, in some instances, the evaporation process may include boiling and/or other thermodynamic processes that form a gas from a liquid. Heat for evaporating the liquid mixture 102 may be provided partially or entirely by exhaust gas from the heat exchanger 122. In addition to the fuel and/or water, the gas mixture formed in the evaporation chamber 118 may also include other materials. For example, vapors from the liquid mixture 102 may be mixed with additional and/or different liquids, gases, and/or solids.

The gas mixture formed in the evaporation chamber 118 may be communicated into the reaction chamber 101. In the example shown in FIG. 4, the gas mixture that includes the evaporated water and the evaporated fuel is communicated into the conduit 120, and from the conduit 120 into the conduit 128 to be mixed with the compressed and pre-heated air from the heat exchanger 122. Because the evaporation chamber 118 in FIG. 4 generates a gaseous mixture of fuel and water, mixing the output from the evaporation chamber 118 with the air in the conduit 120 forms a gas-phase mixture of air, fuel, and water. The air/fuel/water mixture may have a low concentration of fuel, for example, below the lower explosive limit (LEL) concentration for the fuel.

The mixture may have a low heating value, for example, approximately 15 btu/scf or lower, or the mixture may have a higher heating value. The mixture may be a non-combustible mixture, for example, unable to sustain an open flame. In some implementations, the fuel evaporated from the liquid mixture 102 is sufficient to sustain operation of the system 100.

The system 100 may additionally include a mixer (not shown) that can mix the air with the evaporated mixture of fuel and water. The air may be mixed with the fuel and water without a mixer device, for example, by injecting the evaporated mixture fuel into a stream of air. In some examples, air, fuel, water, and/or other substances may be mixed at additional and/or different points in the system 100. For example, air from the air source 110 may be combined with additional fuel prior to communicating the air into the compressor 114. In some instances, the reaction chamber 101 may include an air inlet that introduces air from the air source 110 directly into the reaction chamber 101. In some implementations, the air may be introduced into the reaction chamber 101 as a control flow, for example, to cool regions of high temperature in the reaction chamber 101. In some implementations, the air and the evaporated mixture may be communicated separately into the reaction chamber 101 to form an air/fuel/water mixture in the reaction chamber 101.

The reaction chamber 101 retains the air and fuel as the fuel oxidizes. Oxidation of the fuel in the reaction chamber 101 may be initiated by raising the fuel temperature to or above an auto-ignition temperature of the fuel. The system 100 may initiate oxidation in the reaction chamber 101 independent of oxidation catalyst materials (e.g., platinum) and/or independent of an ignition source (e.g., a flame or spark). Fuel may be oxidized with air in the reaction chamber 101 without raising the temperature of the air/fuel mixture above a threshold temperature, for example, by maintaining the maximum temperature of the fuel in the reaction chamber below the threshold temperature.

The threshold temperature may be determined based on one or more factors, for example, the threshold temperature can be a recommended or maximum operating temperature of the turbine, a recommended or maximum inlet temperature for the turbine, a temperature that causes formation of nitrogen oxides, a temperature selected based on the flow rate of the fuel through the reaction chamber 101, and/or other factors.

In some implementations, fuel is oxidized in the reaction chamber 101 below a temperature that causes formation of nitrogen oxides. As such, the reaction chamber 101 can oxidize virtually all of the fuel while producing only minimal amounts of nitrogen oxides. For example, exhaust gas from the system 100 may include less than one part per million of each of nitrogen oxide, VOCs and CO, and may even reduce the concentrations of VOCs and CO contained in the incoming air.

The reaction chamber 101 may include an internal volume lined with insulating refractory material. High temperature heat-absorbing and/or heat-resistant material, such as ceramic or rock, called fill material, may be provided in the reaction chamber 101. The fill material may have a thermal mass that facilitates slow oxidation of weak fuels flowing through the reaction chamber 101. The thermal mass may help stabilize temperatures for gradual oxidation of the fuel by transmitting heat to the incoming gases and receiving heat from the oxidized gases.

In some cases, the thermal mass of refractory materials in the reaction chamber 101 may act as a dampener, absorbing heat and preventing excessive temperatures that could damage the turbine and/or produce unwanted byproducts (e.g., nitrogen oxides, carbon dioxides, volatile organic compounds and/or others). In some cases, the thermal mass of the refractory materials in the reaction chamber 101 may provide a temporary source of heat energy, which may help sustain oxidation of the fuel.

The volume and shape of the reaction chamber 101, and the configuration of the overall system, can be designed to provide a controlled flow and flow rate through the chamber, allowing sufficient residence time for complete fuel oxidation. The flow path can be sufficiently long that a flow rate of the air and fuel mixture along the flow path, averaged over the length of the flow path, allows the fuel to oxidize to completion. As an example, the average residence time of the gas in the chamber can be equal to or greater than one second in some cases. The average residence time of the gas in the chamber can be less than one second in some cases. In some embodiments, the residence time of the gas in the chamber can range from about 0.1 second to about 10 seconds. In some embodiments, the residence time of the gas in the chamber can range from about 0.5 second to about 5 seconds. In some embodiments, the residence time of the gas in the chamber can range from about 0.5 second to about 2 seconds. In some embodiments, the residence time of the gas in the chamber can range from about 0.5 second to about 1 second. In some embodiments, the residence time of the gas in the chamber can range from about 1 second to about 2 seconds. In some embodiments, the residence time of the gas in the chamber can be less than about 0.1 second or more than about 10 seconds. The rate of oxidation of the mixture is a function of the constituents of the fuel, fuel concentration, oxygen concentration, pressure, temperature and other factors. Thus, the rate of oxidation can be adjusted by adjusting these parameters accordingly.

The reaction chamber 101 may also include one or more sensors for detecting properties such as temperature, pressure, flow rate, or other properties relevant to the startup and/or operation of the gas turbine system 100. The reaction chamber 101 may also include internal structures and/or devices that control aspects of the oxidation process. For example, the reaction chamber 101 may include flow diverters, valves, and/or other features that control temperature, pressure, flow rate, and/or other aspects of fluids in the reaction chamber.

The reaction chamber 101 may include one or more inlets. Each of the inlets may communicate air, fuel, water, or any combination of these into the reaction chamber. For example, the gaseous fuel/water mixture from the evaporation chamber 118 may be communicated directly into the reaction chamber 101. In some implementations, the liquid mixture 102 may be communicated directly into the reaction chamber 101 in a liquid state. The reaction chamber 101 includes one or more outlets that communicate oxidized fuel and/or other materials to the turbine 115.

In the example shown, an exhaust pipe 132 communicates exhaust to an inlet of the turbine 115 through a conduit 130. During a heating process and/or during sustained operation, the gas exiting the reaction chamber 101 through the outlets may include completely oxidized fuel products, non-reactive gases, and only trace amounts of nitrogen oxides and carbon dioxide. In some instances, the gas exiting the reaction chamber 101 through the outlets may include more than trace amounts of unoxidized fuel, nitrogen oxides, carbon dioxide, and/or other materials.

In operation, the reaction chamber 101 may be pressurized, for example, above an atmospheric pressure and/or above an ambient pressure about the exterior of the reaction chamber 101. Pressure in the reaction chamber may be provided by the compressor 114 and/or another pressurizing device. In some instances, the pressure in the pressurized reaction chamber 101 is more than two pounds per square inch gauge (i.e., more than two pounds per square inch above the ambient pressure about the exterior of the reaction chamber). In some instances, the pressure in the reaction chamber 101 is ten to fifty pounds per square inch gauge during operation, or more.

Materials communicated into the pressurized reaction chamber 101 can be introduced into the reaction chamber 101 at a high pressure, e.g., a pressure higher than the pressure inside the reaction chamber 101. For example, the air, fuel, and/or water may be introduced into the pressurized reaction chamber 101 at or above the internal pressure of the reaction chamber 101. The high pressure in the reaction chamber 101 induces fluid communication from the reaction chamber into the turbine 115, which allows output gas from the reaction chamber 101 to power the turbine.

The turbine 115 converts energy of the oxidation product gas to rotational mechanical energy. The example turbine 115 receives the oxidized fuel through a turbine inlet, expands the oxidized fuel between the turbine inlet and a turbine outlet, and communicates the expanded gas through the turbine outlet. The turbine 115 may transmit mechanical rotational energy to the compressor 114 through the shaft 105. The turbine 115 may transmit mechanical rotational energy to the generator 119 through the shaft 105. In some implementations, the system 100 may include a turbine that operates in a different manner.

The generator 119 converts rotational energy from the turbine 115 to electrical energy. For example, the generator 119 can output electrical power to a power grid or to a system that stores and/or operates on electrical power. In some implementations, the generator 119 may provide mechanical energy to the compressor 114 during startup. For example, the generator may be capable of operating in a motoring mode that converts electrical power to mechanical energy. In some instances, the system 100 may operate without providing energy to the generator 119. For example, the system 100 may operate as a thermal oxidizer to destroy fuel and/or other materials (e.g., materials in the liquid mixture 102) independent of outputting power.

In some aspects of operation of the example system 100, the reaction chamber 101 operates in a reactive state. The air source 110 provides air to the compressor 114. The compressor 114 compresses the air and communicates the compressed air to the heat exchanger 122. The heat exchanger 122 heats the compressed air. The liquid mixture 102, which includes liquid fuel and liquid water, is communicated into the evaporation chamber 118 through the pressurizing device 108. The liquid mixture 102 is evaporated in the evaporation chamber 118 to form a gas mixture. The gas mixture includes fuel and water both in a gas phase, which may include fuel and/or water vapor. The gas mixture is combined with the heated, compressed air in the conduit 128. The resulting mixture of air, fuel, and water is introduced into the reaction chamber 101. The mixture is heated and the fuel is oxidized in the reaction chamber 101.

In some implementations, the mixture remains in the reaction chamber 101 long enough to oxidize substantially all of the fuel in the mixture. In some cases, the heat released in the reaction chamber 101 by oxidizing the evaporated fuel from the liquid mixture 102 may provide sufficient heat energy to heat incoming fuel to the oxidation temperature while maintain the internal temperature of the reaction chamber 101 above the temperature required to oxidize the fuel and power the turbine 115.

Output gas, which includes the oxidation product gas and water, is communicated through the reaction chamber 101 to a reaction chamber outlet to the turbine 115. The temperature of the output gas exiting the reaction chamber may be approximately 1600° F. or higher, or the output gas may have a lower temperature. The output gas may be filtered prior to entering the turbine inlet. The oxidation product gas may be cooled with fluid (e.g., air and/or another gas or liquid) applied to the oxidation product prior to the turbine 115, for example, to prevent overheating the turbine 115.

The output gas powers the turbine 115, and the turbine 115 converts thermal energy of the output gas to rotational mechanical energy. The rotational mechanical energy of the turbine 115 drives the compressor 114 and/or the generator 119. The turbine 115 communicates the output gas from an outlet of the turbine 115 to the heat exchanger 122. The output gas provides heat energy to the heat exchanger 122. The output gas may also be communicated to the evaporation chamber 118 and provide heat energy to the evaporation chamber 118. The output gas exits the system, for example, through an exhaust stack.

The oxidation system is able to operate as a pollution control device by processing waste water, waste liquids, and waste mixes with any concentration of fuel or pollutants. The system is also able to process waste gases and waste mixes in concentrations that are unsuitable to provide a self sustainable reaction by supplying additional liquid fuels or gas fuels to sustain the reaction. Accordingly, the system is able to provide waste destruction of gases and/or liquids, while providing the benefits of higher efficiency, increased power, and improved environmentally safe byproduct.

Figure 5:
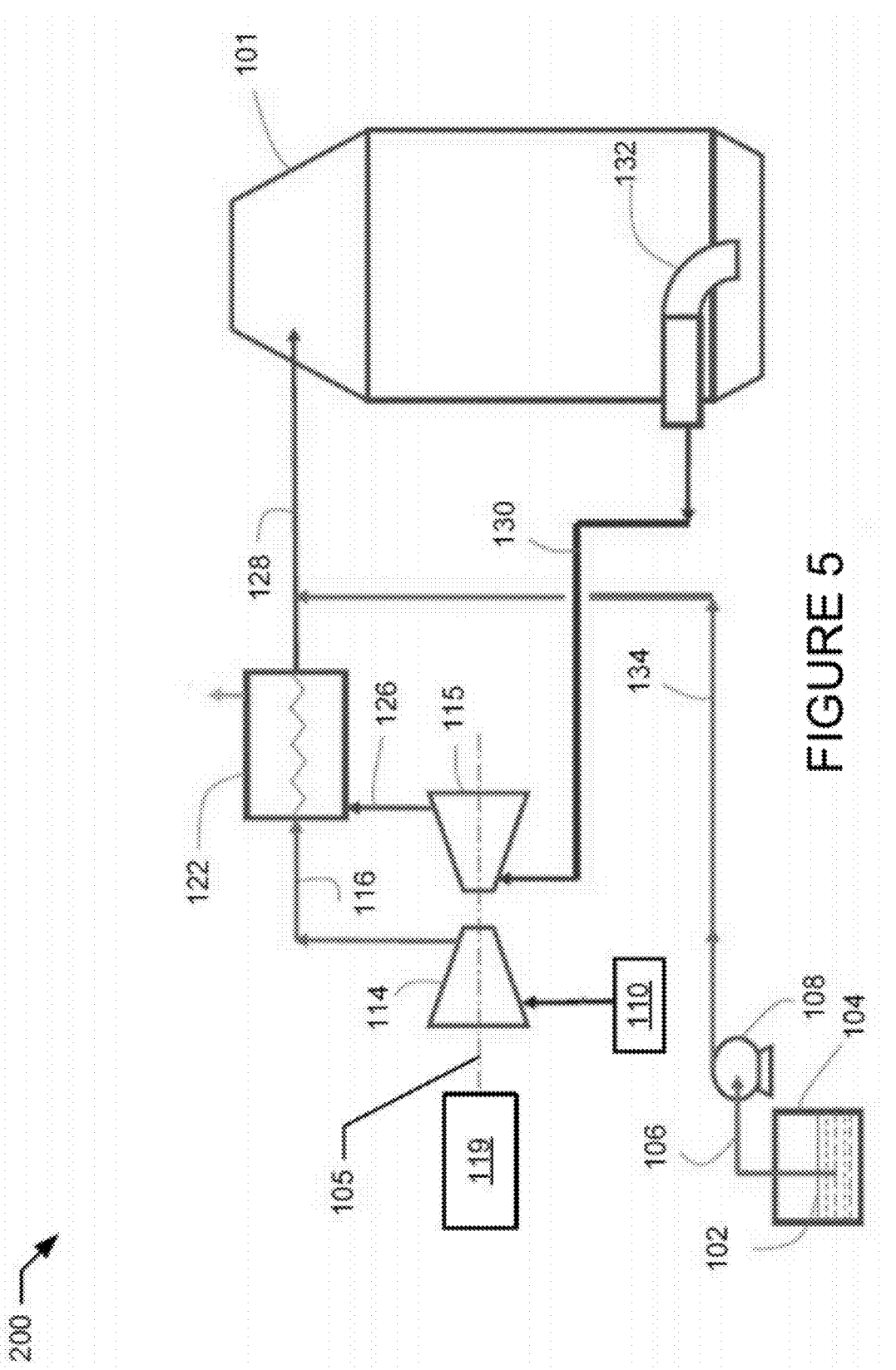
FIG. 5 is a diagram of further embodiments of a gas turbine system.

FIG. 5 shows another example gas turbine system 200 that can utilize fuels that are mixed with water. These embodiments include contaminants from a gasifier that can be oxidized in a reaction chamber 101 through a gradual oxidation process. In the example system 200, the liquid mixture 102 is introduced into the heated air stream in the conduit 128. The liquid mixture 102 is communicated from the tank 104 by the pressurizing device 108, and from the pressurizing device 108 through the conduit 134. The liquid mixture 102 in FIG. 5 is communicated from the conduit 134 into the conduit 128, where the liquid mixture 102 is mixed with heated air. The heat energy from the heated air in the conduit 128 evaporates the liquid mixture 102 to form a gas mixture. As such, the example system 200 does not require a separate evaporation chamber. The thermal energy in the air may be sufficient to evaporate the liquid mixture 102 prior to entering the reaction chamber 101. Other aspects of the system 200 may operate substantially as described with respect to the example system 100 in FIG. 4.

In FIG. 5, the liquid mixture 102 is shown entering the air stream downstream of heat exchanger 122. The liquid mixture 102 may additionally or alternatively be introduced upstream of the heat exchanger 122, provided the thermal energy in the air is sufficient to evaporate the mixture. While this approach may reduce the efficiency of the system, it may allow for even weaker fuel/water mixtures to be used. In addition, the exhaust heat at the outlet of the heat exchanger 122 is available for other applications.

Figure 6:
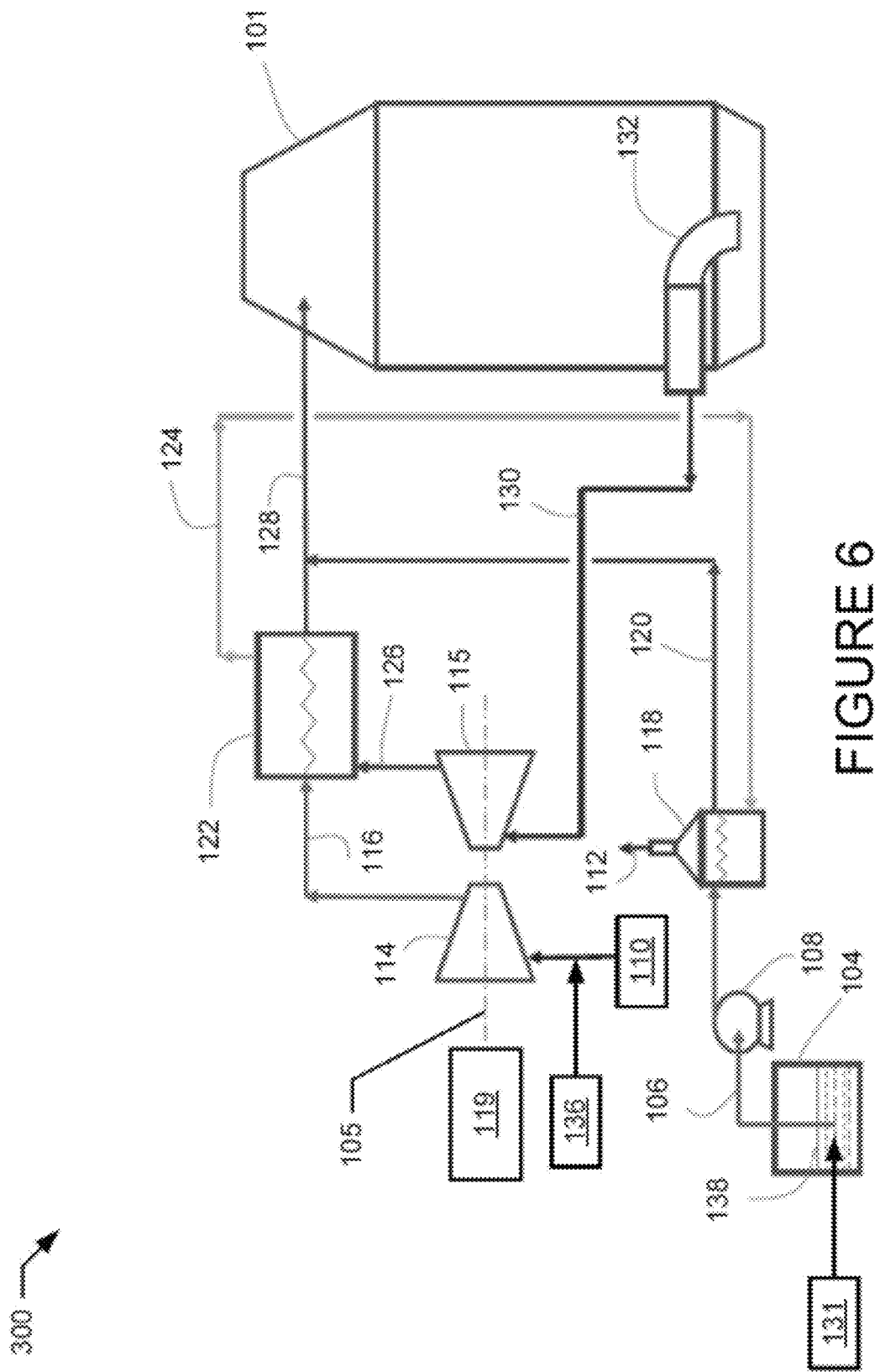
FIG. 6 is a diagram of further embodiments of a gas turbine system.

FIG. 6 shows an example of a gas turbine system 300 that can process liquids. The system 300 includes a fuel source 136 and a liquid source 131. In some embodiments, the liquid source 131 can be supplied with liquid (e.g., water) from a gasifier. In such embodiments, the liquid may include contaminants that can be oxidized during a gradual oxidation process in a reaction chamber 101. The liquid mixture 138 in the fluid tank 104 includes liquid from the liquid source 131. In some implementations, the system 300 is powered by a combination of liquid fuel and gaseous fuel. For example, the gaseous fuel may be provided by the fuel source 136, and the liquid fuel may be provided by the liquid source 131. In some implementations, the system 300 is powered only or primarily by liquid fuel from the liquid source 131, and the fuel source provides little or no additional fuel. In some implementations, the system 300 is powered only or primarily by gaseous fuel from the fuel source 136, and the liquid source 131 provides little or no additional fuel.

The example fuel source 136 provides fuel to the system 300, in some instances, for sustaining an oxidation process in the reaction chamber 101 and/or for heating the reaction chamber 101. The example system 300 can utilize fuel that is initially gaseous and/or the system 300 can utilize liquid or solid fuels that can be converted into gas or vapor.

The fuel source 136 may provide a single type of fuel and/or multiple different types of fuel, one or all of which may be oxidized in the reaction chamber 101. The fuel source 136 may provide hydrocarbon fuel and/or other types of fuel. The fuel source 136 may provide weak fuel. Weak fuels may include low BTU gases (i.e., low energy per unit mass) and/or fuels having low calorific value. Weak fuels may include gases containing fuels below a concentration that can sustain an open flame and/or other combustion reaction. For example, fuel may be mixed with air with the resultant fuel concentration below a lower explosive limit (LEL) for the fuel.

In some instances, introducing such a weak fuel to a spark or flame, even in the presence of air, may snuff out the spark or flame without oxidizing the fuel in the mixture. However, when the weak fuel is raised to a temperature above its auto-ignition temperature, the fuel can oxidize in the presence of air without introduction of a spark or flame. A specific example of weak fuels include gas that is mostly carbon dioxide or nitrogen, containing small quantities of methane, ethane, carbon monoxide, and other types of fuel. Such gas is often emitted from so-called unproductive natural gas wells. The fuel source 136 may provide fuels other than, or in addition to, weak fuels. For example, in some implementations, the fuel source 136 may provide propane, butane, kerosene, gasoline, and/or other types of fuels in addition to, or instead of, weak fuels. In some cases, the fuel source 136 may provide hydrogen fuel.

The fuel source 136 may include gas emanated from a landfill, which may contain only a small percentage of methane fuel (e.g., 3 percent or less). A gas having such a low concentration of methane may be below a lower explosive limit. The lower explosive limit (LEL) of a fuel may refer to the lowest concentration of the fuel in air capable of producing a flash of fire in presence of an ignition source. Concentrations lower than the LEL are typically too weak for combustion. Different types of fuel have different LEL values, typically in the range of approximately 1 percent to 5 percent by volume, although some fuels have an LEL outside of this approximate range. Some particular examples of LEL values are (approximately, on a volumetric basis) 3 percent for ethane, 4 percent for hydrogen, 5 percent for methane, and 2 percent for propane.

Fuel from the fuel source 136 can be a natural (e.g., non-anthropological) fuel source or a human-made (e.g., anthropological) fuel source. For example, the fuel source 136 may provide methane from cattle belches, a swampland, a rice farm, and/or methane produced by fermentation or other biological or chemical processing of organic matter. Other example fuel sources can include manure, municipal waste, wetlands, gas seeping from leaks in the system 300 or other systems, and drilling and recovery operations. In some implementations, the fuel source 136 includes fuel mixed with water, and fuel from the fuel source 136 includes water vapor. In some implementations the fuel source 136 communicates only a gas fuel to the system 300. One or more supplemental fuel sources may also be utilized by the system 300. For example, gas fuels can be provided to the system by fuel source 136, and liquid fuels can be provided to the system 300 by liquid source 131.

In instances where a solid fuel is provided, a conversion process can be used to convert the solid fuel to a gas fuel, which can then be used by the system 300 by injecting the gas of fuel via the fuel source 136. The conversion process can include a gasifier, as explained above. In instances where a liquid fuel is provided, the liquid fuel can be added to the liquid tank 104 by liquid source 131, which is drawn into the system with the liquid mixture 138. Accordingly, the system 300 can be suited to accommodate fuels in solid, liquid, or gaseous form.

The liquid source 131 provides all or part of the liquid mixture 138 in the fluid tank 104. The liquid mixture 138 provided by the liquid source 131 may include, or may be identical to, the liquid mixture 102 described with respect to other embodiments described herein. The liquid source 131 may include multiple different sources of liquid water, liquid fuel, and/or other liquids to be processed by the system 300. In some embodiments, the liquid mixture 102 includes contaminants from scrubbing a gas stream in a gasifier. In some implementations, the liquid source 131 provides only liquid water, only liquid fuel, or some combination of the two.

Some example fluid sources include wine-making facilities, ethanol production facilities, landfills, alcohol production facilities, coal mines, oil refineries, steel mills, chemical plants, oil fields, marshlands, sewage treatment facilities, and/or other sources of liquid fuel and/or liquid water. For example, streams in wine making, ethanol production and brewing may have off-spec products containing water that can be processed in the system 300. Ethanol is made in hundreds of ways, for example at stills large and small, any of which may be used as the liquid source 131. As the field of biofuels expands, more and more feed-stocks are used to make ethanol. In cases where raw materials such as algae, kudzu and wood are used for ethanol production, the system 300 may destroy lignin, fiber and marginal streams.

The liquid mixture 138 may include many different concentrations of alcohol, such as 40 proof, 100 proof, and/or other concentrations. As such, the system 300 could be located, for example, at a brewery, a biorefinery or ethanol plant to consume by-products at the plant. The system 300 could also be at a separate location and receive the by-products by delivery or distribution. In addition to these examples, the liquid mixture 138 may be received and/or produced in a different manner.

The system 300 may operate based on fuel from the fuel source 136, the system 300 may operate based on fuel from the liquid source 131, and/or the system 300 may operate based on fuel from both the fuel source 136 and the liquid source 131 at the same time and/or at different times. For example, the system 300 can run on kerosene or ethanol from the liquid source 131 initially at coal mines, where power is needed to drill wells to recover and drain methane. As methane is collected from the coal mines, the methane could serve as the fuel source 136, and could displace the kerosene or ethanol until the drained methane alone fuels the system 300.

Once the drained methane has been sufficiently depleted, the system 300 can operate on the mine's vent methane, providing clean power and destroying greenhouse gas. At steel mills, clean power could be supplied by a the system 300 running on kerosene or ethanol from the liquid source 131. When a blast furnace gas becomes available, the system 300 could operate on blast furnace gas from the fuel source 136. At oil refineries or chemical plants, VOC-bearing waste gas could fuel the system 300 instead being burned in a thermal oxidizer. Off-spec by-products such as naphtha can be used as supplementary fuel and produce clean power, for example, instead of being collected and transported by trucks to a disposal site. Low methane content gas from landfills can be combined with gas from oil and gas operations in proximity to the landfill to generate clean power. In addition to these example, the system 300 may operate based on liquid fuels and gaseous fuels in a different manner.

When the liquid mixture 138 includes liquid fuel, the system 300 may operate substantially as the system 100 of FIG. 4. For example, the evaporation chamber 118 may evaporate the liquid mixture 138, and the resulting gas mixture may be combined with air and communicated into the reaction chamber 101. The evaporated fuel from the evaporation chamber 118 may power the system 300 without fuel from the fuel source 136. In some cases, the air stream from the heat exchanger 122 includes fuel from the fuel source 136. As such, the fuel from the fuel source 136 and the evaporated fuel from the evaporation chamber 118 may be combined, and both may be simultaneously oxidized in the reaction chamber 101.

In some implementations, the liquid mixture 138 does not include significant amounts of liquid fuel, and the system 300 operates completely or substantially completely on fuel from the fuel source 136. For example, the liquid mixture 138 may include liquid water and/or other materials that do not release significant amounts of heat energy when they are processed in the reaction chamber 101. In such cases, heat released in the reaction chamber 101 by oxidizing fuel from the fuel source 136 may destroy contaminants, byproducts, and/or other materials in the liquid mixture 138. As an example, liquid water from a landfill may contain toxic materials and/or other types of contaminants that can be destroyed in the reaction chamber 101. As such, the liquid source 131 may be a landfill well that produces landfill fluids. The landfill fluids may include methane that is provided to the fuel source 136, and the landfill fluids may include water that is condensed and provided to the fluid tank 104.

In the example system 300, the liquid mixture 138 is evaporated in the evaporation chamber 118 using heat from the heat exchanger 122, as in the system 100 of FIG. 4. The liquid mixture 138 may alternatively or additionally be evaporated in another manner. For example, the liquid mixture 138 may be evaporated by injecting the mixture into a stream of hot air as in the system 200 of FIG. 5; in some implementations, the liquid mixture 138 may be evaporated in the reaction chamber 101.

In some embodiments, combustion gases can be added via fuel source 136 to adjust performance or operation of the system 300. For example, in embodiments where a low fuel content mixture does not contain enough fuel for self-sustainable destruction, or in which the oxidation process is incapable of being maintained based on fuel content in the liquid mixture 138 alone, combustion gases can be added with air at the air source 110 through fuel source 136 to provide sufficient fuel for the self-sustaining oxidation process. Combustion gases that can be added through fuel source 136 include, for example without limitation, hydrogen, methane, ethane, ethylene, natural gas, propane, propylene, propadiene, n-butane, iso-butane, butylene-1, butadiene, iso-pentane, n-pentane, acetylene, hexane, and carbon monoxide.

The amount of combustion gases added by fuel source 136 can be adjusted based on the amount of fuel detected in the liquid mixture 138. If the liquid mixture 138 changes in fuel content such that an undesirable concentration of fuel is in the mixture 138, the amount of combustion gases added at the fuel source 136 can be increased or decreased in response. In some embodiments, the amount of combustion gases added at fuel source 136 is based on the amount of fuel content in the liquid mixture 138 received by the system 300. In some embodiments, the amount of combustion gases added at the fuel source 136 is based on a combination of the amount of fuel content in the liquid mixture 138 and a temperature within the reaction chamber 101. In some embodiments, the amount of combustion gases added at the fuel source 136 is based on a combination of the amount of fuel content in the liquid mixture 138 and a change in temperature or a rate in change of temperature within the reaction chamber 101.

The amount of fuel content in the liquid mixture 138 can be detected in the liquid tank 104, between the pressurizing device 108 and the evaporation chamber 118, or between the evaporation chamber 118 and the reaction chamber 101. As some of the fuel in the liquid mixture 138 may, in some instances, oxidize as the liquid mixture 138 is heated by the evaporation chamber 118, some embodiments provide that the fuel content of the liquid mixture 138 is detected between the evaporation chamber 118 and the reaction chamber 101. In such embodiments, the amount of combustion gases added at the fuel source 136 is based on the fuel content of the liquid mixture 138 detected between the evaporation chamber 118 and the reaction chamber 101.

In some instances, the liquid mixture 138 may contain additional components that may not be considered a fuel. For example, the liquid mixture 138 may comprise, in some embodiments, contaminants and water. The contaminated water can be the byproduct some other process, and the contaminated water is conducted to the system 300 to oxidize the contaminated, or waste, water. For example, the contaminated water can come from a scrubber that is part of a gasifier, as described above, which may be the liquid source 131. In the gasification process, water is used to cleanse the resultant gas fuel of contaminants prior to distributing the gas fuel for use. The contaminated water is then conducted to the system 300, for example by depositing the contaminated water in the liquid tank 104. The contaminated water is then drawn into the system 300 in a manner similar to that described above with respect to the liquid mixture 138, and the water is evaporated while the contaminants are oxidized in the reaction chamber 101. In this manner, the system 300 can operate as a means of treating and cleansing contaminated, toxic, or waste, water. The system 300 can operate as a pollution control device that cleans contaminated water, while producing minimal, if any, harmful gas byproduct.

In embodiments where the liquid mixture 138 includes a very low fuel content, a combination of a low fuel content and contaminated water, or contaminated water alone, a supplemental gas fuel can be introduced into the system 300 by fuel source 136, as explained above. In some embodiments, the gas fuel is substantially the only fuel that is sustaining the oxidation process in the reaction chamber 101. Some embodiments provide that the gas fuel is at least part of the gas fuel produced by a gasifier, and water from the gasifier scrubber is introduced to the system 300 by liquid source 131.

In some instances, contaminated water provided to the system 300 can be supplemented with a liquid fuel prior to oxidation in the reaction chamber 101. For example, if contaminated water from a gasifier is deposited into liquid tank 104, liquid fuel can be added to the liquid tank 104 to increase the fuel content of the liquid mixture 138. This process can be performed in addition to, or in place of, the introduction of a gas fuel by the fuel source 136.

The system 200 of FIG. 5 may be adapted to receive liquids from the liquid source 131 and/or fuel from the fuel source 136. In any of the systems 100, 200, 300, the liquid mixtures may be converted to a gas in the reaction chamber and/or prior to communicating the mixture into the reaction chamber. In cases where the liquid mixture is converted to a gas prior to the reaction chamber, the gaseous mixture may be combined with air, fuel, and/or other gases in the reaction chamber and/or prior to communicating the air, fuel, and other gases into the reaction chamber. Fluid communication through the systems 100, 200, 300, for example, between the various system components, may be measured by sensors and/or monitoring devices, may be controlled and/or regulated by control valves and other types of flow control devices, and/or may be contained by conduits, pipes, ports, chambers, and/or other types of structures. As such, the systems 100, 200, 300 may include additional devices, structures, and subsystems not specifically shown in the figures.

Figure 7A:
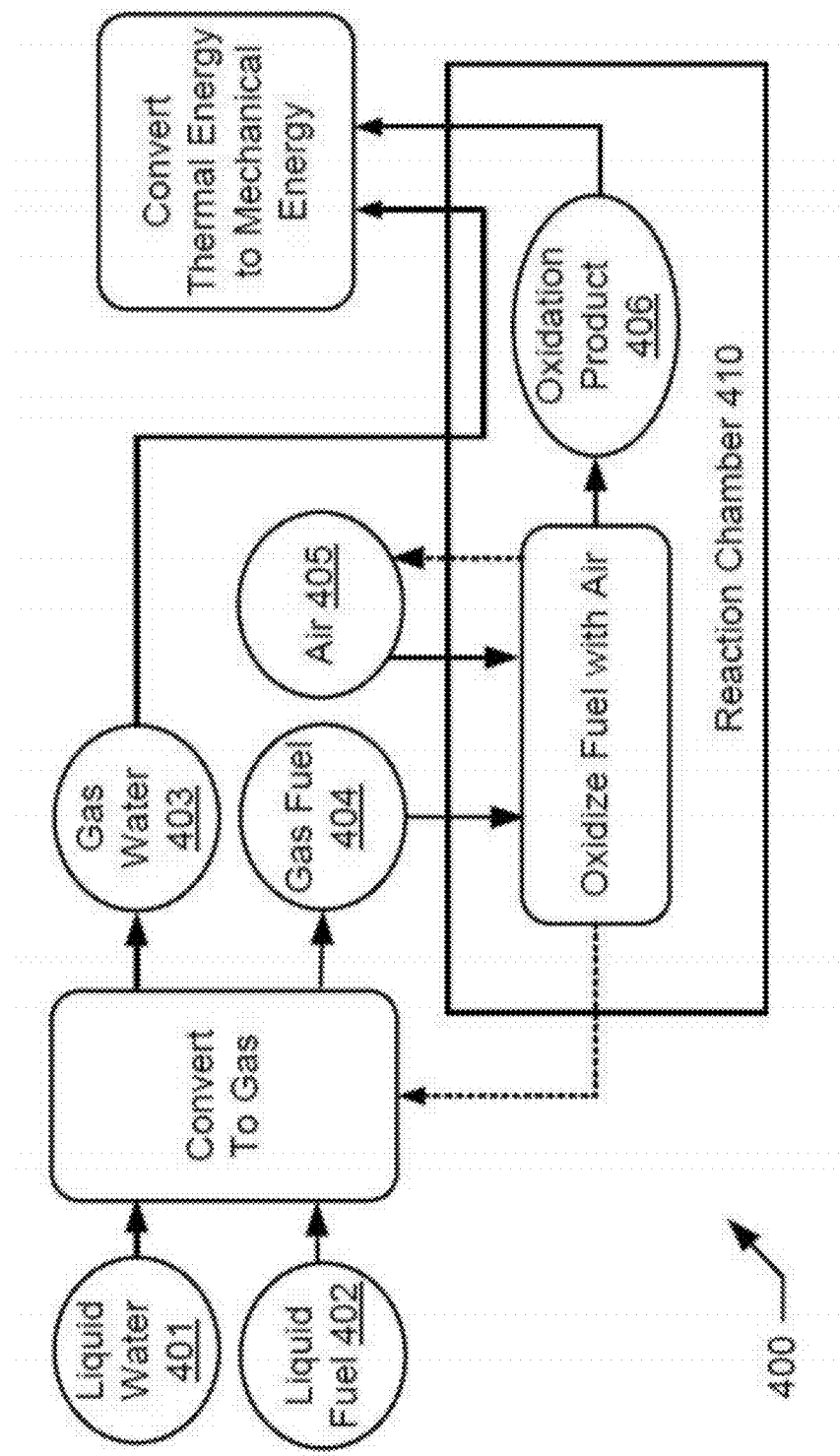
FIG. 7A is a schematic diagram showing fluid flow in an example oxidation reaction system.
Figure 7B:
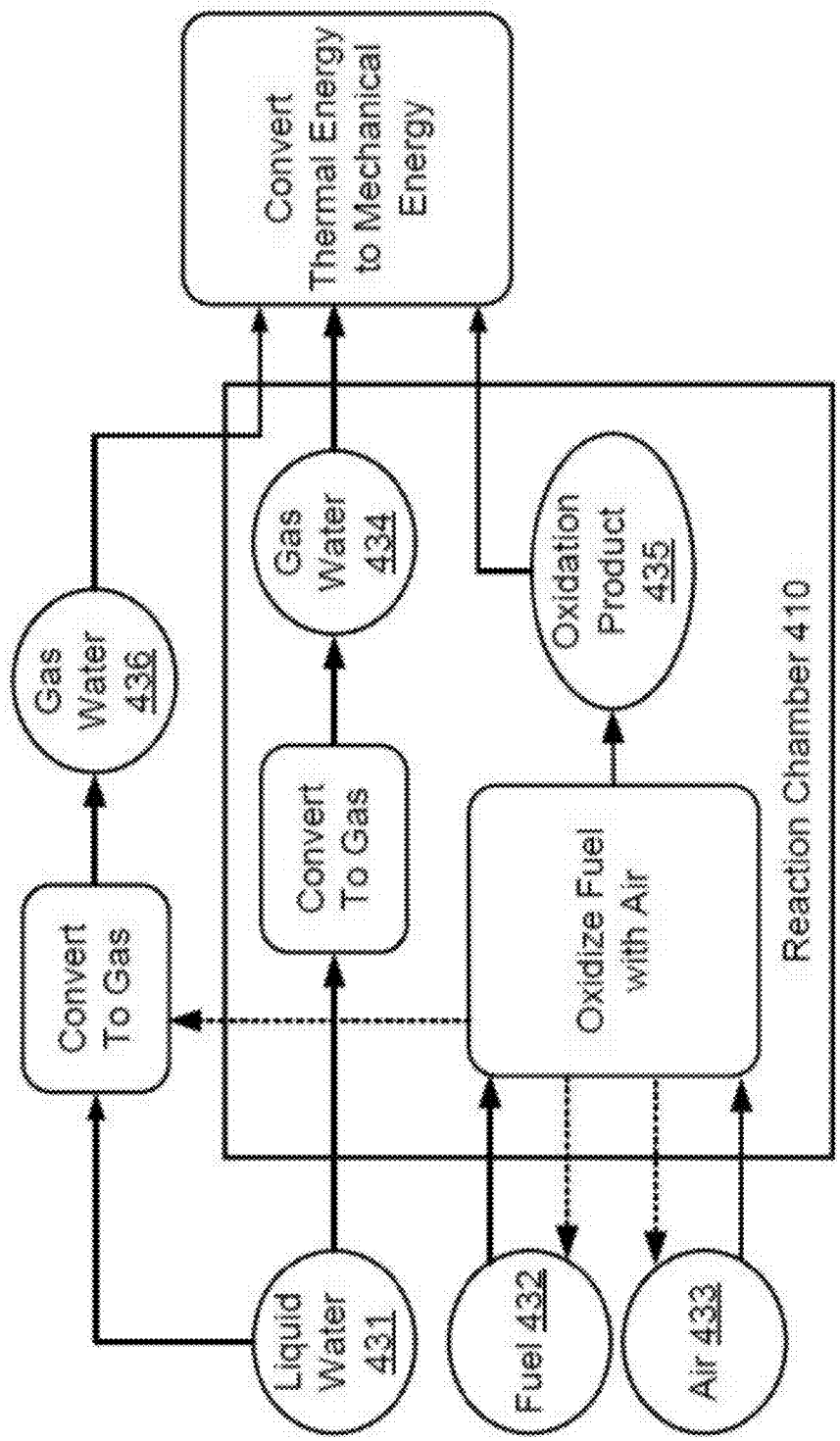
FIG. 7B is a schematic diagram showing fluid flow in an example oxidation reaction system.

FIGS. 7A and 7B are schematic diagrams showing fluid flow in example oxidation reaction systems. In FIGS. 7A and 7B, the flow of water, fuel, and air are shown schematically. Although the fluids are shown separately in the diagrams, in various implementations, the fluids may be mixed at one or more appropriate points. For example, the liquid water and liquid fuel shown in FIG. 7A may be constituents of the liquid mixture 102 of FIGS. 1A-2B. As another example, the fuel and air shown in FIG. 7B may be an air/fuel mixture received in the compressor 114 of FIG. 6.

Fluids are shown in FIGS. 7A and 7B entering and exiting a reaction chamber 410. Each of the fluids may be communicated into the reaction chamber 410 separate from the other fluids shown, and/or one or more of the fluids shown may be communicated into the reaction chamber 410 together with another fluid. For example, in some implementations, air and a fuel/water mixture are introduced into the reaction chamber 410 separately (i.e., the air through a first inlet and the fuel/water mixture through a second inlet), and in some implementations, the air and the fuel/water mixture are mixed to form an air/fuel/water mixture before the fuel enters the reaction chamber 410 (i.e., the air/fuel/water mixture may be introduced into the pressurized reaction chamber through a common inlet).

In some embodiments, air is mixed by a system with a mixture of fuel and water. In some embodiments the mixture of fuel and water is an evaporated gas. In some embodiments, an air/fuel mixture is mixed with a water mixture. In some embodiments, an air/fuel mixture is mixed with steam. In some embodiments, an air/fuel mixture is mixed with a mixture of fuel and water. In some embodiments, the mixture of fuel and water is an evaporated gas.

The dashed lines in FIGS. 7A and 7B are a schematic representation of heat energy from the reaction chamber used to increase the temperature of fluids outside the reaction chamber 410. In some implementations, the fluids are heated outside the reaction chamber 410 without heat from the reaction chamber 410, and one or more of the heat transfers represented in the figures may be omitted. In some implementations, additional and/or different fluids are heated outside the reaction chamber 410 by heat from the reaction chamber 410, and additional and/or different heat transfers are utilized.

FIGS. 7A and 7B both show fuel being oxidized with air in a reaction chamber 410. Fuel may be oxidized with air without raising the temperature of the fuel above a threshold temperature, for example, by maintaining the maximum temperature of the fuel in the reaction chamber below the threshold temperature. The threshold temperature may be a recommended or maximum operating temperature of the turbine, a recommended or maximum inlet temperature for the turbine, a temperature that causes formation of nitrogen oxides, a temperature selected based on the flow rate of the fuel through the reaction chamber 410 and/or other factors, etc. In some implementations, fuel is oxidized in the reaction chamber 410 below a temperature that causes formation of nitrogen oxides. The reaction chamber 410 can be the reaction chamber 101 shown in other embodiments described herein. The reaction chamber 410 may be a different type of oxidation reaction chamber. The reaction chamber 410 may be pressurized or non-pressurized.

In the examples shown, the heat energy released from oxidizing the fuel in the reaction chamber 410 is converted to mechanical energy. As such, a gas turbine, a steam turbine, and/or another system that converts thermal energy to mechanical energy may be used in connection with the reaction chamber 410. The mechanical energy may be converted to electrical energy, for example, by a generator. In some instances, the energy released from oxidizing the fuel in the reaction chamber 410 is used in additional or different manners.

In the example oxidation reaction system 400 shown in FIG. 7A, liquid water 401 and liquid fuel 402 are converted to gaseous water 403 and gaseous fuel 404. The fuel may include alcohol, kerosene, gasoline, and/or other types of fuel. The gaseous fuel 404 may include fuel vapor and/or fuel in another type of gaseous state. The gaseous water 403 may include water vapor and/or water in another type of gaseous state. The gaseous water 403, gaseous fuel 404, and the air 405 are communicated into the reaction chamber 410. The fuel 404 is oxidized with the air 405 in the reaction chamber 410, while the fuel 404, the air 405, and the water 403 are in the reaction chamber 410.

Contaminants, toxic materials, and/or other substances mixed with the water 403 may be destroyed, oxidized, and/or otherwise modified in the reaction chamber 410. Contaminants, which may include toxic materials, include substances that can be harmful to the environment and/or living organisms. The oxidation reaction of the fuel 404 and air 405 generates an oxidation product gas 406, which is communicated out of the reaction chamber 410 with the water 403. The thermal energy of the water 403 and the oxidation product 406 is converted to mechanical energy.

In the example oxidation reaction system 450 shown in FIG. 7B, liquid water 431 is communicated into the reaction chamber 410, and/or liquid water 431 is converted to gaseous water 436 outside of the reaction chamber. In implementations where the liquid water 431 is communicated into the reaction chamber 410, the liquid water 431 is converted to gaseous water 434 in the reaction chamber 410.

In implementations where the liquid water 431 is converted to gaseous water 436 outside of the reaction chamber 410, the gaseous water 436 is communicated into the reaction chamber 410. The fuel 432 and the air 433 are communicated into the reaction chamber 410. The fuel 432 is oxidized with the air 433 in the reaction chamber 410 while the fuel 432, the air 433, and the water 434 and/or the water 436 are in the reaction chamber. The oxidation reaction of the fuel 432 and air 433 generates an oxidation product gas 435, which is communicated out of the reaction chamber 410 with the water 434 and/or the water 436. The thermal energy of the water 434 and/or the water 436 and the oxidation product 435 is converted to mechanical energy.

In both the example systems 400, 450, the conversion from liquid to gas may include an evaporation process that utilizes heat from oxidizing the fuel in the reaction chamber 410. The conversion from liquid to gas may include evaporation, vaporization, boiling, and/or other types of processes. Contaminants, toxic materials, and/or other substances mixed with the water 403, 434, and/or 436 may be destroyed, oxidized, and/or otherwise modified in the reaction chamber 410 in either of the example systems 400, 450. The mass of the water 403, 434, and/or 436 may increase the mechanical energy output of the example systems 400, 450.

Figure 7C:
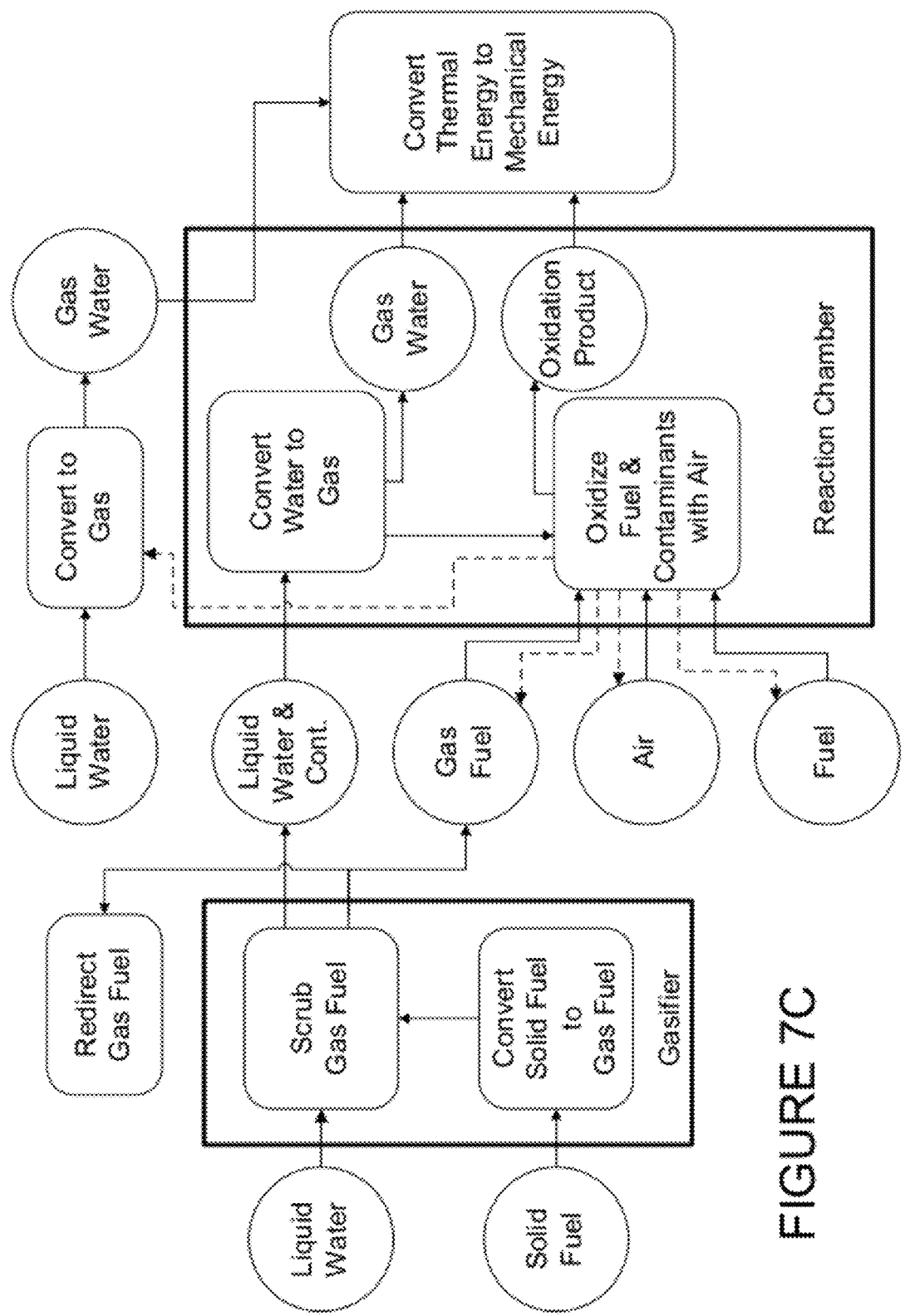
FIG. 7C is a schematic diagram showing fluid flow in an example oxidation reaction system.
Figure 7D:
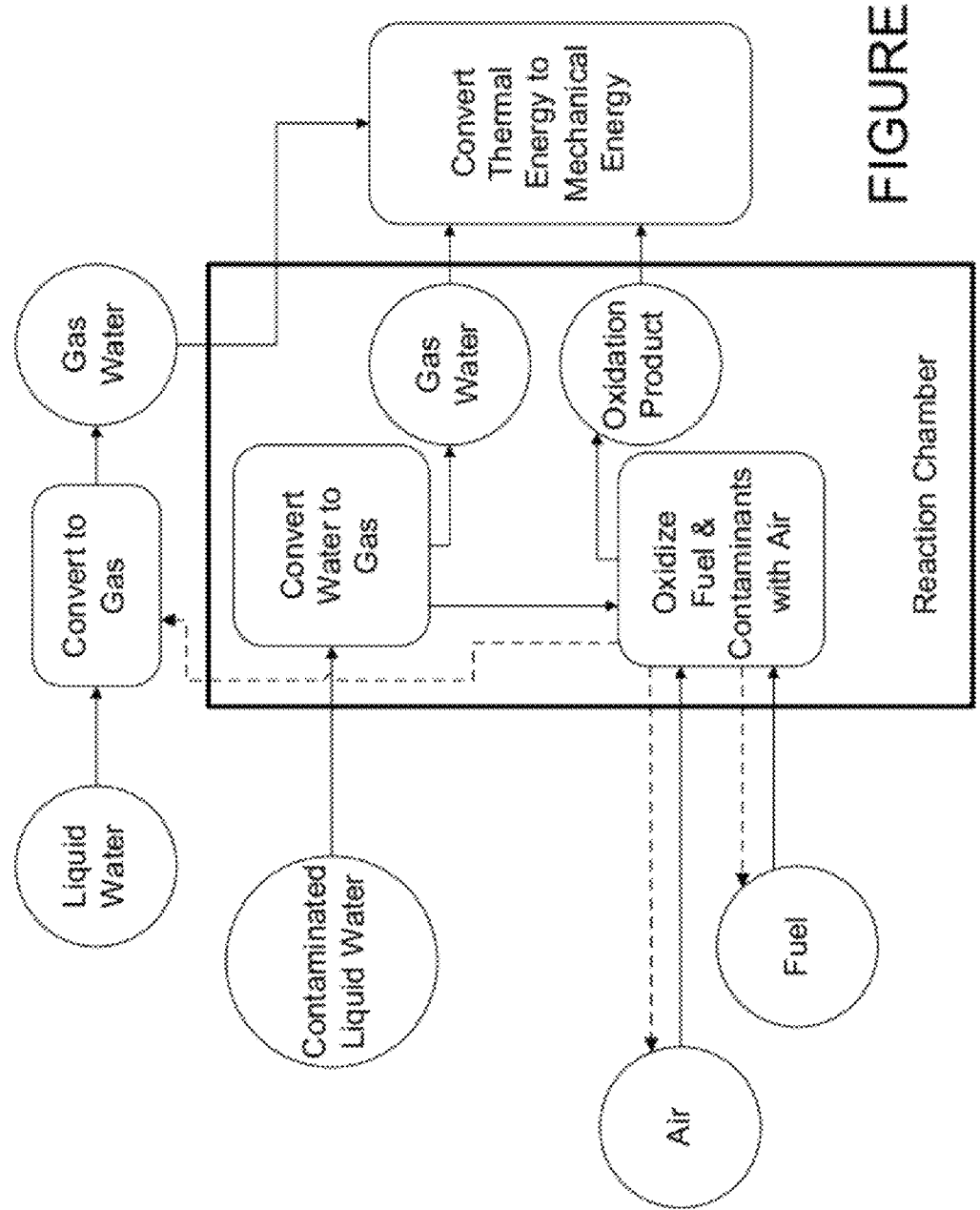
FIG. 7D is a schematic diagram showing fluid flow in an example oxidation reaction system.

FIGS. 7C and 7D are schematic diagrams depicting process is similar fashion as those illustrated in FIGS. 7A and 7B. FIGS. 7C and 7D show fluid flow in example oxidation reaction systems involving a gasifier (FIG. 7C) and not necessarily involving a gasifier (FIG. 7D). In FIGS. 7C and 7D, the flow of water, fuel, and air are shown schematically. Although the fluids are shown separately in the diagrams, in various implementations, the fluids may be mixed at one or more appropriate points. For example, the gas fuel and air between a gasifier in the reaction chamber in FIG. 7C are shown separately, and two may be constituents of a gas mixture.

In FIG. 7C, the gasifier receives solid fuel and converts the solid fuel to gas fuel. Liquid water is provided to scrub the gas fuel, and the scrubbed gas fuel leaves the gasifier and can be directly to the reaction chamber, or alternately, can be redirected for use outside the system. The contaminated liquid water used to scrub the gas fuel is also directed to the reaction chamber. Although the figure shows gas fuel being redirected from the system, this is an optional step, and in some embodiments, all the gas fuel produced by the gasifier is utilized by the reaction chamber. In some embodiments, as depicted, only a portion of the gas fuel produced by the gasifier is utilized by the reaction chamber.

Within the reaction chamber, liquid water is heated to gas water, and in some embodiments, gas water that has previously been heated is further heated in preparation for converting the thermal energy to mechanical energy. The contaminated liquid water received by the reaction chamber is converted gas water and the contaminants contained in the liquid water. The contaminants are oxidized with any fuel that is supplied to the reaction chamber and produces an oxidation product, which is then used with the gas water to convert thermal energy to mechanical energy.

Fluids are shown in FIG. 7C entering and exiting the reaction chamber. The fluids may be communicated into the reaction chamber separate from the other fluids shown, and/or one or more of the fluids shown may be communicated into the reaction chamber together with another fluid. For example, in some implementations, air and a fuel/water mixture are introduced into the reaction chamber separately (i.e., the air through a first inlet and the fuel/water mixture through a second inlet), and in some implementations, the air and the fuel/water mixture are mixed to form an air/fuel/water mixture before the fuel enters the reaction chamber (i.e., the air/fuel/water mixture may be introduced into the pressurized reaction chamber through a common inlet).

In some embodiments, air is mixed by a system with a mixture of fuel and water. In some embodiments the mixture of fuel and water is an evaporated gas. In some embodiments, an air/fuel mixture is mixed with a water mixture. In some embodiments, an air/fuel mixture is mixed with steam. In some embodiments, an air/fuel mixture is mixed with a mixture of fuel and water. In some embodiments, the mixture of fuel and water is an evaporated gas.

The dashed lines in FIGS. 7C and 7D are a schematic representation of heat energy from the reaction chamber used to increase the temperature of fluids outside the reaction chamber. This can be accomplished, for example, by the heat exchanger 122 or the evaporation chamber 118 in FIG. 4. In some implementations, the fluids are heated outside the reaction chamber without heat from the reaction chamber, and one or more of the heat transfers represented in the figures may be omitted. In some implementations, additional and/or different fluids are heated outside the reaction chamber by heat from the reaction chamber, and additional and/or different heat transfers are utilized. The conversion from liquid to gas may include an evaporation process that utilizes heat from oxidizing the fuel in the reaction chamber. The conversion from liquid to gas may include evaporation, vaporization, boiling, and/or other types of processes.

FIGS. 7C and 7D show fuel being oxidized with air in the reaction chamber. Fuel may be oxidized with air without raising the temperature of the fuel above a threshold temperature, for example, by maintaining the maximum temperature of the fuel in the reaction chamber below the threshold temperature. The threshold temperature may be a recommended or maximum operating temperature of the turbine, a recommended or maximum inlet temperature for the turbine, a temperature that causes formation of nitrogen oxides, a temperature selected based on the flow rate of the fuel through the reaction chamber and/or other factors, etc. In some implementations, fuel is oxidized in the reaction chamber below a temperature that causes formation of nitrogen oxides. The reaction chambers of FIGS. 7C and 7D, as well as other parts of the system, can be the reaction chambers shown in other embodiments described herein. The reaction chamber may be a different type of oxidation reaction chamber. The reaction chamber may be pressurized or non-pressurized.

In the example processes shown, heat energy released from oxidizing the fuel in the reaction chamber is converted to mechanical energy. A gas turbine, a steam turbine, and/or another system that converts thermal energy to mechanical energy may be used in connection with the reaction chamber. The mechanical energy may be converted to electrical energy, for example, by a generator. In some instances, the energy released from oxidizing the fuel in the reaction chamber is used in additional or different manners.

In the examples of FIGS. 7C and 7D, fuel is provided to the reaction chamber. The fuel can be gas fuel that is combined with the gas fuel from the gasifier. The fuel can also be liquid fuel that is supplied to the reaction chamber alone or in conjunction with liquid water. In some embodiments, the amount of gas fuel or liquid fuel supplemented to the system, in addition to the gas fuel from the gasifier and/or the contaminated liquid water, is based on a determination of the fuel content being supplied to the reaction chamber by (i) gas fuel from the gasifier, (ii) contaminants in the liquid water, or (iii) the combination of gas fuel from the gasifier and the contaminants in the liquid water.

In the oxidation reaction system shown in FIG. 7C, liquid water, liquid fuel, and contaminated liquid are converted to gaseous water, gaseous fuel, and contaminants. The fuel may include alcohol, kerosene, gasoline, and/or other types of fuel. The gaseous fuel may include fuel vapor and/or fuel in another type of gaseous state. The gaseous water may include water vapor and/or water in another type of gaseous state. The air, gaseous water, gaseous fuel, and contaminants are communicated into the reaction chamber or are converted into the gaseous state within the reaction chamber. The fuel and contaminants are oxidized with the air while they are in the reaction chamber.

As explained, contaminants, toxic materials, and/or other substances mixed with the water may be destroyed, oxidized, and/or otherwise modified in the reaction chamber. Contaminants, which may include toxic materials, include substances that can be harmful to the environment and/or living organisms. The oxidation reaction of the fuel, air, and contaminants generates an oxidation product gas, which is communicated out of the reaction chamber with the water. The thermal energy of the water and the oxidation product is converted to mechanical energy.

In the example oxidation reaction system shown in FIGS. 7C and 7D, liquid water is communicated into the reaction chamber, and/or liquid water is converted to gaseous water outside of the reaction chamber. In implementations where the liquid water is communicated into the reaction chamber, the liquid water is converted to gaseous water in the reaction chamber. In some embodiments, the liquid water is converted to gaseous water only within the reaction chamber, and in some embodiments, the liquid water is converted to gaseous water only outside the reaction chamber. In some embodiments, some of the liquid water is converted to gaseous water outside the reaction chamber and some of the liquid water is converted to gaseous water inside the reaction chamber. In implementations where the liquid water is converted to gaseous water outside of the reaction chamber, the gaseous water is directed into the reaction chamber for further heating of the gaseous water.

FIG. 7D illustrates similar processes as those shown in FIG. 7C. However, in the processes of FIG. 7D, the contaminated liquid does not necessarily originate from the scrubber of a gasifier. In FIG. 7D illustrates that the oxidation process of the reaction chamber can be utilized to treat and render substantially innocuous previously contaminated water that is supplied to the system. In some embodiments, the contaminated water is supplied to the system for the sole purpose of being treated, and the reaction chamber is able to oxidize contaminants in the water and to provide the resultant oxidation products and gas water for conversion of thermal energy to mechanical energy.

Although FIGS. 7A-7D describe the liquid and resultant gas as liquid water and gas water, the liquid can be a liquid other than water or the liquid water can comprise liquids other than water.

Injection of water or steam into combusted gas in gas turbines can increase output of the turbines. However, in order to compensate for the temperature reduction resulting from such injection, it has been necessary to increase the amount of fuel combusted, which leads to greater temperatures and results in increased formation of harmful NOx gas. In some embodiments, as mentioned above, the gradual oxidation system described herein can provide oxidation of fuels without increasing NOx formation, and while increasing output of the system, by providing water into the system.

As explained in connection with embodiments described herein, the fuel of the systems is oxidized as an air/fuel mixture flows along the flow path in the reaction chamber. The fuel is preferably oxidized by a flameless gradual oxidation process that destroys substantially all of the fuel. The fuel is preferably oxidized at a temperature sufficiently low to reduce or prevent formation and/or emission of harmful compounds, such as nitrogen oxides, and at a temperature sufficiently high to oxidize the fuel and other contaminants that are introduced into the chamber.

The air/fuel mixture flows through the reaction chamber and absorbs heat from the interior of the reaction chamber, which may include fill material optionally contained within the chamber. As a result, the temperature of the air/fuel mixture gradually increases as the mixture flows through the reaction chamber. When the temperature of the air/fuel mixture reaches or exceeds an auto-ignition temperature of the fuel, the fuel undergoes an exothermic oxidation reaction. Thus, the oxidation reaction may be initiated independent of an oxidation catalyst material or an ignition source. In some cases, a catalyst material may be provided in the reaction chamber to effectively lower the auto-ignition temperature of the fuel, but advantages of the systems described herein include operation of the reaction chamber to achieve a gradually oxidation of the air/fuel mixture without a catalyst.

When the fuel oxidizes, the exothermic reaction imparts heat to the reaction chamber and possibly fill material, and heat energy is communicated to another region of the flow path in the reaction chamber. The heat energy transferred through the reaction chamber may be imparted to incoming fuel to help initiate oxidation of the incoming fuel. The reaction chamber may be designed such that under a range of operating conditions (e.g., at maximum flow rate and fuel concentration), sufficient residence time and fuel temperature are provided to allow some or all of the fuels in the air/fuel mixture to oxidize substantially to completion. In some cases, the temperature of the air/fuel mixture in the reaction chamber can be controlled to maintain the maximum temperature of the air/fuel mixture substantially at or below a desired inlet temperature of the turbine.

As described above, several embodiments contemplate adding steam or water to the system for one or more of many reasons (e.g., to reduce likelihood of combustion, to control temperature, to increase efficiency and/or output, etc.). The differences between these systems and combustion systems as regards introduction of steam or water is significant. For example, introduction of the steam or water upstream of the gas turbine combustor can interfere with the completeness of combustion and may result in release of unburned hydrocarbons. Introduction of steam downstream of the gas turbine combustor will have a chilling effect on gases and will therefore require the combustor to provide additional fuel, increasing the maximum flame temperature and increasing the formation of harmful NOx emissions. Introduction of water downstream of the combustor will require more fuel to be combusted, further exacerbating the situation by forming even more harmful NOx.

Embodiments of the gradual oxidation systems described herein avoid such problems because they allows sufficient time to enable recovery from the potential upset conditions described above. These embodiments also have several other advantages. The reaction chamber is much larger than a combustor. It may be packed with ceramic fill material. Any dissolved solids that are in the water will plate out on the fill material, thus reducing or eliminating the need to purify the water prior to use. In several applications, such as with landfills and water treatment plant digesters, a lot of contaminated water is collected on site. This water would otherwise have to be removed to a facility for treating such contaminated water. By introducing the water into the system, and even into the reaction chamber, not only are the contaminants destroyed, but any fuel value in such contaminants is recovered through oxidation of the contaminants.

Figure 8:
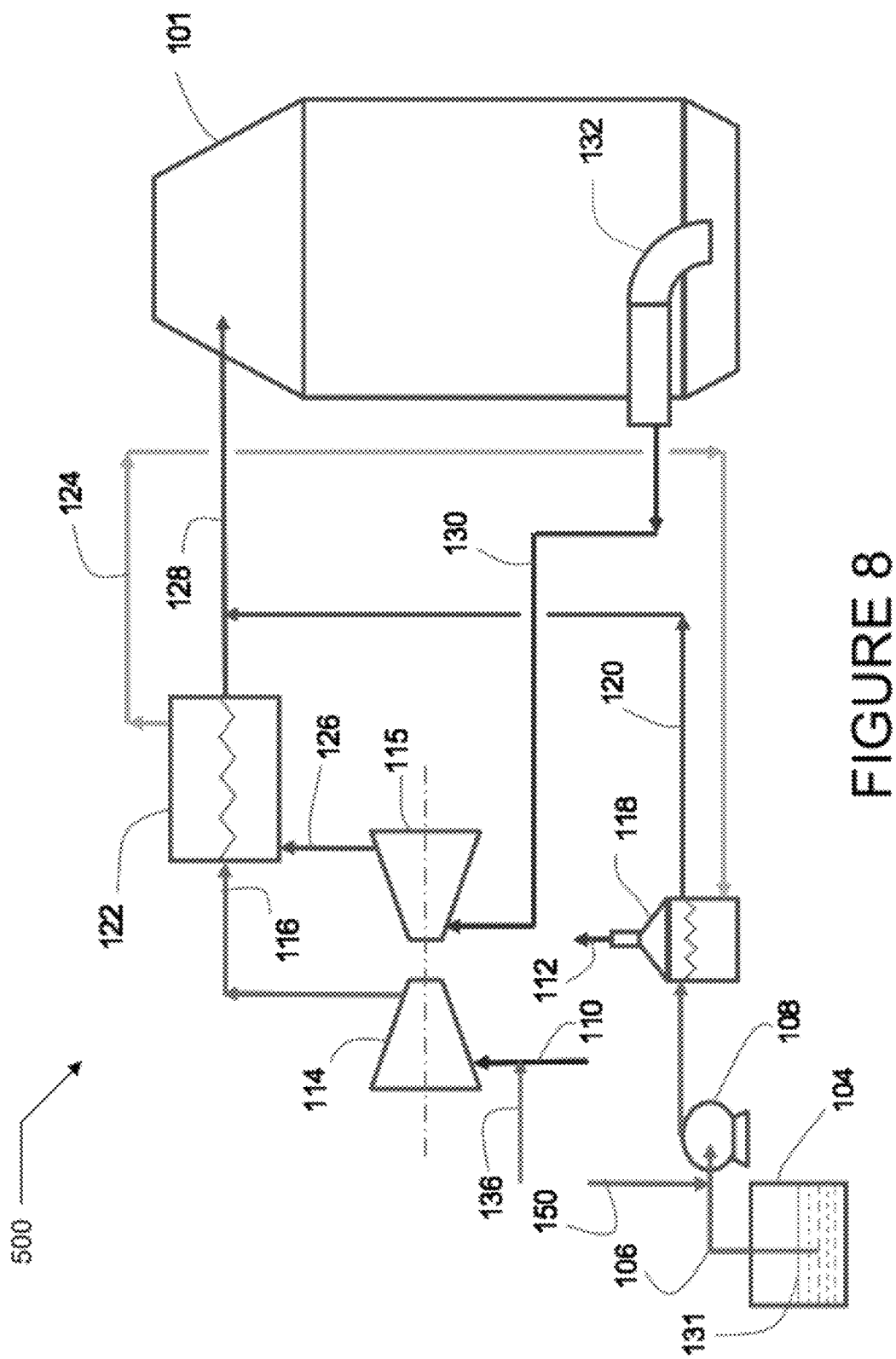
FIG. 8 is a diagram of embodiments of a gas turbine system.

FIG. 8 illustrates embodiments of a process flow diagram for a gas turbine system 500 with steam injection. Air is drawn into the system from an air source 110 and fuel gas is introduced via a fuel source 136. The air and fuel are mixed together at atmospheric pressure, and the mixture is compressed in a compressor 114. The compressed mixture is heated in a heat exchanger 122, from where it is delivered through pipe 128 to a gradual oxidation reaction chamber 101.

The reaction chamber 101 is maintained at a temperature sufficient to oxidize the fuel in the mixture, with the heat of oxidation raising the temperature of the product gases. The temperature in the reaction chamber 101 is maintained sufficiently high to oxidize all fuel in the mixture, but below the temperature that would cause the formation of harmful NOx gas.

Exhaust gas from the reaction chamber 101 is taken through exhaust pipe 132 and conduit 130 to the turbine 115, where the exhaust gas is expanded, delivering useful power to drive the compressor 114, and for other uses, such as generation of electricity through a generator. The density of gas is inversely related to its temperature. When ambient temperature increases, the density of incoming air and the fuel/air mixture decreases, and the mass of the gas flowing through the compressor therefore also declines. This lower mass flow results in reduced power output from the gas turbine, thus reducing the energy converted into electricity.

In several areas, the most expensive electricity is during peak summer days because that is when demand is highest, and that is also when traditional power plant output drops. The gas turbine systems described herein can increase the power output of the gas turbine power plant, thereby generating electric power precisely when it is most needed. One way this can be accomplished is by the introduction of water or steam into the system.

Water is available from a water source 150 or from a liquid tank 104 having a liquid source 131. The water is delivered through conduit 106 to pump or pressurizing device 108, where it is pressurized. The water is then communicated to an evaporation chamber 118, and the resulting steam is communicated through conduit 120 to conduit 128, which is then introduced to the reaction chamber 101. Heat for evaporation of the water is drawn from turbine exhaust gas, which passes through conduit 126, heat exchanger 122, conduit 124 to the evaporation chamber 118. The steam/air/fuel mixture conducted to the reaction chamber 101 by conduit 128 has a higher mass flow than just the air/fuel mixture. With higher mass flow, there is now increased mass flow through the reaction chamber 101 and through the turbine 115, resulting in increased production of electricity.

In some embodiments, the water or steam injected into the system comprises between about 50% and about 80% of the fuel mixture, comprising fuel and air, by volume. In some embodiments, the water or steam injected into the system comprises between about 40% and about 85% of the fuel mixture, and in further embodiments, the water or steam comprises between about 20% and about 90% of the fuel mixture.

Other reactions can facilitate achieving an increased output. The steam entering the conduit 128 is at a lower temperature than the fuel/air mixture and the temperature of the gases entering the reaction chamber 101 will therefore be lower than without steam introduction. It is therefore advantageous to increase or otherwise adjust the fuel/air ratio of the gas entering the compressor 114 based on the amount of steam to be introduced into conduit 128.

In some embodiments, the fuel/air ratio is dependent upon the amount of steam introduced into the conduit 128. For example, during operation, the system may operate in a first state without introduction of steam into conduit 128. In this first state, the system may be operating under a first fuel/air ratio. In a second state, the steam can be introduced into conduit 128, and a desired fuel/air ratio can be determined and implemented, based on the amount of steam introduced into conduit 128, in order to maintain the gradual oxidation processes within the reaction chamber 101. Maintenance of the oxidation process can be accomplished without increasing the maximum temperature inside the reaction chamber while still achieving full oxidation of the fuel inside the reaction chamber.

The increased mass flow and fuel flow will increase the energy delivered to the turbine 115, and will therefore increase the output of the turbine system. The energy consumed by the compressor 114 remains largely the same as before, and the increased turbine output is used by the generator to increase its output of electricity.

Figure 9:
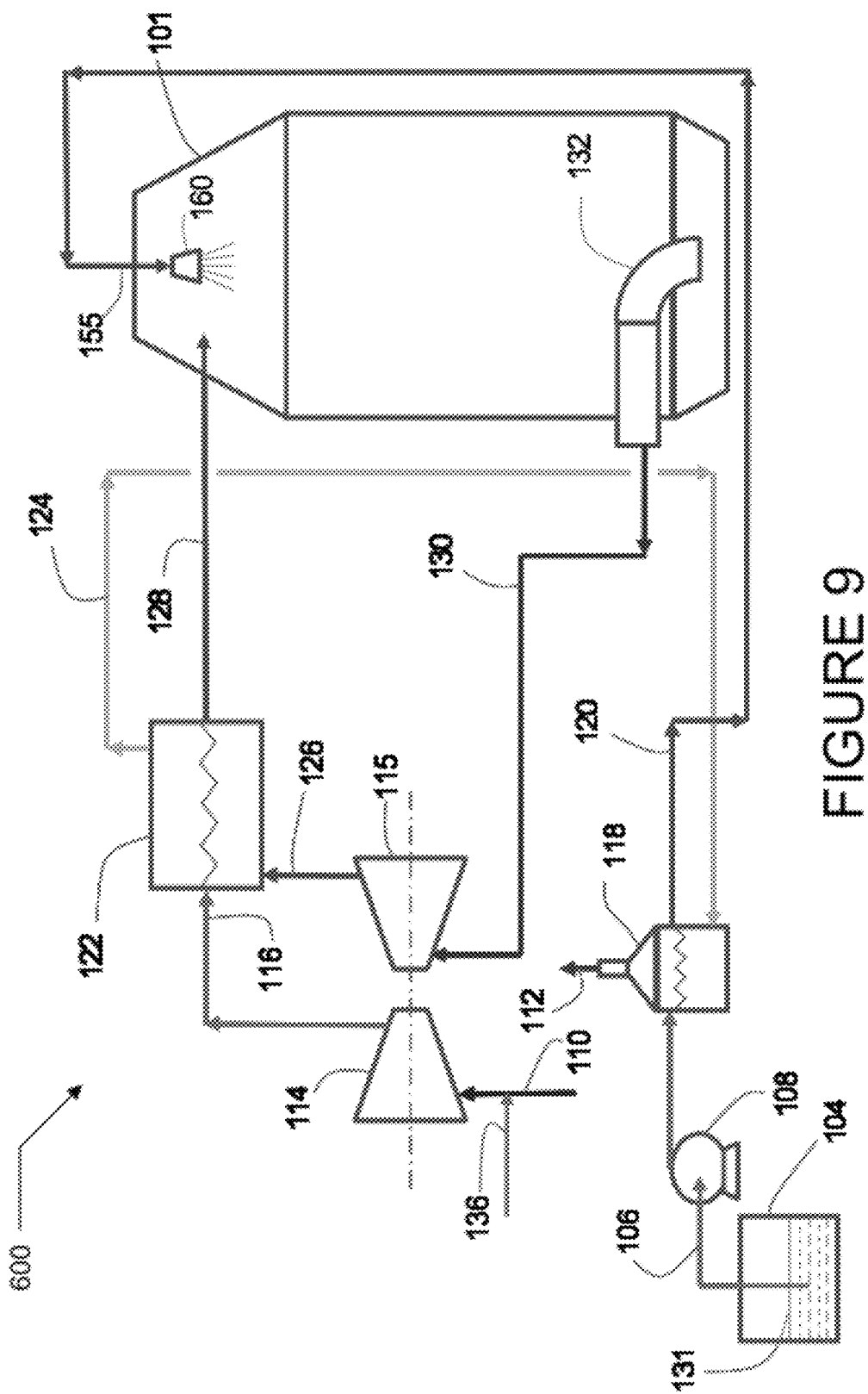
FIG. 9 is a diagram of further embodiments of a gas turbine system.

FIG. 9 shows embodiments of a modified flow pattern that achieves substantially the same result as the embodiments depicted in FIG. 8. In the gas turbine system 600 of FIG. 9, the steam is taken by conduit 120 directly into the reaction chamber 101 by conduit 155. The steam is introduced from conduit 155 into the reaction chamber 101 by an inlet 160, which can be, for example, a nozzle. While the point of introduction is farther downstream than before (i.e., deposited within the reaction chamber 101 instead of into conduit 128), the results are substantially the same. Additional fuel flow can be provided by increasing the fuel/air ratio, thus releasing additional heat within the reaction chamber 101, and thereby raising the temperature to the same threshold as before, resulting in additional energy converted into electricity.

The exhaust gas from the reaction chamber 101 is expelled through exhaust pipe 132 and conduit 130 to the turbine 115, where the exhaust gas is expanded, delivering power to drive the compressor 114. After the exhaust gas is expanded in the turbine 115, it is communicated to the heat exchanger 122 for heating the fuel/air mixture from the compressor 114. The exhaust gas is then conducted to the evaporation chamber 118 via conduit 124 for heating and/or evaporating water from the pressuring device 108. After passing through the evaporation chamber 118, the exhaust gas can be expelled from the system through outlet 112.

Figure 10:
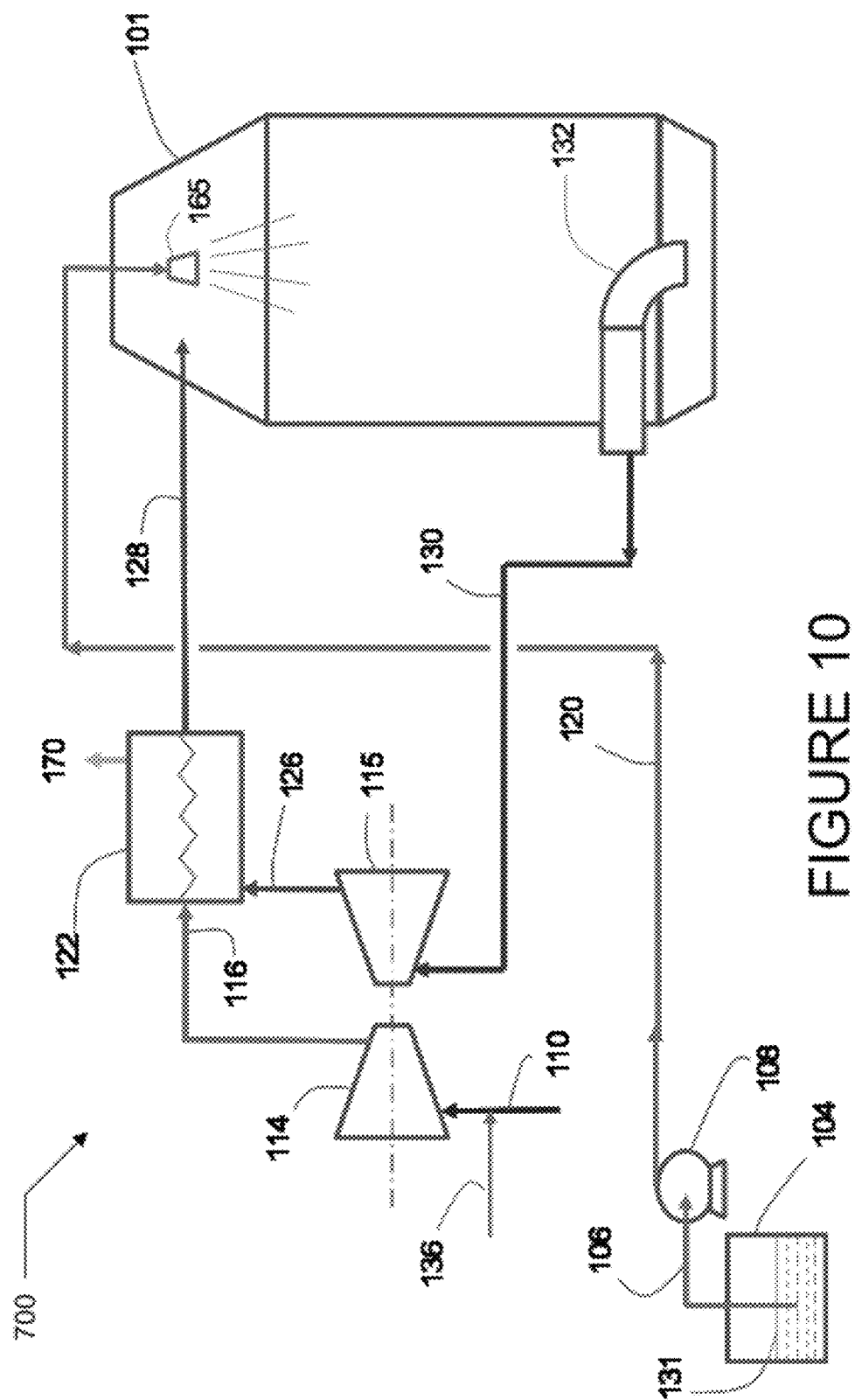
FIG. 10 is a diagram of further embodiments of a gas turbine system.

FIG. 10 illustrates further embodiments of a gas turbine system 700 that provides water to be introduced directly into the reaction chamber 101. With this illustrated flow pattern, the evaporation of the water occurs inside the reaction chamber 101. This requires an even higher fuel/air ratio than before to accommodate the energy needed to heat the water and evaporate it into steam within the reaction chamber 101.

Water is provided from the liquid source 131 to the pressurizing device 108 via conduit 106. The water is then communicated from the pressurizing device 108 directly to the reaction chamber 101 through conduit 120. The water is introduced into the reaction chamber from conduit 120 through an inlet 165, which can be, for example, a nozzle. The exhaust gas from the reaction chamber 101 is expelled through exhaust pipe 132 and conduit 130 to the turbine 115, where the exhaust gas is expanded, delivering power to drive the compressor 114. After the exhaust gas is expanded in the turbine 115, it is communicated to the heat exchanger 122 for heating the fuel/air mixture from the compressor 114. The exhaust gas can then be expelled from the system through outlet 170.

Efficiency can be improved in the system by utilizing waste heat to generate steam, and the more recovery of heat by steam generation, the more efficient the system can be. The impact on efficiency may be computed as follows: If 100 kWh of heat is available in the fuel, approximately 30 kWh of heat are converted into electricity. Without steam injection, the remaining 70 kWh of heat is exhausted, resulting in, for example, about 30% efficiency. However, if steam is to be injected, about 35 kWh of the heat otherwise exhausted can be transferred by the system to the water to generate steam. This steam must now be mixed with other gases and further heated to raise the temperature of the gases to the desired threshold. This heating requires additional fuel to be supplied and oxidized. When, for example, 10 kWh of additional fuel is needed to heat the steam to the appropriate temperature, and if an additional 3 kWh is generated, the efficiency stays the same as above: about 30% efficient. When more than an additional 3 kWh is generated, the efficiency improves to be great than about 30%; and if less than 3 additional kWh is generated, the efficiency declines to be less than about 30%.

Additional considerations include the electrical energy required to pump the water to the desired pressure, and the losses in the system resulting from increased flow. While efficiencies of the described system can be improved over systems not incorporating water or steam, one of the advantages of the embodiments described herein is that the gradual oxidation systems that include supplementation by water or steam can achieve greater power output, particularly when ambient conditions would otherwise reduce power output.

Although preferred embodiments of the disclosure have been described in detail, certain variations and modifications will be apparent to those skilled in the art, including embodiments that do not provide all the features and benefits described herein. It will be understood by those skilled in the art that the present disclosure extends beyond the specifically disclosed embodiments to other alternative or additional embodiments and/or uses and obvious modifications and equivalents thereof. In addition, while a number of variations have been shown and described in varying detail, other modifications, which are within the scope of the present disclosure, will be readily apparent to those of skill in the art based upon this disclosure.

It is also contemplated that various combinations or sub-combinations of the specific features and aspects of the embodiments may be made and still fall within the scope of the present disclosure. Accordingly, it should be understood that various features and aspects of the disclosed embodiments can be combined with or substituted for one another in order to form varying modes of the present disclosure. Thus, it is intended that the scope of the present disclosure herein disclosed should not be limited by the particular disclosed embodiments described above.

What is claimed is:

1. A gradual oxidation system comprising:
   a solid fuel gasifier that extracts gas fuel from a solid fuel;
   a scrubber that removes contaminants from the gas fuel with a cleansing liquid; and
   a flameless combustion chamber that (i) receives the cleansing liquid and contaminants from the scrubber, (ii) maintains an internal temperature sufficient to provide a gradual oxidation process, and (iii) provides a residence time, such that substantially all the contaminants from the scrubber are oxidized within the flameless combustion chamber;
   wherein the flameless combustion chamber receives the gas fuel from the scrubber and oxidizes the gas fuel during the gradual oxidation process, and wherein the cleansing liquid and contaminants are heated with an exhaust gas from the flameless combustion chamber prior to delivery to the flameless combustion chamber.

2. The system of claim 1, wherein the flameless combustion chamber is configured to maintain the gradual oxidation process without a catalyst.

3. A gradual oxidation system comprising:
   a solid fuel gasifier that extracts gas fuel from a solid fuel;
   a scrubber that removes contaminants from the gas fuel with a cleansing liquid; and
   a flameless combustion chamber that (i) receives the cleansing liquid and contaminants from the scrubber, (ii) maintains an internal temperature sufficient to provide a gradual oxidation process, and (iii) provides a residence time, such that substantially all the contaminants from the scrubber are oxidized within the flameless combustion chamber;
   wherein the gas fuel is cleansed by the scrubber with water, and wherein the cleansing liquid and contaminants are heated with an exhaust gas from the flameless combustion chamber prior to delivery to the flameless combustion chamber.

4. The system of claim 3, wherein the contaminants received from the scrubber are within the water.

5. The system of claim 4, further comprising an introducer that comprises a compressor to pressurize the water prior to introducing the water into the flameless combustion chamber.

6. The system of claim 1, wherein the flameless combustion chamber is configured to maintain the internal temperature sufficient to oxidize the gas fuel in between about 0.01 second and about 10 seconds.

7. The system of claim 1, further comprising a turbine, in fluid communication with the flameless combustion chamber, the turbine configured to receive heated and compressed gas from the flameless combustion chamber and to expand the gas.

8. The system of claim 1, wherein the flameless combustion chamber maintains a maximum temperature below a temperature that causes formation of nitrogen oxide.

9. The system of claim 1, wherein substantially all the gas fuel from the scrubber is received and oxidized by the flameless combustion chamber.

10. The system of claim 1, wherein a first portion of the gas fuel from the scrubber is received and oxidized by the flameless combustion chamber and a second portion of the gas fuel from the scrubber is distributed out of the system.

11. A gradual oxidation system comprising:
a solid fuel gasifier that extracts gas fuel from a solid fuel;
a scrubber that removes contaminants from the gas fuel with a cleansing liquid; and
a flameless combustion chamber that (i) receives the cleansing liquid and contaminants from the scrubber, (ii) maintains an internal temperature sufficient to provide a gradual oxidation process, and (iii) provides a residence time, such that substantially all the contaminants from the scrubber are oxidized within the flameless combustion chamber, wherein the flameless combustion chamber receives the gas fuel from the scrubber via a first inlet, and receives a supplemental gas fuel from a second inlet, and wherein the cleansing liquid and contaminants are heated with an exhaust gas from the flameless combustion chamber prior to delivery to the flameless combustion chamber.

12. A gradual oxidation system comprising:
a first inlet, configured to communicate contaminated liquid to the system;
a second inlet, configured to communicate fuel to the system;
a flameless combustion chamber that receives the contaminated liquid and fuel and that maintains an internal temperature sufficient to provide a gradual oxidation process while maintaining a maximum temperature in the combustion chamber below a temperature that causes formation of nitrogen oxide, such that the fuel and contaminants in the liquid are oxidized; and
an outlet arranged to conduct an output gas from the combustion chamber, the output gas comprising an oxidation product gas generated by the gradual oxidation process in the combustion chamber;
wherein the contaminated liquid is received from a scrubber that cleans gas fuel with water, and wherein the contaminated liquid is heated with the output gas from the combustion chamber prior to delivery to the flameless combustion chamber.

13. The system of claim 12, wherein the flameless combustion chamber is configured to maintain the gradual oxidation process without a catalyst.

14. The system of claim 12, wherein the contaminated liquid comprises the water from the scrubber.

15. The system of claim 12, wherein the fuel comprises gas fuel from the scrubber and the flameless combustion chamber oxidizes the gas fuel during the gradual oxidation process.

16. The system of claim 12, further comprising a compressor that pressurizes the contaminated liquid prior to the liquid being received by the flameless combustion chamber.

17. The system of claim 12, wherein the flameless combustion chamber is configured to maintain the internal temperature sufficient to oxidize the gas fuel in between about 0.01 second and about 10 seconds.

18. The system of claim 12, further comprising a turbine, in fluid communication with the flameless combustion chamber, the turbine configured to receive the output gas and to expand the output gas.

19. The system of claim 12, wherein the flameless combustion chamber maintains a maximum temperature below a temperature that causes formation of nitrogen oxide.

20. A method of oxidizing solid fuel comprising:
extracting gas fuel from a solid fuel with a solid fuel gasifier;
scrubbing the gas fuel with a cleansing liquid in a scrubber to remove contaminants from the gas fuel;
conducting the cleansing liquid and contaminants from the scrubber to a flameless combustion chamber;
oxidizing the contaminants in the combustion chamber by (i) maintaining an internal temperature in the combustion chamber sufficient to provide a gradual oxidation process and (ii) providing a residence time within the combustion chamber such that substantially all the contaminants from the scrubber are oxidized within the combustion chamber; and
conducting gas fuel from the scrubber to the flameless combustor and oxidizing the gas fuel during the gradual oxidation process, and heating the cleansing liquid and contaminants with an exhaust gas from the combustion chamber prior to conducting to the flameless combustion chamber.

21. The method of claim 20, wherein the flameless combustion chamber maintains the gradual oxidation process without a catalyst.

22. A method of oxidizing solid fuel comprising:
extracting gas fuel from a solid fuel with a solid fuel gasifier;
scrubbing the gas fuel with a cleansing liquid in a scrubber to remove contaminants from the gas fuel;
conducting the cleansing liquid and contaminants from the scrubber to a flameless combustion chamber;
oxidizing the contaminants in the combustion chamber by (i) maintaining an internal temperature in the combustion chamber sufficient to provide a gradual oxidation process and (ii) providing a residence time within the combustion chamber such that substantially all the contaminants from the scrubber are oxidized within the combustion chamber;
wherein the gas fuel is cleansed by the scrubber with water, and wherein the cleansing liquid and contaminants are heated with an exhaust gas from the flameless combustion chamber prior to conducting to the flameless combustion chamber.

23. The method of claim 22, wherein the contaminants received by the combustion chamber from the scrubber are within the water.

24. The method of claim 22, further comprising compressing the water and contaminants with a compressor prior to oxidation in the flameless combustion chamber.

25. The method of claim 20, wherein the residence time is between about 0.01 second and about 10 seconds.

26. The method of claim 20, further comprising conducting heated and compressed gas from the flameless combustion chamber to a turbine and expanding the gas in the turbine.

27. The method of claim 20, wherein substantially all the gas fuel from the scrubber is conducted to and oxidized by the flameless combustion chamber.

28. The method of claim 20, wherein a first portion of the gas fuel from the scrubber is conducted to and oxidized by the flameless combustion chamber and a second portion of the gas fuel from the scrubber is distributed away from the combustion chamber.

29. A method of oxidizing solid fuel comprising:
extracting gas fuel from a solid fuel with a solid fuel gasifier;
scrubbing the gas fuel with a cleansing liquid in a scrubber to remove contaminants from the gas fuel;

conducting the cleansing liquid and contaminants from the scrubber to a flameless combustion chamber; and oxidizing the contaminants in the combustion chamber by (i) maintaining an internal temperature in the combustion chamber sufficient to provide a gradual oxidation process and (ii) providing a residence time within the combustion chamber such that substantially all the contaminants from the scrubber are oxidized within the combustion chamber;

wherein the gas fuel is conducted to the flameless combustion chamber via a first inlet, and the combustion chamber receives a supplemental gas fuel from a second inlet, and wherein the cleansing liquid and contaminants are heated with an exhaust gas from the flameless combustion chamber prior to conducting to the flameless combustion chamber.

30. The method of claim 20, wherein the combustion chamber maintains a maximum internal temperature below a temperature that causes formation of nitrogen oxide.

31. A method of oxidizing contaminants in a liquid comprising:

conducting a contaminated liquid to a flameless combustion chamber via a first inlet;

conducting fuel to the flameless combustion chamber via a second inlet; and oxidizing contaminants in the contaminated liquid with the fuel in the flameless combustion chamber by (i) maintaining an internal temperature in the combustion chamber sufficient to provide a gradual oxidation process, (ii) maintaining a maximum temperature in the combustion chamber below a temperature that causes formation of nitrogen oxide and (iii) providing a residence time within the combustion chamber such that substantially all the contaminants from a scrubber are oxidized within the combustion chamber;

wherein the contaminated liquid is conducted to the combustion chamber from the scrubber that cleans gas fuel with water, and wherein the contaminated liquid is heated with an exhaust gas from the combustion chamber prior to conducting to the flameless combustion chamber.

32. The method of claim 31, wherein the flameless combustion chamber maintains the gradual oxidation process without a catalyst.

33. The method of claim 31, wherein the contaminated liquid comprises the water from the scrubber.

34. A method of oxidizing contaminants in a liquid comprising:

conducting a contaminated liquid to a flameless combustion chamber via a first inlet;

conducting fuel to the flameless combustion chamber via a second inlet; and oxidizing contaminants in the contaminated liquid with the fuel in the flameless combustion chamber by (i) maintaining an internal temperature in the combustion chamber sufficient to provide a gradual oxidation process, (ii) maintaining a maximum temperature in the combustion chamber below a temperature that causes formation of nitrogen oxide and (iii) providing a residence time within the combustion chamber such that substantially all the contaminants from a scrubber are oxidized within the combustion chamber;

wherein the fuel comprises gas fuel from the scrubber and the flameless combustion chamber oxidizes the gas fuel during the gradual oxidation process, and wherein the contaminated liquid is heated with an exhaust gas from the flameless combustion chamber prior to conducting to the flameless combustion chamber.

35. The method of claim 31, further comprising compressing the contaminated liquid prior to conducting the liquid to the flameless combustion chamber.

36. The method of claim 31, wherein the residence time is between about 0.01 second and about 10 seconds.

37. The method of claim 31, further comprising conducting heated and compressed gas from the flameless combustion chamber to a turbine and expanding the gas in the turbine.

* * * * *